(12) United States Patent
Camelio et al.

(10) Patent No.: US 12,104,002 B2
(45) Date of Patent: Oct. 1, 2024

(54) MONOBIDENTATE AMINOPYRIDINE GROUP IV TRANSITION METAL OLEFIN COPOLYMERIZATION CATALYSTS WITH ULTRA-HIGH MOLECULAR WEIGHT CAPABILITY AND ULTRA-LOW COMONOMER INCORPORATION

(71) Applicant: Dow Global Technologies LLC, Midland, MI (US)

(72) Inventors: Andrew M. Camelio, Midland, MI (US); Brad C. Bailey, Midland, MI (US); Tomas D. Paine, Midland, MI (US); Sukrit Mukhopadhyay, Midland, MI (US); Matthew D. Christianson, Midland, MI (US)

(73) Assignee: Dow Global Technologies LLC, Midland, MI (US)

( * ) Notice: Subject to any disclaimer, the term of this patent is extended or adjusted under 35 U.S.C. 154(b) by 442 days.

(21) Appl. No.: 17/437,275

(22) PCT Filed: Mar. 19, 2020

(86) PCT No.: PCT/US2020/023487
§ 371 (c)(1),
(2) Date: Sep. 8, 2021

(87) PCT Pub. No.: WO2020/197907
PCT Pub. Date: Oct. 1, 2020

(65) Prior Publication Data
US 2022/0162354 A1     May 26, 2022

Related U.S. Application Data

(60) Provisional application No. 62/825,264, filed on Mar. 28, 2019.

(51) Int. Cl.
*C08F 210/02*     (2006.01)
*C08F 2/04*     (2006.01)
(Continued)

(52) U.S. Cl.
CPC ............ *C08F 4/65908* (2013.01); *C08F 2/04* (2013.01); *C08F 210/16* (2013.01)

(58) Field of Classification Search
CPC ............................ C08F 210/16; C08F 210/02
See application file for complete search history.

(56) References Cited

U.S. PATENT DOCUMENTS

2007/0167315 A1    7/2007 Arriola et al.

FOREIGN PATENT DOCUMENTS

CN         108779204 A     11/2018
EP         3436487 A1      2/2019
(Continued)

OTHER PUBLICATIONS

International Preliminary Report on Patentability for Application No. PCT/US2020/023487, issued Sep. 28, 2021, pp. 1-9.
(Continued)

*Primary Examiner* — Catherine S Branch
(74) *Attorney, Agent, or Firm* — Dinsmore & Shohl LLP

(57) ABSTRACT

Processes for polymerizing polyolefins include contacting ethylene and optionally one or more $(C_3-C_{12})$α-olefin in the presence of a catalyst system, wherein the catalyst system
(Continued)

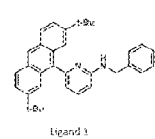

Ligand 1

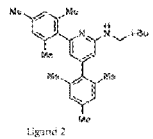

Ligand 2

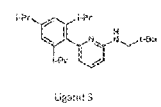

Ligand 3

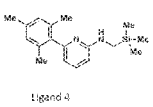

Ligand 4

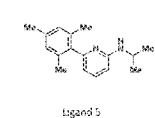

Ligand 5

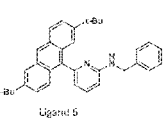

Ligand 6

Ligand 7

Ligand 8 comprises a metal-ligand complex having a structure according to formula (I):

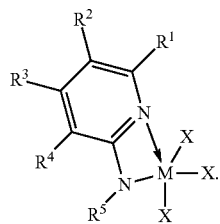

(I)

14 Claims, 1 Drawing Sheet

(51) Int. Cl.
C08F 2/16 (2006.01)
C08F 4/659 (2006.01)
C08F 210/16 (2006.01)

(56) References Cited

FOREIGN PATENT DOCUMENTS

WO 97/45434 A1 12/1997
WO 2014/139861 A1 9/2014

OTHER PUBLICATIONS

Communication pursuant to Rules 161 (1) and 162 for EP Application No. 20718995.2, issued on Nov. 5, 2021, pp. 1-3.
NOOR_Synthesis and Structure of Zirconium and Hafnium Polymerisation Catalysts Stabilised by Very Bulky Aminopryidinato Ligands, European Journal of Inorganic Chemistry, 2008, pp. 5088-5098.
Chinese Second Office Action, dated Jul. 26, 2023, pertaining to Chinese Patent Application No. 202080020227.6, eight pages.
Brazilian Office Action dated Aug. 31, 2023, pertaining to BR Patent Application No. BR112021018118-0, 10 pgs.
Narayana, Gurram Venkata, et al., "Access to Ultra-High-Molecular Weight Poly(ethylene) and Activity Boost in the Presence of Cyclopentene With Group 4 Bis-Amido Complexes," ChemPlusChem, vol. 79, pp. 151-162 (2014).
International Search Report and Written Opinion issued by the European Patent Office acting as International Searching Authority for International Patent Application No. PCT/US2020/023487, dated Jun. 16, 2020 (17 total pages).
Japanese Office Action dated Mar. 19, 2024, pertaining to JP Patent Application No. 2021-555606, 14 pgs.
Singapore Office Action dated Jun. 4, 2024, pertaining to SG Patent Application No. 11202109488U, 7 pgs.
Japanese Office Action dated Jul. 30, 2024, pertaining to JP Patent Application No. 2021-555606, 6 pgs.

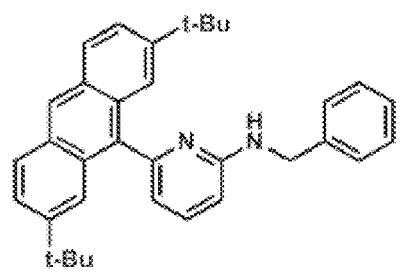
Ligand 1
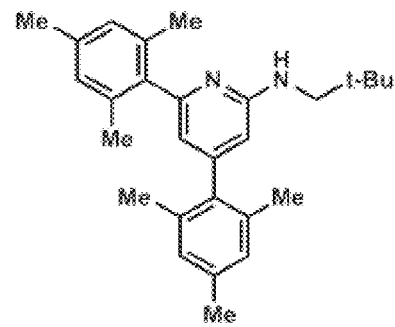
Ligand 2
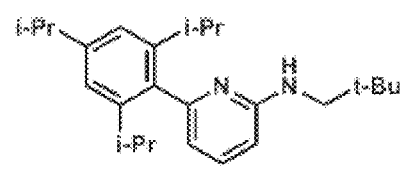
Ligand 3
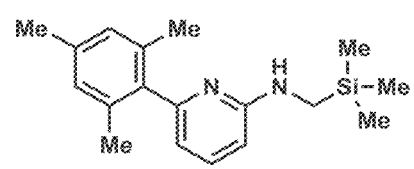
Ligand 4
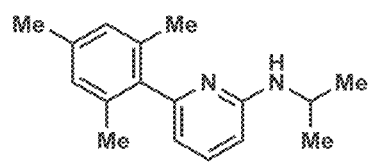
Ligand 5
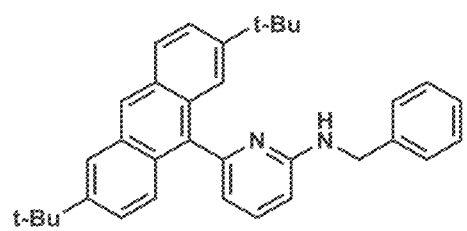
Ligand 6
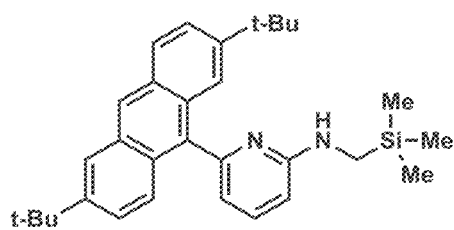
Ligand 7
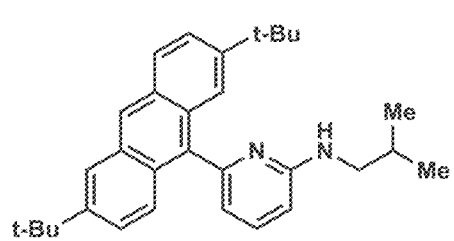
Ligand 8

MONOBIDENTATE AMINOPYRIDINE GROUP IV TRANSITION METAL OLEFIN COPOLYMERIZATION CATALYSTS WITH ULTRA-HIGH MOLECULAR WEIGHT CAPABILITY AND ULTRA-LOW COMONOMER INCORPORATION

CROSS REFERENCE TO RELATED APPLICATIONS

This application claims priority to U.S. Provisional Patent Application No. 62/825,264, filed on Mar. 28, 2019, the entire disclosure of which is hereby incorporated by reference.

TECHNICAL FIELD

Embodiments of the present disclosure generally relate to olefin polymerization catalyst systems and processes, and, more specifically, to the olefin polymerization catalyst systems including monobidentate aminopyridine Group IV transition metal catalysts and to olefin polymerization processes incorporating the catalyst systems.

BACKGROUND

Olefin-based polymers such as polyethylene, ethylene-based polymers, polypropylene, and propylene-based polymers are produced via various catalyst systems. Selection of such catalyst systems used in the polymerization process of the olefin-based polymers is an important factor contributing to the characteristics and properties of such olefin based polymers.

Ethylene-based polymers are manufactured for a wide variety of articles. The polyethylene polymerization process can be varied in a number of respects to produce a wide variety of resultant polyethylene resins having different physical properties that render the various resins suitable for use in different applications. The ethylene monomers and, optionally, one or more co-monomers are present in liquid diluents (such as solvents), such as an alkane or isoalkane, for example isobutene. Hydrogen may also be added to the reactor. The catalyst systems for producing ethylene-based may typically comprise a chromium-based catalyst system, a Ziegler-Natta catalyst system, and/or a molecular (either metallocene or non-metallocene) catalyst system. The reactants in the diluent and the catalyst system are circulated at an elevated polymerization temperature around the reactor, thereby producing ethylene-based homopolymer or copolymer. Either periodically or continuously, part of the reaction mixture, including the polyethylene product dissolved in the diluent, together with unreacted ethylene and one or more optional co-monomers, is removed from the reactor. The reaction mixture, when removed from the reactor, may be processed to remove the polyethylene product from the diluent and the unreacted reactants, with the diluent and unreacted reactants typically being recycled back into the reactor. Alternatively, the reaction mixture may be sent to a second reactor, serially connected to the first reactor, where a second polyethylene fraction may be produced.

Despite the number of currently available homogeneous solution olefin polymerization catalyst systems, there is a need for high temperature polymerization catalysts that have improved molecular properties facilitating the production of high molecular weight (Mw) polymers having narrow polydispersities (PDIs), and/or high molecular weight (Mw) ethylene/comonomer copolymers having a range of comonomer incorporation (i.e. 0-20 mol % of 1-hexene or 1-octene, etc), and/or high molecular weight (Mw) polymers that can undergo chain transfer with chain transfer agents (CSAs) to produce olefin block copolymers (OBCs).

SUMMARY

Embodiments of this disclosure include polymerization processes. These polymerization processes produce ethylene-based polymers. The polymerization process comprising contacting ethylene and optionally one or more ($C_3$-$C_{12}$) α-olefin in the presence of a catalyst system, wherein the catalyst system comprises a metal-ligand complex having a structure according to formula (I):

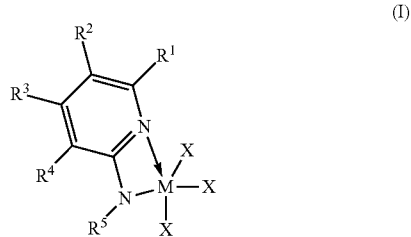

(I)

In formula (I), M is titanium, zirconium, or hafnium. Each X is a monodentate or bidentate ligand independently chosen from unsaturated ($C_2$-$C_{20}$)hydrocarbon, unsaturated ($C_2$-$C_{50}$)heterohydrocarbon, ($C_1$-$C_{50}$)hydrocarbyl, ($C_1$-$C_{50}$)heterohydrocarbyl, ($C_6$-$C_{50}$)aryl, ($C_6$-$C_{50}$)heteroaryl, cyclopentadienyl, substituted cyclopentadienyl, ($C_4$-$C_{12}$)diene, halogen, —$OR^X$, —$N(R^X)_2$, or —$NCOR^X$, wherein each $R^X$ is ($C_1$-$C_{30}$)hydrocarbyl or —H.

In formula (I), $R^1$, $R^2$, $R^3$, and $R^4$ are independently chosen from —H, ($C_1$-$C_{40}$)hydrocarbyl, ($C_1$-$C_{40}$)heterohydrocarbyl, —$Si(R^C)_3$, —$Ge(R^C)_3$, —$P(R^P)_2$, —$N(R^N)_2$, —$OR^C$, —$SR^C$, —$NO_2$, —CN, —$CF_3$, $R^CS(O)$—, $R^CS(O)_2$—, ($R^C)_2C=N$—, $R^CC(O)O$—, $R^COC(O)$—, $R^CC(O)N(R)$—, ($R^C)_2NC(O)$—, or halogen, wherein each $R^C$, each $R^N$, and each $R^P$ are ($C_1$-$C_{40}$)hydrocarbyl, ($C_1$-$C_{40}$)heterohydrocarbyl, or —H; and $R^5$ is —H, ($C_1$-$C_{40}$)hydrocarbyl or ($C_1$-$C_{40}$)heterohydrocarbyl, provided $R^5$ is not phenyl or a substituted phenyl.

In various embodiments, $R^1$ is selected from the group consisting of radicals having formula (II), radicals having formula (III), and radicals having formula (IV):

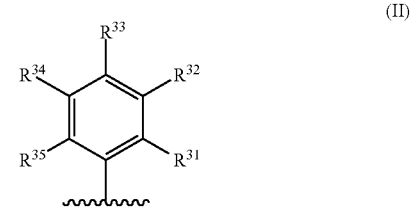

(II)

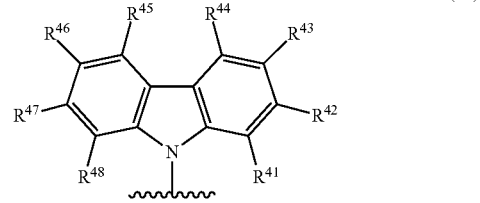

(III)

-continued

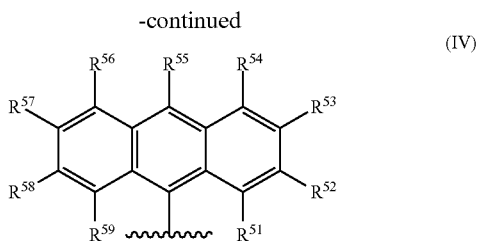

(IV)

In formulas (II), (III), (IV), $R^{31}$-$R^{35}$, $R^{41}$-$R^{48}$, and $R^{51}$-$R^{59}$ is independently chosen from $(C_1$-$C_{40})$hydrocarbyl, $(C_1$-$C_{40})$heterohydrocarbyl, —Si$(R^T)_3$, —Ge$(R^T)_3$, —P$(R^T)_2$, —N$(R^T)_2$, —N=CHR$^T$, —OR$^T$, —SR$^T$, —NO$_2$, —CN, —CF$_3$, R$^T$S(O)—, R$^T$S(O)$_2$—, $(R^T)_2$C=N—, R$^T$C(O)O—, R$^T$OC(O)—, R$^T$C(O)N$(R^T)$—, $(R^T)_2$NC(O)—, halogen, or —H, wherein each $R^T$ is $(C_1$-$C_{30})$hydrocarbyl or —H.

BRIEF SUMMARY OF THE DRAWINGS

The FIGURE depicts Ligand 1 to Ligand 8.

DETAILED DESCRIPTION

Specific embodiments of catalyst systems will now be described. It should be understood that the catalyst systems of this disclosure may be embodied in different forms and should not be construed as limited to the specific embodiments set forth in this disclosure. Rather, embodiments are provided so that this disclosure will be thorough and complete, and will fully convey the scope of the subject matter to those skilled in the art.

Common abbreviations are listed below:

R, Z, M, X and n: as defined above; Me: methyl; Et: ethyl; Ph: phenyl; Bn: benzyl; i-Pr: iso-propyl; t-Bu: tert-butyl; t-Oct: tert-octyl (2,4,4-trimethylpentan-2-yl); Tf: trifluoromethane sulfonate; THF: tetrahydrofuran; Et$_2$O: diethyl ether; CH$_2$Cl$_2$: dichloromethane; CV: column volume (used in column chromatography); EtOAc: ethyl acetate; C$_6$D$_6$: deuterated benzene or benzene-d6: CDCl$_3$: deuterated chloroform; Na$_2$SO$_4$: sodium sulfate; MgSO$_4$: magnesium sulfate; HCl: hydrogen chloride; n-BuLi: butyllithium; t-BuLi: tert-butyllithium; Cu$_2$O: Copper (I) Oxide; N,N'-DMEDA: N,N'-dimethylethylenediamine; K$_3$PO$_4$: Potassium phosphate tribasic; Pd(AmPhos)Cl$_2$: Bis(di-tert-butyl(4-dimethylaminophenyl)phosphine)dichloropalladium(II); Pd(dppf)Cl$_2$: [1,1'-Bis(diphenylphosphino)ferrocene]palladium(II) dichloride; K$_2$CO$_3$: potassium carbonate; Cs$_2$CO$_3$: cesium carbonate; i-PrOBPin: 2-isopropoxy-4,4,5,5-tetramethyl-1,3,2-dioxaborolane; BrCl$_2$CCCl$_2$Br: 1,2-dibromotetrachloroethane; HfCl$_4$: hafnium(IV) chloride; HfBn$_4$: hafnium(IV) tetrabenzyl; ZrCl$_4$: zirconium(IV) chloride; ZrBna: zirconium(IV) tetrabenzyl; ZrBn$_2$Cl$_2$(OEt$_2$): zirconium (IV) dibenzyl dichloride mono-diethyletherate; HfBn$_2$Cl$_2$(OEt$_2$): hafnium (IV) dibenzyl dichloride mono-diethyletherate; TiBna: titanium (IV) tetrabenzyl; Zr(CH$_2$SiMe$_3$)$_4$: zirconium (IV) tetrakis-trimethylsilylmethyl; Hf(CH$_2$SiMe$_3$)$_4$: hafnium (IV) tetrakis-trimethylmethyl; N$_2$: nitrogen gas; PhMe: toluene; PPR: parallel pressure reactor; MAO: methylaluminoxane; MMAO: modified methylaluminoxane; GC: gas chromatography; LC: liquid chromatography; NMR: nuclear magnetic resonance; MS: mass spectrometry; mmol: millimoles; mL: milliliters; M: molar; min or mins: minutes; h or hrs: hours; d: days; R$_f$: retention fraction; TLC; thin-layered chromatography; rpm: revolution per minute.

The term "independently selected" followed by multiple options is used herein to indicate that individual R groups appearing before the term, such as $R^1$, $R^2$, $R^3$, $R^4$, and $R^5$, can be identical or different, without dependency on the identity of any other group also appearing before the term.

The term "procatalyst" refers to a compound that has catalytic activity when combined with an activator. The term "activator" refers to a compound that chemically reacts with a procatalyst in a manner that converts the procatalyst to a catalytically active catalyst. As used herein, the terms "co-catalyst" and "activator" are interchangeable terms.

When used to describe certain carbon atom-containing chemical groups, a parenthetical expression having the form "$(C_x$-$C_y)$" means that the unsubstituted form of the chemical group has from x carbon atoms to y carbon atoms, inclusive of x and y. For example, a $(C_1$-$C_{50})$alkyl is an alkyl group having from 1 to 50 carbon atoms in its unsubstituted form. In some embodiments and general structures, certain chemical groups may be substituted by one or more substituents such as $R^S$. An $R^S$ substituted version of a chemical group defined using the "$(C_x$-$C_y)$" parenthetical may contain more than y carbon atoms depending on the identity of any groups $R^S$. For example, a "$(C_1$-$C_{50})$alkyl substituted with exactly one group $R^S$, where $R^S$ is phenyl (—C$_6$H$_5$)" may contain from 7 to 56 carbon atoms. Thus, in general when a chemical group defined using the "$(C_x$-$C_y)$" parenthetical is substituted by one or more carbon atom-containing substituents $R^S$, the minimum and maximum total number of carbon atoms of the chemical group is determined by adding to both x and y the combined sum of the number of carbon atoms from all of the carbon atom-containing substituents $R^S$.

The term "substitution" means that at least one hydrogen atom (—H) bonded to a carbon atom or heteroatom of a corresponding unsubstituted compound or functional group is replaced by a substituent (e.g. $R^S$). The term "persubstitution" means that every hydrogen atom (H) bonded to a carbon atom or heteroatom of a corresponding unsubstituted compound or functional group is replaced by a substituent (e.g., $R^S$). The term "polysubstitution" means that at least two, but fewer than all, hydrogen atoms bonded to carbon atoms or heteroatoms of a corresponding unsubstituted compound or functional group are replaced by a substituent. The term "—H" means a hydrogen or hydrogen radical that is covalently bonded to another atom. "Hydrogen" and "—H" are interchangeable, and unless clearly specified have identical meanings.

The term "$(C_1$-$C_{50})$hydrocarbyl" means a hydrocarbon radical of from 1 to 50 carbon atoms and the term "$(C_1$-$C_{50})$hydrocarbylene" means a hydrocarbon diradical of from 1 to 50 carbon atoms, in which each hydrocarbon radical and each hydrocarbon diradical is aromatic or non-aromatic, saturated or unsaturated, straight chain or branched chain, cyclic (having three carbons or more, and including mono- and poly-cyclic, fused and non-fused polycyclic, and bicyclic) or acyclic, and substituted by one or more $R^S$ or unsubstituted.

In this disclosure, a $(C_1$-$C_{50})$hydrocarbyl may be an unsubstituted or substituted $(C_1$-$C_{50})$alkyl, $(C_3$-$C_{50})$cycloalkyl, $(C_3$-$C_{20})$cycloalkyl-$(C_1$-$C_{20})$alkylene, $(C_6$-$C_{40})$aryl, or $(C_6$-$C_{20})$aryl-$(C_1$-$C_{20})$alkylene (such as benzyl (—CH$_2$—C$_6$H$_5$)).

The terms "$(C_1$-$C_{50})$alkyl" and "$(C_1$-$C_{18})$alkyl" mean a saturated straight or branched hydrocarbon radical of from 1 to 50 carbon atoms and a saturated straight or branched hydrocarbon radical of from 1 to 18 carbon atoms, respectively, that is unsubstituted or substituted by one or more $R^S$. Examples of unsubstituted $(C_1$-$C_{50})$alkyl are unsubstituted ($C_1$-$C_{20}$)alkyl; unsubstituted ($C_1$-$C_{10}$)alkyl; unsubstituted ($C_1$-$C_5$)alkyl; methyl; ethyl; 1-propyl; 2-propyl; 1-butyl; 2-butyl; 2-methylpropyl; 1,1-dimethylethyl; 1-pentyl; 1-hexyl; 1-heptyl; 1-nonyl; and 1-decyl. Examples of substituted ($C_1$-$C_{40}$)alkyl are substituted ($C_1$-$C_{20}$)alkyl, substituted ($C_1$-$C_{10}$)alkyl, trifluoromethyl, and [$C_{45}$]alkyl. The term "[$C_{45}$]alkyl" means there is a maximum of 45 carbon atoms in the radical, including substituents, and is, for example, a ($C_{27}$-$C_{40}$)alkyl substituted by one $R^S$, which is a ($C_1$-$C_5$)alkyl, respectively. Each ($C_1$-$C_5$)alkyl may be methyl, trifluoromethyl, ethyl, 1-propyl, 1-methylethyl, or 1,1-dimethylethyl.

The term "($C_6$-$C_{50}$)aryl" means an unsubstituted or substituted (by one or more $R^S$) mono-, bi- or tricyclic aromatic hydrocarbon radical of from 6 to 40 carbon atoms, of which at least from 6 to 14 of the carbon atoms are aromatic ring carbon atoms. A monocyclic aromatic hydrocarbon radical includes one aromatic ring; a bicyclic aromatic hydrocarbon radical has two rings; and a tricyclic aromatic hydrocarbon radical has three rings. When the bicyclic or tricyclc aromatic hydrocarbon radical is present, at least one of the rings of the radical is aromatic. The other ring or rings of the aromatic radical may be independently fused or non-fused and aromatic or non-aromatic. Examples of unsubstituted ($C_6$-$C_{50}$)aryl include: unsubstituted ($C_6$-$C_{20}$)aryl, unsubstituted ($C_6$-$C_{18}$)aryl; 2-($C_1$-$C_5$)alkyl-phenyl; phenyl; fluorenyl; tetrahydrofluorenyl; indacenyl; hexahydroindacenyl; indenyl; dihydroindenyl; naphthyl; tetrahydronaphthyl; and phenanthrene. Examples of substituted ($C_6$-$C_{40}$)aryl include: substituted ($C_1$-$C_{20}$)aryl; substituted ($C_6$-$C_{15}$)aryl; 2,4-bis([$C_{20}$]alkyl)-phenyl; polyfluorophenyl; pentafluorophenyl; and fluoren-9-one-1-yl.

The term "($C_3$-$C_{50}$)cycloalkyl" means a saturated cyclic hydrocarbon radical of from 3 to 50 carbon atoms that is unsubstituted or substituted by one or more $R^S$. Other cycloalkyl groups (e.g., ($C_x$-$C_y$)cycloalkyl) are defined in an analogous manner as having from x to y carbon atoms and being either unsubstituted or substituted with one or more $R^S$. Examples of unsubstituted ($C_3$-$C_{40}$)cycloalkyl are unsubstituted ($C_3$-$C_{20}$)cycloalkyl, unsubstituted ($C_3$-$C_{10}$)cycloalkyl, cyclopropyl, cyclobutyl, cyclopentyl, cyclohexyl, cycloheptyl, cyclooctyl, cyclononyl, and cyclodecyl. Examples of substituted ($C_3$-$C_{40}$)cycloalkyl are substituted ($C_3$-$C_{20}$)cycloalkyl, substituted ($C_3$-$C_{10}$)cycloalkyl, cyclopentanon-2-yl, and 1-fluorocyclohexyl.

Examples of ($C_1$-$C_{50}$)hydrocarbylene include unsubstituted or substituted ($C_6$-$C_{50}$)arylene, ($C_3$-$C_{50}$)cycloalkylene, and ($C_1$-$C_{50}$)alkylene (e.g., ($C_1$-$C_{20}$)alkylene). The diradicals may be on the same carbon atom (e.g., —$CH_2$—) or on adjacent carbon atoms (i.e., 1,2-diradicals), or are spaced apart by one, two, or more than two intervening carbon atoms (e.g., 1,3-diradicals, 1,4-diradicals, etc.). Some diradicals include 1,2-, 1,3-, 1,4-, or an α,ω-diradical, and others a 1,2-diradical. The α,ω-diradical is a diradical that has maximum carbon backbone spacing between the radical carbons. Some examples of ($C_2$-$C_{20}$)alkylene α,ω-diradicals include ethan-1,2-diyl (i.e. —$CH_2CH_2$—), propan-1,3-diyl (i.e. —$CH_2CH_2CH_2$—), 2-methylpropan-1,3-diyl (i.e. —$CH_2CH(CH_3)CH_2$—). Some examples of ($C_6$-$C_{50}$) arylene α,ω-diradicals include phenyl-1,4-diyl, napthalen-2,6-diyl, or napthalen-3,7-diyl.

The term "($C_1$-$C_{50}$)alkylene" means a saturated straight chain or branched chain diradical (i.e., the radicals are not on ring atoms) of from 1 to 50 carbon atoms that is unsubstituted or substituted by one or more $R^S$. Examples of unsubstituted ($C_1$-$C_{50}$)alkylene are unsubstituted ($C_1$-$C_{20}$)alkylene, including unsubstituted —$CH_2CH_2$—, —$(CH_2)_3$—, —$(CH_2)_4$—, —$(CH_2)_5$—, —$(CH_2)_6$—, —$(CH_2)_7$—, —$(CH_2)_8$—, —$CH_2C*HCH_3$, and —$(CH_2)_4C*(H)(CH_3)$, in which "C*" denotes a carbon atom from which a hydrogen atom is removed to form a secondary or tertiary alkyl radical. Examples of substituted ($C_1$-$C_{50}$)alkylene are substituted ($C_1$-$C_{20}$)alkylene, —$CF_2$—, —C(O)—, and —$(CH_2)_{14}C(CH_3)_2(CH_2)_5$— (i.e., a 6,6-dimethyl substituted normal-1,20-eicosylene). Since as mentioned previously two $R^S$ may be taken together to form a ($C_1$-$C_{18}$) alkylene, examples of substituted ($C_1$-$C_{50}$)alkylene also include 1,2-bis(methylene)cyclopentane, 1,2-bis(methylene)cyclohexane, 2,3-bis(methylene)-7,7-dimethyl-bicyclo [2.2.1]heptane, and 2,3-bis (methylene)bicyclo [2.2.2] octane.

The term "($C_3$-$C_{50}$)cycloalkylene" means a cyclic diradical (i.e., the radicals are on ring atoms) of from 3 to 50 carbon atoms that is unsubstituted or substituted by one or more $R^S$.

The term "heteroatom," refers to an atom other than hydrogen or carbon. Examples of groups containing one or more than one heteroatom include O, S, S(O), S(O)$_2$, Si($R^C$)$_2$, P($R^P$), N($R^N$), —N=C($R^C$)$_2$, —Ge($R^C$)$_2$—, or —Si($R^C$)—, where each $R^C$ and each $R^P$ is unsubstituted ($C_1$-$C_{18}$)hydrocarbyl or —H, and where each $R^N$ is unsubstituted ($C_1$-$C_{18}$)hydrocarbyl. The term "heterohydrocarbon" refers to a molecule or molecular framework in which one or more carbon atoms of a hydrocarbon are replaced with a heteroatom. The term "($C_1$-$C_{50}$)heterohydrocarbyl" means a heterohydrocarbon radical of from 1 to 50 carbon atoms, and the term "($C_1$-$C_{50}$)heterohydrocarbylene" means a heterohydrocarbon diradical of from 1 to 50 carbon atoms. The heterohydrocarbon of the ($C_1$-$C_{50}$)heterohydrocarbyl or the ($C_1$-$C_{50}$)heterohydrocarbylene has one or more heteroatoms. The radical of the heterohydrocarbyl may be on a carbon atom or a heteroatom. The two radicals of the heterohydrocarbylene may be on a single carbon atom or on a single heteroatom. Additionally, one of the two radicals of the diradical may be on a carbon atom and the other radical may be on a different carbon atom; one of the two radicals may be on a carbon atom and the other on a heteroatom; or one of the two radicals may be on a heteroatom and the other radical on a different heteroatom. Each ($C_1$-$C_{50}$)heterohydrocarbyl and ($C_1$-$C_{50}$)heterohydrocarbylene may be unsubstituted or substituted (by one or more $R^S$), aromatic or non-aromatic, saturated or unsaturated, straight chain or branched chain, cyclic (including mono- and poly-cyclic, fused and non-fused polycyclic), or acyclic.

The ($C_1$-$C_{50}$)heterohydrocarbyl may be unsubstituted or substituted. Non-limiting examples of the ($C_1$-$C_{50}$)heterohydrocarbyl include ($C_1$-$C_{50}$)heteroalkyl, ($C_1$-$C_{50}$)hydrocarbyl-O—, ($C_1$-$C_{50}$)hydrocarbyl-S—, ($C_1$-$C_{50}$)hydrocarbyl-S(O)—, ($C_1$-$C_{50}$)hydrocarbyl-S(O)$_2$—, ($C_1$-$C_{50}$)hydrocarbyl-Si($R^C$)$_2$—, ($C_1$-$C_{50}$)hydrocarbyl-N($R^N$)—, ($C_1$-$C_{50}$)hydrocarbyl-P($R^P$)—, ($C_2$-$C_{50}$)heterocycloalkyl, ($C_2$-$C_{19}$)heterocycloalkyl-($C_1$-$C_{20}$)alkylene, ($C_3$-$C_{20}$)cycloalkyl-($C_1$-$C_{19}$)heteroalkylene, ($C_2$-$C_{19}$)heterocycloalkyl-($C_1$-$C_{20}$)heteroalkylene, ($C_1$-$C_{50}$)heteroaryl, ($C_1$-$C_{19}$)heteroaryl-($C_1$-$C_{20}$)alkylene, ($C_6$-$C_{20}$)aryl-($C_1$-$C_{19}$)heteroalkylene, or ($C_1$-$C_{19}$)heteroaryl-($C_1$-$C_{20}$)heteroalkylene.

The term "($C_4$-$C_{50}$)heteroaryl" means an unsubstituted or substituted (by one or more $R^S$) mono-, bi-, or tricyclic heteroaromatic hydrocarbon radical of from 4 to 50 total carbon atoms and from 1 to 10 heteroatoms. A monocyclic heteroaromatic hydrocarbon radical includes one heteroaromatic ring; a bicyclic heteroaromatic hydrocarbon radical has two rings; and a tricyclic heteroaromatic hydrocarbon radical has three rings. When the bicyclic or tricyclc heteroaromatic hydrocarbon radical is present, at least one of the rings in the radical is heteroaromatic. The other ring or rings of the heteroaromatic radical may be independently fused or non-fused and aromatic or non-aromatic. Other heteroaryl groups (e.g., $(C_x-C_y)$heteroaryl generally, such as $(C_4-C_{12})$heteroaryl) are defined in an analogous manner as having from x to y carbon atoms (such as 4 to 12 carbon atoms) and being unsubstituted or substituted by one or more than one $R^S$. The monocyclic heteroaromatic hydrocarbon radical is a 5-membered ring or a 6-membered ring. The 5-membered ring has 5 minus h carbon atoms, wherein h is the number of heteroatoms and may be 1, 2, or 3; and each heteroatom may be O, S, N, or P. Examples of 5-membered ring heteroaromatic hydrocarbon radicals include pyrrol-1-yl; pyrrol-2-yl; furan-3-yl; thiophen-2-yl; pyrazol-1-yl; isoxazol-2-yl; isothiazol-5-yl; imidazol-2-yl; oxazol-4-yl; thiazol-2-yl; 1,2,4-triazol-1-yl; 1,3,4-oxadiazol-2-yl; 1,3,4-thiadiazol-2-yl; tetrazol-1-yl; tetrazol-2-yl; and tetrazol-5-yl. The 6-membered ring has 6 minus h carbon atoms, wherein h is the number of heteroatoms and may be 1 or 2 and the heteroatoms may be N or P. Examples of 6-membered ring heteroaromatic hydrocarbon radicals include pyridine-2-yl; pyrimidin-2-yl; and pyrazin-2-yl. The bicyclic heteroaromatic hydrocarbon radical can be a fused 5.6- or 6,6-ring system. Examples of the fused 5,6-ring system bicyclic heteroaromatic hydrocarbon radical are indol-1-yl; and benzimidazole-1-yl. Examples of the fused 6,6-ring system bicyclic heteroaromatic hydrocarbon radical are quinolin-2-yl; and isoquinolin-1-yl. The tricyclic heteroaromatic hydrocarbon radical can be a fused 5,6,5-; 5,6,6-; 6,5,6-; or 6,6,6-ring system. An example of the fused 5,6,5-ring system is 1,7-dihydropyrrolo[3,2-f]indol-1-yl. An example of the fused 5,6,6-ring system is 1H-benzo[f]indol-1-yl. An example of the fused 6,5,6-ring system is 9H-carbazol-9-yl. An example of the fused 6,5,6-ring system is 9H-carbazol-9-yl. An example of the fused 6,6,6-ring system is acrydin-9-yl.

The term "$(C_1-C_{50})$heteroalkyl" means a saturated straight or branched chain radicals containing one to fifty carbon atoms, or fewer carbon atoms and one or more of the heteroatoms. The term "$(C_1-C_{50})$heteroalkylene" means a saturated straight or branched chain diradicals containing from 1 to 50 carbon atoms and one or more heteroatoms. The heteroatoms of the heteroalkyls or the heteroalkylenes may include $Si(R^C)_3$, $Ge(R^C)_3$, $Si(R^C)_2$, $Ge(R^C)_2$, $P(R^C)_2$, $P(R^P)$, $N(R^N)_2$, $N(R^N)$, N, O, $OR^C$, S, $SR^C$, S(O), and $S(O)_2$, wherein each of the heteroalkyl and heteroalkylene groups are unsubstituted or are substituted by one or more $R^S$.

Examples of unsubstituted $(C_2-C_{40})$heterocycloalkyl include unsubstituted $(C_2-C_{20})$heterocycloalkyl, unsubstituted $(C_2-C_{10})$heterocycloalkyl, aziridin-1-yl, oxetan-2-yl, tetrahydrofuran-3-yl, pyrrolidin-1-yl, tetrahydrothiophen-S,S-dioxide-2-yl, morpholin-4-yl, 1,4-dioxan-2-yl, hexahydroazepin-4-yl, 3-oxa-cyclooctyl, 5-thio-cyclononyl, and 2-aza-cyclodecyl.

The term "halogen atom" or "halogen" means the radical of a fluorine atom (F), chlorine atom (Cl), bromine atom (Br), or iodine atom (I). The term "halide" means the anionic form of the halogen atom: fluoride ($F^-$), chloride ($Cl^-$), bromide ($Br^-$), or iodide ($I^-$).

The term "saturated" means lacking carbon-carbon double bonds, carbon-carbon triple bonds, and (in heteroatom-containing groups) carbon-nitrogen, carbon-phosphorous, and carbon-silicon double bonds. Where a saturated chemical group is substituted by one or more substituents $R^S$, one or more double and/or triple bonds optionally may or may not be present in substituents $R^S$. The term "unsaturated" means containing one or more carbon-carbon double bonds, carbon-carbon triple bonds, or (in heteroatom-containing groups) one or more carbon-nitrogen, carbon-phosphorous, or carbon-silicon double bonds, not including double bonds that may be present in substituents $R^S$, if any, or in (hetero) aromatic rings, if any.

Embodiments of this disclosure include processes for polymerizing olefin monomers. The process includes contacting ethylene and optionally one or more $(C_3-C_{12})\alpha$-olefin in the presence of a catalyst system. The catalyst system includes a metal-ligand complex having a structure according to formula (I):

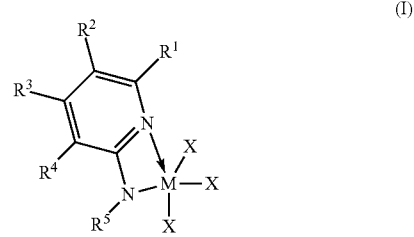

(I)

In formula (I), M is titanium, zirconium, or hafnium. Each X is a monodentate or bidentate ligand independently chosen from unsaturated $(C_2-C_{20})$hydrocarbon, unsaturated $(C_2-C_{50})$heterohydrocarbon, $(C_1-C_{50})$hydrocarbyl, $(C_1-C_{50})$heterohydrocarbyl, $(C_6-C_{50})$aryl, $(C_6-C_{50})$heteroaryl, cyclopentadienyl, substituted cyclopentadienyl, $(C_4-C_{12})$diene, halogen, —$OR^X$, —$N(R^X)_2$, or —$NCOR^X$, wherein each $R^X$ is $(C_1-C_{30})$hydrocarbyl or —H.

In formula (I), $R^1$ is independently chosen from —H, $(C_1-C_{40})$hydrocarbyl, $(C_1-C_{40})$heterohydrocarbyl, —$Si(R^C)_3$, —$Ge(R^C)_3$, —$P(R^E)_2$, —$N(R^N)_2$, —$OR^C$, —$SR^C$, —$NO_2$, —CN, —$CF_3$, $R^CS(O)$—, $R^CS(O)_2$—, $(R^C)_2C=N$—, $R^CC(O)O$—, $R^COC(O)$—, $R^CC(O)N(R)$—, $(R^C)_2NC(O)$—, or halogen. Each $R^C$, each $R^N$, and each $R^P$ are $(C_1-C_{30})$hydrocarbyl, $(C_1-C_{30})$heterohydrocarbyl, or —H.

In formula (I), $R^2$, $R^3$, and $R^4$ are independently chosen from —H, $(C_1-C_{40})$hydrocarbyl, $(C_1-C_{40})$heterohydrocarbyl, —$Si(R^C)_3$, —$Ge(R^C)_3$, —$P(R^P)_2$, —$N(R^N)_2$, —$OR^C$, —$SR^C$, —$NO_2$, —CN, —$CF_3$, $R^CS(O)$—, $R^CS(O)_2$—, $(R^C)_2C=N$—, $R^CC(O)O$—, $R^COC(O)$—, $R^CC(O)N(R)$—, $(R^C)_2NC(O)$—, or halogen, wherein each $R^C$, each $R^N$, and each $R^P$ are $(C_1-C_{30})$hydrocarbyl, $(C_1-C_{30})$heterohydrocarbyl, or —H, $R^5$ is —H, $(C_1-C_{40})$hydrocarbyl or $(C_1-C_{40})$heterohydrocarbyl, provided $R^5$ is not phenyl or a substituted phenyl.

In various embodiments, $R^1$ is selected from the group consisting of radicals having formula (II), radicals having formula (III), and radicals having formula (IV):

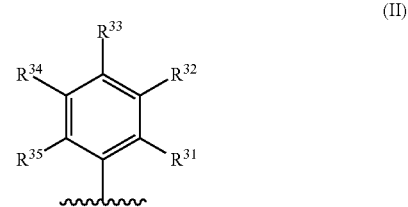

(II)

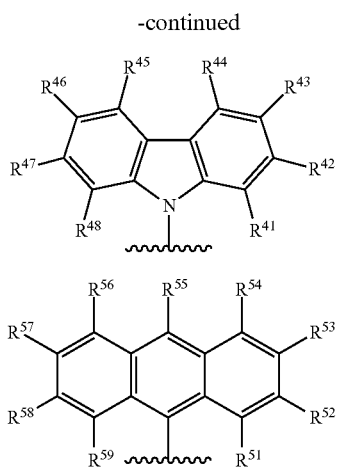

(III)

(IV)

In formulas (II), (III), (IV), $R^{31}$-$R^{35}$, $R^{41}$-$R^{48}$, and $R^{51}$-$R^{59}$ is independently chosen from $(C_1$-$C_{40})$hydrocarbyl, $(C_1$-$C_{40})$heterohydrocarbyl, —Si$(R^T)_3$, —Ge$(R^T)_3$, —P$(R^T)_2$, —N$(R^T)_2$, —N=CHR$^T$, —OR$^T$, —SR$^T$, —NO$_2$, —CN, —CF$_3$, R$^T$S(O)—, R$^T$S(O)$_2$—, $(R^T)_2$C=N—, R$^T$C(O)O—, R$^T$OC(O)—, R$^T$C(O)N$(R^T)$—, $(R^T)_2$NC(O)—, halogen, or —H, wherein each $R^T$ is $(C_1$-$C_{30})$hydrocarbyl or —H.

In one or more embodiments of formula (I), $R^1$ is a radical having formula (II), and $R^{31}$, $R^{33}$, and $R^{35}$ of formula (II) are independently $(C_1$-$C_{12})$alkyl or $(C_1$-$C_{20})$aryl. In some embodiments, $R^1$ is selected from a radical having formula (II), and $R^{32}$ and $R^{34}$ of formula (II) are independently $(C_1$-$C_{12})$alkyl or $(C_1$-$C_{20})$aryl.

In various embodiments of formula (I), $R^1$ is a radical having formula (IV), and $R^{52}$ and $R^{58}$ of formula (IV) are independently $(C_1$-$C_{12})$alkyl or $(C_1$-$C_{20})$aryl. In one or more embodiments, $R^1$ is a radical having formula (IV), and $R^{53}$ and $R^{58}$ of formula (IV) are independently $(C_1$-$C_{12})$alkyl or $(C_1$-$C_{20})$aryl. In some embodiments, $R^1$ is a radical having formula (IV), and $R^{53}$ and $R^{57}$ of formula (IV) are independently $(C_1$-$C_{12})$alkyl or $(C_1$-$C_{20})$aryl. In some embodiments, $R^1$ is a radical having formula (IV), and $R^{53}$, $R^{55}$, and $R^{57}$ of formula (IV) are independently $(C_1$-$C_{12})$alkyl or $(C_1$-$C_{20})$aryl.

Any embodiment in which $R^{31}$-$R^{35}$, $R^{41}$-$R^{48}$, and $R^{51}$-$R^{59}$ is $(C_1$-$C_{12})$alkyl, $(C_1$-$C_{12})$alkyl may be methyl, ethyl, propyl, 2-propyl, n-butyl, tert-butyl, 2-methylpropyl, pentyl, 2,2-dimethylpropyl, hexyl, heptyl, octyl, n-octyl, tert-octyl, nonyl, decyl, undecyl, or dodecyl.

In some embodiments of formula (I), $R^5$ is benzyl, $(C_1$-$C_{20})$alkyl, or —CH$_2$SiR$^R_3$, wherein $R^R$ is $(C_1$-$C_{12})$alkyl. In one or more embodiments, $R^5$ is methyl, ethyl, propyl, 2-propyl, n-butyl, tert-butyl, 2-methylpropyl, pentyl, 2,2-dimethylpropyl, hexyl, heptyl, octyl, n-octyl, tert-octyl, nonyl, decyl, undecyl, or dodecyl.

The metal-ligand complex has 6 or fewer metal-ligand bonds and can be overall charge-neutral or may have a positive-charge associated with the metal center. In some embodiments, the catalyst system includes a metal-ligand complex according to formula (I), in which M is zirconium or hafnium; each X is independently chosen from $(C_6$-$C_{20})$aryl, $(C_4$-$C_{20})$heteroaryl, $(C_4$-$C_{12})$diene, or a halogen; and each $R^1$ is independently chosen from $(C_1$-$C_{50})$aryl, $(C_4$-$C_{50})$heteroaryl.

In the metal-ligand complex according to formula (I), each X bonds with M through a covalent bond, a dative bond, or an ionic bond. In general, the metal-ligand complex according to formula (I) is overall charge-neutral. In some embodiments, the monodentate ligand may be a monoanionic ligand. Monoanionic ligands have a net formal oxidation state of −1. Each monoanionic ligand may independently be hydride, $(C_1$-$C_{40})$hydrocarbyl carbanion, $(C_1$-$C_{40})$heterohydrocarbyl carbanion, halide, nitrate, carbonate, phosphate, sulfate, HC(O)O$^-$, HC(O)N(H)–, $(C_1$-$C_{40})$hydrocarbylC(O)O$^-$, $(C_1$-$C_{40})$hydrocarbylC(O)N$((C_1$-$C_{20})$hydrocarbyl)-, $(C_1$-$C_{40})$hydrocarbylC(O)N(H)$^-$, R$^K$R$^L$B$^-$, R$^K$R$^L$N$^-$, R$^K$O$^-$, R$^K$S$^-$, R$^K$R$^L$P$^-$, or R$^M$R$^K$R$^L$Si$^-$, where each $R^K$, $R^L$, and $R^M$ independently is hydrogen, $(C_1$-$C_{40})$hydrocarbyl, or $(C_1$-$C_{40})$heterohydrocarbyl, or $R^K$ and $R^L$ are taken together to form a $(C_2$-$C_{40})$hydrocarbylene or $(C_1$-$C_{20})$heterohydrocarbylene and $R^M$ is as defined above.

In other embodiments, at least one monodentate ligand X, independently from any other ligands X, may be a neutral ligand. In specific embodiments, the neutral ligand is a neutral Lewis base group such as R$^Q$NR$^K$R$^L$, R$^K$OR$^L$, R$^K$SR$^L$, or R$^Q$PR$^K$R$^L$, where each $R^Q$ independently is hydrogen, [$(C_1$-$C_{10})$hydrocarbyl]$_3$Si$(C_1$-$C_{10})$hydrocarbyl, $(C_1$-$C_{40})$hydrocarbyl, [$(C_1$-$C_{10})$hydrocarbyl]$_3$Si, or $(C_1$-$C_{40})$heterohydrocarbyl and each $R^K$ and $R^L$ independently is as previously defined.

Additionally, each X can be a monodentate ligand that, independently from any other ligands X, is a halogen, unsubstituted $(C_1$-$C_{20})$hydrocarbyl, unsubstituted $(C_1$-$C_{20})$hydrocarbylC(O)O—, or R$^K$R$^L$N—, wherein each of $R^K$ and $R^L$ independently is an unsubstituted$(C_1$-$C_{20})$hydrocarbyl. In some embodiments, each monodentate ligand X is a chlorine atom, $(C_1$-$C_{10})$hydrocarbyl (e.g., $(C_1$-$C_6)$alkyl or benzyl), unsubstituted $(C_1$-$C_{10})$hydrocarbylC(O)O—, or R$^K$R$^L$N—, wherein each of $R^K$ and $R^L$ independently is an unsubstituted $(C_1$-$C_{10})$hydrocarbyl.

In illustrative embodiments including a bidentate ligand X, the bidentate ligand X may be a neutral bidentate ligand. In one embodiment, the neutral bidentate ligand is a diene of formula $(R^D)_2$C=C$(R^D)$—C$(R^D)$=C$(R^D)_2$, wherein each $R^D$ independently is H, unsubstituted $(C_1$-$C_6)$alkyl, phenyl, or naphthyl. In some embodiments the bidentate ligand is a monoanionic-mono (Lewis base) ligand. In some embodiments, the bidentate ligand is a dianionic ligand. The dianionic ligand has a net formal oxidation state of −2. In one embodiment, each dianionic ligand independently is carbonate, oxalate (i.e., $^-$O$_2$CC(O)O$^-$), $(C_2$-$C_{40})$hydrocarbylene dicarbanion, $(C_1$-$C_{40})$heterohydrocarbylene dicarbanion, phosphate, or sulfate.

In further embodiments, each X is selected from methyl; ethyl; 1-propyl; 2-propyl; 1-butyl; 2,2,-dimethylpropyl; trimethylsilylmethyl; phenyl; benzyl; or chloro. In some embodiments, each X is the same. In other embodiments, at least two X are different from each other. In the embodiments in which at least two X are different from at least one X, X is a different one of methyl; ethyl; 1-propyl; 2-propyl; 1-butyl; 2,2,-dimethylpropyl; trimethylsilylmethyl; phenyl; benzyl; and chloro. In further embodiments, the bidentate ligand is 2,2-dimethyl-2-silapropane-1,3-diyl or 1,3-butadiene.

In specific embodiments, X is benzyl, —CH$_2$SiR$^R_3$, or —(CH$_2)_n$(SiR$^C)_3$, in which subscript n is an integer from 1 to 10, and wherein $R^R$ is $(C_1$-$C_{12})$alkyl and $R^C$ is $(C_1$-$C_{30})$hydrocarbyl, $(C_1$-$C_{30})$heterohydrocarbyl, or —H. In further specific embodiments, X is benzyl, —CH$_2$SiR$^R_3$, or —(CH$_2)_n$(SiR$^C)_3$, in which subscript n is an integer from 1 to 10, and wherein $R^R$ is $(C_1$-$C_{12})$alkyl and $R^C$ is $(C_1$-$C_{20})$alkyl.

In some embodiments, any or all of the chemical groups (e.g., X, $R^1$-$R^5$, $R^{31}$-$R^{35}$, $R^{41}$-$R^{48}$, and $R^{51}$-$R^{59}$) of the metal-ligand complex of formula (I) may be unsubstituted.

In other embodiments, none, any, or all of the chemical groups X, $R^1$-$R^5$, $R^{31}$-$R^{35}$, $R^{41}$-$R^{48}$, and $R^{51}$-$R^{59}$ of the metal-ligand complex of formula (I) may be substituted with one or more than one $R^S$. When two or more than two $R^S$ are bonded to a same chemical group of the metal-ligand complex of formula (I), the individual $R^S$ of the chemical group may be bonded to the same carbon atom or heteroatom or to different carbon atoms or heteroatoms. In some embodiments, none, any, or all of the chemical groups X, $R^1$-$R^5$, $R^{31}$-$R^{35}$, $R^{41}$-$R^{48}$, and $R^{51}$-$R^{59}$ may be persubstituted with $R^S$. In the chemical groups that are persubstituted with $R^S$, the individual $R^S$ may all be the same or may be independently chosen.

In illustrative embodiments, the catalyst systems may include a metal-ligand complex according to formula (I) having the structure of any of the Procatalysts 1-16 listed below which are synthesized from the corresponding Ligands 1-8, as shown in The FIGURE:

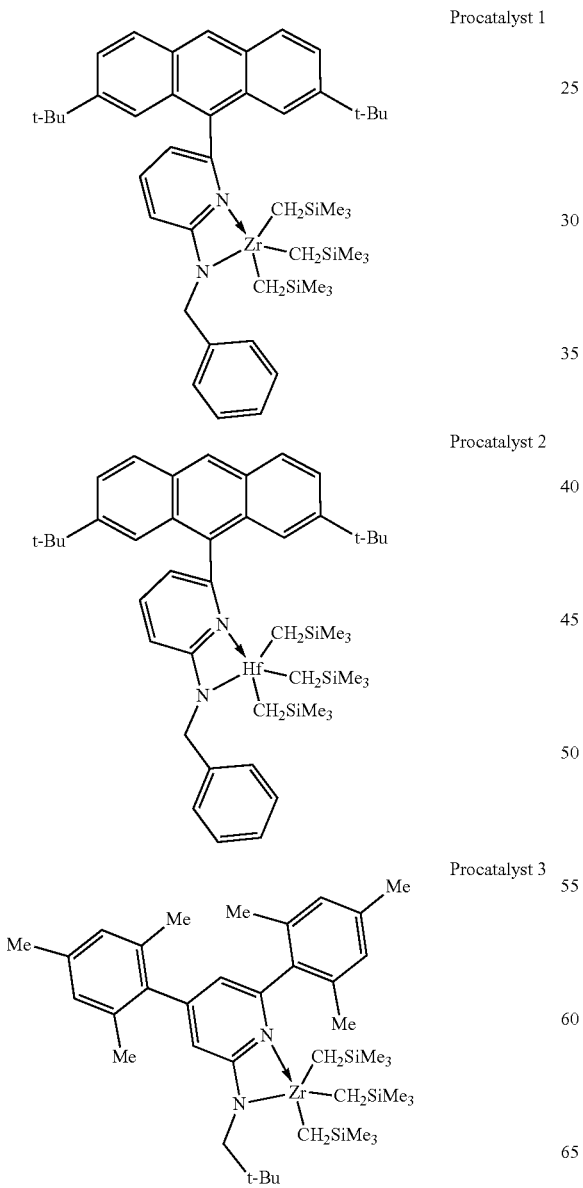

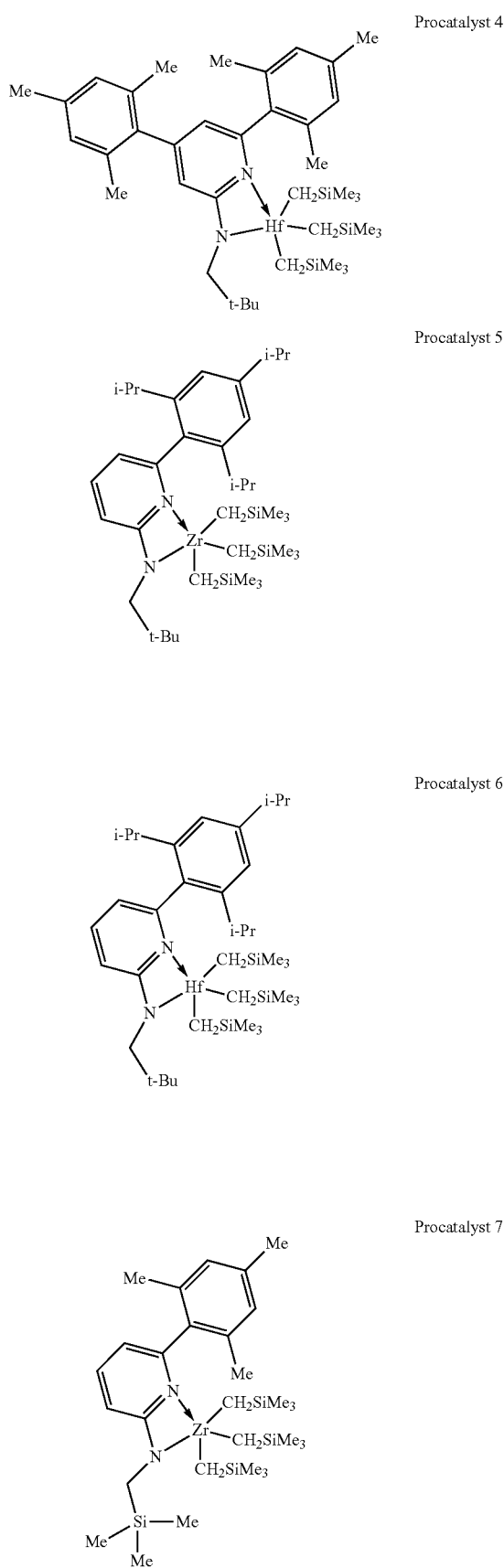

-continued
Procatalyst 8
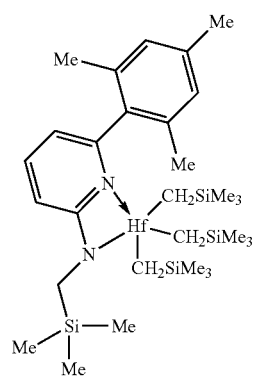
Procatalyst 9
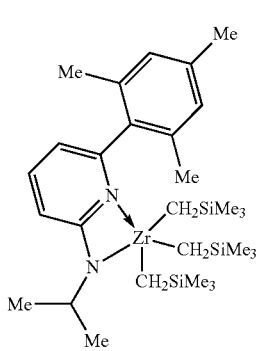
Procatalyst 10
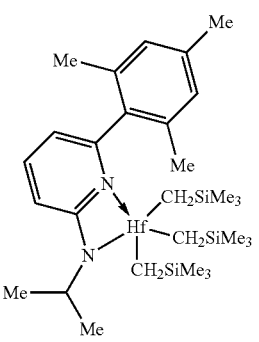
Procatalyst 11
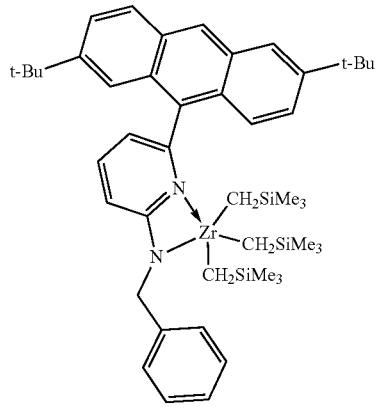
-continued
Procatalyst 12
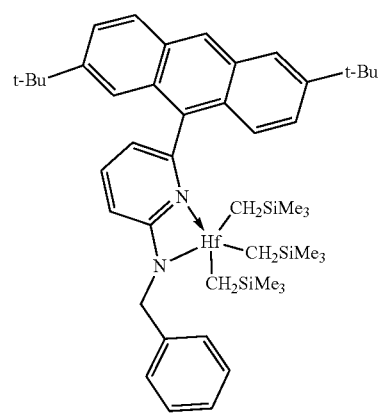
Procatalyst 13
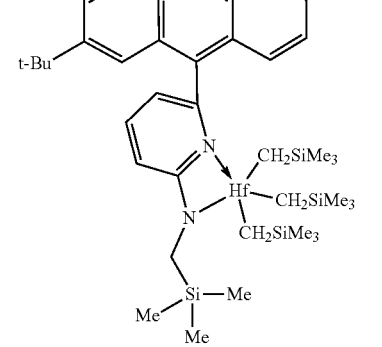
Procatalyst 14
Procatalyst 15

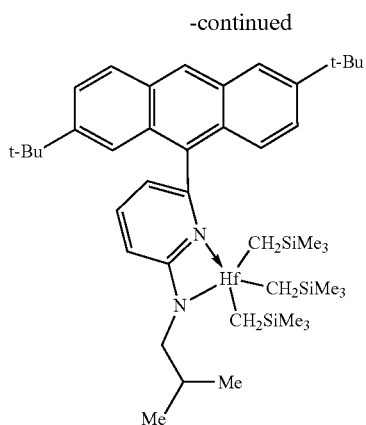

Procatalyst 16

Chain Shuttling and/or Chain Transfer Agent

In one or more embodiments, the polymerization processes of this disclosure include contacting ethylene and/or one or more ($C_3$-$C_{12}$)α-olefins in a reactor in the presence of a catalyst system and a chain transfer agent or chain shuttling agent. The polymerization process includes a mixture or reaction product of: (A) a procatalyst comprising a metal-ligand complex having a structure of formula (I) and a cocatalyst; (B) an olefin polymerization catalyst characterized as having a comonomer selectivity different from that of the procatalyst (A); and (C) the chain transfer agent or chain shuttling agent.

As used herein, the term "chain transfer agent" refers to a molecule that can transfer polymer chains between two distinct catalysts in a single polymerization reactor. Each catalyst in the reactor may have a different monomer selectivity. While the term "chain transfer agent" is similar to the term "chain shuttling agent," a person of skill in the art would recognize that a chain transfer agent may be used as a chain shuttling agent depending on the type of reactor and catalyst system. For example, chain shuttling occurs in a continuous reactor with a dual catalyst system. In this scenario, a chain shuttling agent is added to the catalyst systems of the polymerization reaction. In contrast, chain transfer occurs in a batch reactor with either a single catalyst or dual catalyst system, and therefore, a chain transfer agent is added into the catalyst system. However, the same molecule may be used as a chain transfer agent or a chain shuttling agent.

Typically, chain transfer agents comprise a metal that is Al, B, or Ga being in a formal oxidation state of +3; or a metal that is Zn or Mg being in a formal oxidation state of +2. Chain transfer agents suitable for processes of this disclosure are described in U.S. Patent Application Publication Number US 2007/0167315, which is incorporated herein by reference in its entirety.

In one or more embodiments of the polymerization process, the chain transfer agent, when present, may be chosen from diethylzinc, di(iso-butyl)zinc, di(n-hexyl)zinc, triethylaluminum, trioctylaluminum, triethylgallium, iso-butylaluminum bis(dimethyl(t-butyl)siloxane), iso-butylaluminum bis(di(trimethylsilyl)amide), n-octylaluminum di(pyridine-2-methoxide), bis(n-octadecyl) iso-butylaluminum, iso-butylaluminum bis(di(n-pentyl) amide), n-octylaluminum bis(2,6-di-t-butylphenoxide), n-octylaluminum di(ethyl(1-naphthyl) amide), ethylaluminum bis(t-butyldimethylsiloxide), ethylaluminum di(bis(trimethylsilyl)amide), ethylaluminum bis(2,3,6,7-dibenzo-1-azacycloheptaneamide), n-octylaluminum bis(2,3,6,7-dibenzo-1-azacycloheptaneamide), n-octylaluminum bis(dimethyl(t-butyl)siloxide), ethylzinc (2,6-diphenylphenoxide), ethylzinc (t-butoxide), dimethylmagnesium, dibutylmagnesium, and n-butyl-sec-butylmagnesium.

Cocatalyst Component

The catalyst system comprising a metal-ligand complex of formula (I) may be rendered catalytically active by any technique known in the art for activating metal-based catalysts of olefin polymerization reactions. For example, the procatalyst according to a metal-ligand complex of formula (I) may be rendered catalytically active by contacting the complex to, or combining the complex with, an activating co-catalyst. Additionally, the metal-ligand complex according for formula (I) includes both a procatalyst form, which is neutral, and a catalytic form, which may be positively charged due to the loss of a monoanionic ligand, such a benzyl or phenyl. Suitable activating co-catalysts for use herein include alkyl aluminums; polymeric or oligomeric alumoxanes (also known as aluminoxanes); neutral Lewis acids; and non-polymeric, non-coordinating, ion-forming compounds (including the use of such compounds under oxidizing conditions). A suitable activating technique is bulk electrolysis. Combinations of one or more of the foregoing activating co-catalysts and techniques are also contemplated. The term "alkyl aluminum" means a monoalkyl aluminum dihydride or monoalkylaluminum dihalide, a dialkyl aluminum hydride or dialkyl aluminum halide, or a trialkylaluminum. Examples of polymeric or oligomeric alumoxanes include methylalumoxane, triisobutylaluminum-modified methylalumoxane, and isobutylalumoxane.

Lewis acid activating co-catalysts include Group 13 metal compounds containing ($C_1$-$C_{20}$)hydrocarbyl substituents as described herein. In some embodiments, Group 13 metal compounds are tri(($C_1$-$C_{20}$)hydrocarbyl)-substituted-aluminum or tri(($C_1$-$C_{20}$)hydrocarbyl)-boron compounds. In other embodiments, Group 13 metal compounds are tri(hydrocarbyl)-substituted-aluminum, tri(($C_1$-$C_{20}$)hydrocarbyl)-boron compounds, tri(($C_1$-$C_{10}$)alkyl)aluminum, tri(($C_6$-$C_{18}$)aryl) boron compounds, and halogenated (including perhalogenated) derivatives thereof. In further embodiments, Group 13 metal compounds are tris(fluoro-substituted phenyl)boranes, tris(pentafluorophenyl)borane. In some embodiments, the activating co-catalyst is a tris(($C_1$-$C_{20}$)hydrocarbyl borate (e.g. trityl tetrafluoroborate) or a tri(($C_1$-$C_{20}$)hydrocarbyl)ammonium tetra(($C_1$-$C_{20}$)hydrocarbyl)borane (e.g. bis(octadecyl)methylammonium tetrakis(pentafluorophenyl)borane). As used herein, the term "ammonium" means a nitrogen cation that is a (($C_1$-$C_{20}$)hydrocarbyl)$_4$N$^+$ a (($C_1$-$C_{20}$)hydrocarbyl)$_3$N(H)$^+$, a (($C_1$-$C_{20}$)hydrocarbyl)$_2$N(H)$_2{}^+$, ($C_1$-$C_{20}$)hydrocarbylN(H)$_3{}^+$, or N(H)$_4{}^+$, wherein each ($C_1$-$C_{20}$)hydrocarbyl, when two or more are present, may be the same or different.

Combinations of neutral Lewis acid activating co-catalysts include mixtures comprising a combination of a tri(($C_1$-$C_4$)alkyl)aluminum and a halogenated tri(($C_6$-$C_{18}$)aryl) boron compound, especially a tris(pentafluorophenyl) borane. Other embodiments are combinations of such neutral Lewis acid mixtures with a polymeric or oligomeric alumoxane, and combinations of a single neutral Lewis acid, especially tris(pentafluorophenyl)borane with a polymeric or oligomeric alumoxane. Ratios of numbers of moles of (metal-ligand complex): (tris(pentafluoro-phenylborane): (alumoxane) [e.g., (Group 4 metal-ligand complex):(tris (pentafluoro-phenylborane):(alumoxane)] are from 1:1:1 to 1:10:30, in other embodiments, from 1:1:1.5 to 1:5:10.

The catalyst system that includes the metal-ligand complex of formula (I) may be activated to form an active catalyst composition by combination with one or more cocatalysts, for example, a cation forming cocatalyst, a strong Lewis acid, or combinations thereof. Suitable activating co-catalysts include polymeric or oligomeric aluminoxanes, especially methyl aluminoxane, as well as inert, compatible, noncoordinating, ion forming compounds. Exemplary suitable co-catalysts include, but are not limited to modified methyl aluminoxane (MMAO), bis(hydrogenated tallow alkyl)methyl, tetrakis(pentafluorophenyl)borate(1-) amine, and combinations thereof.

In some embodiments, more than one of the foregoing activating co-catalysts may be used in combination with each other. A specific example of a co-catalyst combination is a mixture of a tri(($C_1$-$C_4$)hydrocarbyl)aluminum, tri(($C_1$-$C_4$)hydrocarbyl)borane, or an ammonium borate with an oligomeric or polymeric alumoxane compound. The ratio of total number of moles of one or more metal-ligand complexes of formula (I) to total number of moles of one or more of the activating co-catalysts is from 1:10,000 to 100:1. In some embodiments, the ratio is at least 1:5000, in some other embodiments, at least 1:1000; and 10:1 or less, and in some other embodiments, 1:1 or less. When an alumoxane alone is used as the activating co-catalyst, preferably the number of moles of the alumoxane that are employed is at least 100 times the number of moles of the metal-ligand complex of formula (I). When tris(pentafluorophenyl)borane alone is used as the activating co-catalyst, in some other embodiments, the number of moles of the tris(pentafluorophenyl) borane that are employed to the total number of moles of one or more metal-ligand complexes of formula (I) from 0.5:1 to 10:1, from 1:1 to 6:1, or from 1:1 to 5:1. The remaining activating co-catalysts are generally employed in approximately mole quantities equal to the total mole quantities of one or more metal-ligand complexes of formula (I).

Polyolefins

The catalytic systems described in the preceding paragraphs are utilized in the polymerization of olefins, primarily ethylene and propylene. In some embodiments, there is only a single type of olefin or α-olefin in the polymerization scheme, creating a homopolymer. However, additional α-olefins may be incorporated into the polymerization procedure. The additional α-olefin co-monomers typically have no more than 20 carbon atoms. For example, the α-olefin co-monomers may have 3 to 10 carbon atoms or 3 to 8 carbon atoms. Exemplary α-olefin co-monomers include, but are not limited to, propylene, 1-butene, 1-pentene, 1-hexene, 1-heptene, 1-octene, 1-nonene, 1-decene, and 4-methyl-1-pentene. For example, the one or more α-olefin co-monomers may be selected from the group consisting of propylene, 1-butene, 1-hexene, and 1-octene: or in the alternative, from the group consisting of 1-hexene and 1-octene.

The ethylene based polymers, for example homopolymers and/or interpolymers (including copolymers) of ethylene and optionally one or more co-monomers such as α-olefins, may comprise from at least 50 percent by weight monomer units derived from ethylene. All individual values and subranges encompassed by "from at least 50 weight percent" are disclosed herein as separate embodiments; for example, the ethylene based polymers, homopolymers and/or interpolymers (including copolymers) of ethylene and optionally one or more co-monomers such as α-olefins may comprise at least 60 weight percent monomer units derived from ethylene; at least 70 weight percent monomer units derived from ethylene; at least 80 weight percent monomer units derived from ethylene; or from 50 to 100 weight percent monomer units derived from ethylene; or from 80 to 100 weight percent units derived from ethylene.

In some embodiments, the ethylene based polymers may comprise at least 90 mole percent units derived from ethylene. All individual values and subranges from at least 90 mole percent are included herein and disclosed herein as separate embodiments. For example, the ethylene based polymers may comprise at least 93 mole percent units derived from ethylene; at least 96 mole percent units; at least 97 mole percent units derived from ethylene; or in the alternative, from 90 to 100 mole percent units derived from ethylene; from 90 to 99.5 mole percent units derived from ethylene; or from 97 to 99.5 mole percent units derived from ethylene.

In some embodiments of the ethylene based polymer, the amount of additional α-olefin is less than 50%; other embodiments include at least 0.5 mole percent (mol %) to 25 mol %; and in further embodiments the amount of additional α-olefin includes at least 5 mol % to 10 mol %. In some embodiments, the additional α-olefin is 1-octene.

Any conventional polymerization processes may be employed to produce the ethylene based polymers. Such conventional polymerization processes include, but are not limited to, solution polymerization processes, gas phase polymerization processes, slurry phase polymerization processes, and combinations thereof using one or more conventional reactors such as loop reactors, isothermal reactors, fluidized bed gas phase reactors, stirred tank reactors, batch reactors in parallel, series, or any combinations thereof, for example.

In one embodiment, the ethylene based polymer may be produced via solution polymerization in a dual reactor system, for example a dual loop reactor system, wherein ethylene and optionally one or more α-olefins are polymerized in the presence of the catalyst system, as described herein, and optionally one or more co-catalysts. In another embodiment, the ethylene based polymer may be produced via solution polymerization in a dual reactor system, for example a dual loop reactor system, wherein ethylene and optionally one or more α-olefins are polymerized in the presence of the catalyst system in this disclosure, and as described herein, and optionally one or more other catalysts. The catalyst system, as described herein, can be used in the first reactor, or second reactor, optionally in combination with one or more other catalysts. In one embodiment, the ethylene based polymer may be produced via solution polymerization in a dual reactor system, for example a dual loop reactor system, wherein ethylene and optionally one or more α-olefins are polymerized in the presence of the catalyst system, as described herein, in both reactors.

In another embodiment, the ethylene based polymer may be produced via solution polymerization in a single reactor system, for example a single loop reactor system, in which ethylene and optionally one or more α-olefins are polymerized in the presence of the catalyst system, as described within this disclosure, and optionally one or more cocatalysts, as described in the preceding paragraphs.

The ethylene based polymers may further comprise one or more additives. Such additives include, but are not limited to, antistatic agents, color enhancers, dyes, lubricants, pigments, primary antioxidants, secondary antioxidants, processing aids. UV stabilizers, and combinations thereof. The ethylene based polymers may contain any amounts of additives. The ethylene based polymers may compromise from about 0 to about 10 percent by the combined weight of such additives, based on the weight of the ethylene based polymers and the one or more additives. The ethylene based polymers may further comprise fillers, which may include, but are not limited to, organic or inorganic fillers. The ethylene based polymers may contain from about 0 to about 20 weight percent fillers such as, for example, calcium carbonate, talc, or Mg(OH)$_2$, based on the combined weight of the ethylene based polymers and all additives or fillers. The ethylene based polymers may further be blended with one or more polymers to form a blend.

In some embodiments, a polymerization process for producing an ethylene-based polymer may include polymerizing ethylene and at least one additional α-olefin in the presence of a catalyst system, wherein the catalyst system incorporates at least one metal-ligand complex of formula (I). The polymer resulting from such a catalyst system that incorporates the metal-ligand complex of formula (I) may have a density according to ASTM D$_{792}$ (incorporated herein by reference in its entirety) from 0.850 g/cm$^3$ to 0.950 g/cm$^3$, from 0.880 g/cm$^3$ to 0.920 g/cm$^3$, from 0.880 g/cm$^3$ to 0.910 g/cm$^3$, or from 0.880 g/cm$^3$ to 0.900 g/cm$^3$, for example.

In another embodiment, the polymer resulting from the catalyst system that includes the metal-ligand complex of formula (I) has a melt flow ratio ($I_{10}/I_2$) from 5 to 15, in which melt index 12 is measured according to ASTM D1238 (incorporated herein by reference in its entirety) at 190° C., and 2.16 kg load, and melt index $I_{10}$ is measured according to ASTM D1238 at 190° C. and 10 kg load. In other embodiments the melt flow ratio ($I_{10}/I_2$) is from 5 to 10, and in others, the melt flow ratio is from 5 to 9.

In some embodiments, the polymer resulting from the catalyst system that includes the metal-ligand complex of formula (I) has a molecular-weight distribution (MWD) from 1 to 25, where MWD is defined as $M_w/M_n$ with $M_w$ being a weight-average molecular weight and $M_n$ being a number-average molecular weight. In other embodiments, the polymers resulting from the catalyst system have a MWD from 1 to 6. Another embodiment includes a MWD from 1 to 3; and other embodiments include MWD from 1.5 to 2.5.

Embodiments of the catalyst systems described in this disclosure yield unique polymer properties as a result of the high molecular weights of the polymers formed and the amount of the co-monomers incorporated into the polymers.

All solvents and reagents are obtained from commercial sources and used as received unless otherwise noted. Anhydrous toluene, hexanes, tetrahydrofuran, and diethyl ether are purified via passage through activated alumina and, in some cases, Q-5 reactant. Solvents used for experiments performed in a nitrogen-filled glovebox are further dried by storage over activated 4 Å molecular sieves. Glassware for moisture-sensitive reactions is dried in an oven overnight prior to use. NMR spectra are recorded on Varian 400-MR and VNMRS-500 spectrometers. LC-MS analyses are performed using a Waters e2695 Separations Module coupled with a Waters 2424 ELS detector, a Waters 2998 PDA detector, and a Waters 3100 ESI mass detector. LC-MS separations are performed on an XBridge C18 3.5 µm 2.1×50 mm column using a 5:95 to 100:0 acetonitrile to water gradient with 0.1% formic acid as the ionizing agent. HRMS analyses are performed using an Agilent 1290 Infinity LC with a Zorbax Eclipse Plus C18 1.8 µm 2.1×50 mm column coupled with an Agilent 6230 TOF Mass Spectrometer with electrospray ionization. $^1$H NMR data are reported as follows: chemical shift (multiplicity (br=broad, s=singlet, d=doublet, t=triplet, q=quartet, p=pentet, sex=sextet, sept=septet and m=multiplet), integration, and assignment). Chemical shifts for $^1$H NMR data are reported in ppm downfield from internal tetramethylsilane (TMS, δ scale) using residual protons in the deuterated solvent as references. $^{13}$C NMR data are determined with $^1$H decoupling, and the chemical shifts are reported downfield from tetramethylsilane (TMS, δ scale) in ppm versus the using residual carbons in the deuterated solvent as references.

General Procedure for PPR Screening Experiments

Polyolefin catalysis screening is performed in a high throughput parallel pressure reactor (PPR) system. The PPR system is composed of an array of 48 single-cell (6×8 matrix) reactors in an inert-atmosphere glovebox. Each cell is equipped with a glass insert with an internal working liquid volume of approximately 5 mL. Each cell has independent controls for pressure, and the liquid in the cell is continuously stirred at 800 rpm. Catalyst solutions, unless otherwise noted, are prepared by dissolving an appropriate amount of a procatalyst in toluene. All liquids (for example, solvent, 1-octene, chain shuttling agent solutions as appropriate to the experiment, and catalyst solutions) are added to the single-cell reactors via robotic syringes. Gaseous reagents (i.e. ethylene, H2) are added to the single-cell reactors via a gas injection port. Prior to each run, the reactors are heated to 80° C., purged with ethylene, and vented.

A portion of Isopar-E is added to the reactors. The reactors are heated to the run temperature and pressured to the appropriate psig with ethylene. Toluene solutions of reagents are added in the following order: (1) 1-octene with 500 nmol of scavenger MMAO-3A; (2) activator (cocatalyst-1, cocatalyst-2, etc); and (3) catalyst.

Each liquid addition is chased with a small amount of Isopar-E so that after the final addition, a total reaction volume of 5 mL is reached. Upon addition of the catalyst, the PPR software begins monitoring the pressure of each cell. The pressure (within approximately 2-6 psig) is maintained by the supplemental addition of ethylene gas by opening the valve at the set point minus 1 psi and closing it when the pressure reached 2 psi higher. All drops in pressure are cumulatively recorded as "Uptake" or "Conversion" of the ethylene for the duration of the run or until the uptake or conversion requested value is reached, whichever occurs first. Each reaction is quenched with the addition of 10% carbon monoxide in argon for 4 minutes at 40-50 psi higher than the reactor pressure. A shorter "Quench Time" means that the catalyst is more active. In order to prevent the formation of too much polymer in any given cell, the reaction is quenched upon reaching a predetermined uptake level (50 psig for 120° C. runs, 75 psig for 150° C. runs). After all the reactions are quenched, the reactors are allowed to cool to 70° C. The reactors are vented, purged for 5 minutes with nitrogen to remove carbon monoxide, and the tubes are removed. The polymer samples are dried in a centrifugal evaporator at 70° C. for 12 hours, weighed to determine polymer yield, and submitted for IR (1-octene incorporation) and GPC (molecular weight) analysis.

SymRAD HT-GPC Analysis

The molecular weight data is determined by analysis on a hybrid Symyx/Dow built Robot-Assisted Dilution High-Temperature Gel Permeation Chromatographer (Sym-RAD-GPC). The polymer samples are dissolved by heating for 120 minutes at 160° C. in 1,2,4-trichlorobenzene (TCB) at a concentration of 10 mg/mL stabilized by 300 parts per million (ppm) of butylated hydroxyl toluene (BHT). Each sample was diluted to 1 mg/mL immediately before the injection of a 250 µL aliquot of the sample. The GPC is equipped with two Polymer Labs PLgel 10 µm MIXED-B columns (300×10 mm) at a flow rate of 2.0 mL/minute at 160° C. Sample detection is performed using a PolyChar IR4 detector in concentration mode. A conventional calibration of narrow polystyrene (PS) standards is utilized with apparent units adjusted to homo-polyethylene (PE) using known Mark-Houwink coefficients for PS and PE in TCB at this temperature.

1-Octene Incorporation IR Analysis

The running of samples for the HT-GPC analysis precedes the IR analysis. For the IR analysis, a 48-well HT silicon wafer is utilized for deposition and analysis of 1-octene incorporation of samples. For the analysis, the samples are heated to 160° C. for less than or equal to 210 minutes; the samples are reheated to remove magnetic GPC stir bars and are shaken with glass-rod stir bars on a J-KEM Scientific heated robotic shaker. Samples are deposited while being heated using a Tecan MiniPrep 75 deposition station, and the 1,2,4-trichlorobenzene is evaporated off the deposited wells of the wafer at 160° C. under nitrogen purge. The analysis of 1-octene is performed on the HT silicon wafer using a NEXUS 670 E.S.P. FT-IR.

Batch Reactor Polymerization Procedure

The batch reactor polymerization reactions are conducted in a 4 L Parr™ batch reactor. The reactor is heated by an electrical heating mantle, and is cooled by an internal serpentine cooling coil containing cooling water. Both the reactor and the heating/cooling system are controlled and monitored by a Camile™ TG process computer. The bottom of the reactor is fitted with a dump valve that empties the reactor contents into a stainless steel dump pot. The dump pot is prefilled with a catalyst kill solution (typically 5 mL of an Irgafos/Irganox/toluene mixture). The dump pot is vented to a 30 gallon blow-down tank, with both the pot and the tank purged with nitrogen. All solvents used for polymerization or catalyst makeup are run through solvent purification columns to remove any impurities that may affect polymerization. The 1-octene and IsoparE are passed through two columns, the first containing A2 alumina, the second containing Q5. The ethylene is passed through two columns, the first containing A204 alumina and 4Å molecular sieves, the second containing Q5 reactant. The $N_2$, used for transfers, is passed through a single column containing A204 alumina, 4Å molecular sieves and Q5.

The reactor is loaded first from the shot tank that may contain IsoparE solvent and/or 1-octene, depending on reactor load. The shot tank is filled to the load set points by use of a lab scale to which the shot tank is mounted. After liquid feed addition, the reactor is heated up to the polymerization temperature set point. If ethylene is used, it is added to the reactor when the ethylene is at the reaction temperature to maintain reaction pressure set point. The amount of ethylene added is monitored by a micro-motion flow meter. For some experiments, the standard conditions at 120° C. are 88 g ethylene and 568 g 1-octene in 1155 g of IsoparE, and the standard conditions at 150° C. are 81 g ethylene and 570 g 1-octene in 1043 g of IsoparE.

The procatalyst and activators are mixed with the appropriate amount of purified toluene to achieve a molarity solution. The procatalyst and activators are handled in an inert glove box, drawn into a syringe and pressure transferred into the catalyst shot tank. The syringe is rinsed three times with 5 mL of toluene. Immediately after the catalyst is added, the run timer begins. If ethylene is used, it is added by the Camile to maintain reaction pressure set point in the reactor. The polymerization reactions are run for 10 minutes, then the agitator is stopped, and the bottom dump valve is opened to empty reactor contents to the dump pot. The contents of the dump pot are poured into trays and placed in a lab hood where the solvent was evaporated off overnight. The trays containing the remaining polymer are transferred to a vacuum oven, where they are heated up to 140° C. under vacuum to remove any remaining solvent. After the trays cool to ambient temperature, the polymers were weighed for yield to measure efficiencies, and submitted for polymer testing.

EXAMPLES

Examples 1 to 33 are synthetic procedures for ligand intermediates, ligands, and isolated procatalysts Structures of Ligands 1-8 are provided in The FIGURE. Procatalysts 1 to 16 were synthesized from the Ligands 1-8. One or more features of the present disclosure are illustrated in view of the examples as follows:

Example 1: Synthesis of Procatalyst 1

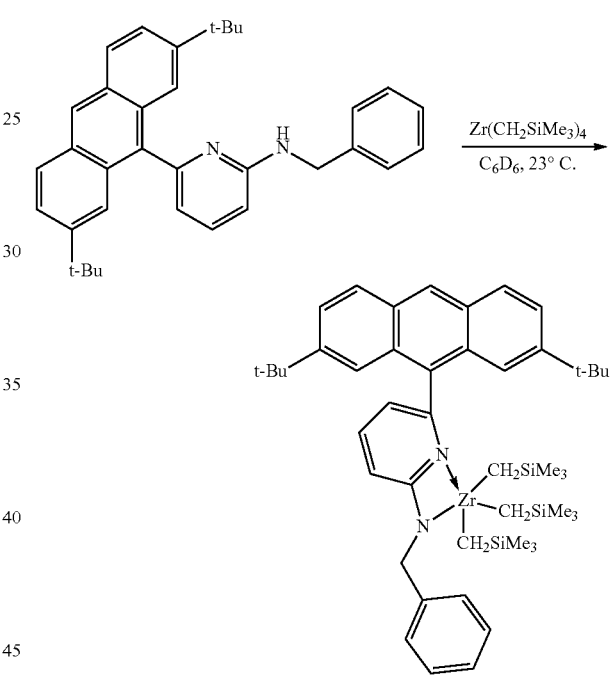

To a clear colorless solution of $Zr(CH_2SiMe_3)_4$ (12.3 mg, 0.0279 mmol, 1.10 eq) in $C_6D_6$ (0.50 mL) in a nitrogen filled glovebox at 23° C. was added a solution of the aminopyridine (12.0 mg, 0.0254 mmol, 1.00 eq) in $C_6D_6$ (1.2 mL) in a slow dropwise manner. The now canary yellow solution was stirred vigorously (500 rpm) for 2 hrs upon which an aliquot was removed, and NMR indicated full conversion of the starting ligand to the mono-ligated complex. The resultant solution was concentrated, suspended in anhydrous deoxygenated pentane (3 mL), concentrated, this suspension/concentration process was repeated 3× more to remove residual $C_6D_6$ and triturate insoluble impurities, the canary yellow foam was suspended in pentane (3 mL), stirred vigorously (500 rpm) for 1 min, filtered through a 0.45 μm PTFE submicron filter, rinsed with pentane (3×3 mL), and the filtrate was concentrated to afford the zirconium complex as a canary yellow amorphous foam (20.9 mg, 0.0253 mmol, 100%). NMR indicated product.

$^1$H NMR (500 MHz, Benzene-$d_6$) δ 8.24 (s, 1H), 7.84 (dd, J=8.9, 0.7 Hz, 2H), 7.80 (dd, J=1.9, 0.9 Hz, 2H), 7.40 (ddd, J=7.9, 3.4, 1.5 Hz, 4H), 7.28 (t, J=7.7 Hz, 2H), 7.14-7.09 (m, 1H), 6.90 (ddd, J=8.6, 7.2, 0.6 Hz, 1H), 6.28 (dd, J=7.2, 0.9 Hz, 1H), 5.85 (dd, J=8.6, 0.9 Hz, 1H), 4.77 (s, 2H), 1.33 (s, 18H), 1.24 (s, 2H), 0.62 (s, 4H), −0.03 (s, 18H), −0.04 (s, 9H). $^{13}$C NMR (126 MHz, Benzene-d$_6$) δ 170.84, 155.30, 148.25, 141.82, 140.01, 132.32, 130.33, 129.90, 128.49, 128.41, 126.98, 126.67, 126.49, 124.55, 119.76, 113.96, 103.76, 72.22, 51.93, 34.90, 30.54, 2.42, −0.39.

Example 2: Synthesis of Procatalyst 2

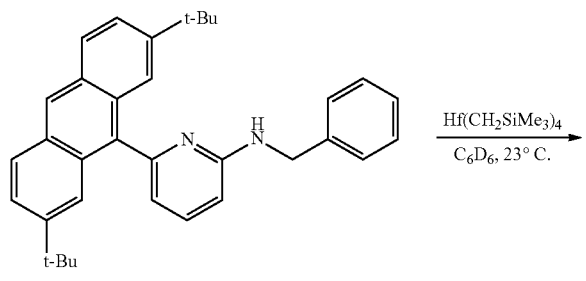

To a clear colorless solution of Hf(CH$_2$SiMe$_3$)$_4$ (9.2 mg, 0.0175 mmol, 1.10 eq) in C$_6$D$_6$ (0.50 mL) in a nitrogen filled glovebox at 23° C. was added a solution of the aminopyridine (7.5 mg, 0.0159 mmol, 1.00 eq) in C$_6$D$_6$ (1.2 mL) in a slow dropwise manner. The now canary yellow solution was stirred vigorously (500 rpm) for 2 hrs upon which an aliquot was removed and NMR indicated full conversion of the starting ligand to the mono-ligated complex. The resultant solution was concentrated, suspended in anhydrous deoxygenated pentane (3 mL), concentrated, this suspension/concentration process was repeated 3× more to remove residual C$_6$D$_6$ and triturate insoluble impurities, the canary yellow foam was suspended in pentane (3 mL), stirred vigorously (500 rpm) for 1 min, filtered through a 0.45 μm PTFE submicron filter, rinsed with pentane (3×3 mL), and the filtrate was concentrated to afford the hafnium complex as a canary yellow amorphous foam (14.5 mg, 0.0159 mmol, 100%). NMR indicated product.

$^1$H NMR (400 MHz, Benzene-d$_6$) δ 8.23 (s, 1H), 7.82 (dt, J=8.9, 0.6 Hz, 2H), 7.76 (dt, J=1.7, 0.8 Hz, 2H), 7.41 (td, J=4.5, 1.9 Hz, 2H), 7.39-7.35 (m, 2H), 7.28-7.23 (m, 2H), 6.88 (dd, J=8.6, 7.2 Hz, 2H), 6.30 (dd, J=7.2, 0.9 Hz, 1H), 5.79 (dd, J=8.6, 0.9 Hz, 1H), 4.83 (s, 2H), 1.32 (s, 18H), 0.05 (s, 6H), −0.04 (s, 18H), −0.06 (s, 9H). $^{13}$C NMR (101 MHz, Benzene-d$_6$) δ 158.57, 157.42, 148.26, 147.01, 139.87, 136.86, 130.41, 130.14, 128.25, 128.20, 126.70, 126.40, 125.82, 124.14, 121.04, 119.75, 116.07, 105.02, 78.34, 45.54, 34.74, 30.58, 2.75, −0.40.

Example 3: Synthesis of Procatalyst 3

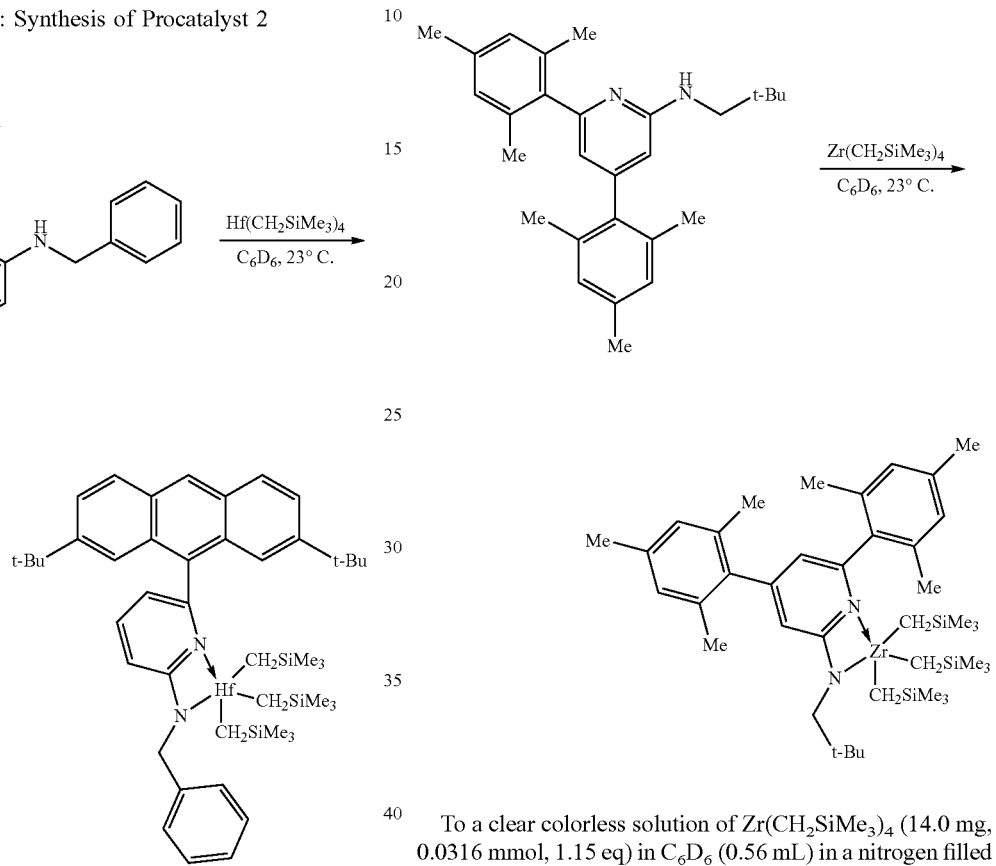

To a clear colorless solution of Zr(CH$_2$SiMe$_3$)$_4$ (14.0 mg, 0.0316 mmol, 1.15 eq) in C$_6$D$_6$ (0.56 mL) in a nitrogen filled glovebox at 23° C. was added a solution of the aminopyridine (11.0 mg, 0.0275 mmol, 1.00 eq) in C$_6$D$_6$ (0.44 mL) in a slow dropwise manner. The now canary yellow solution was stirred vigorously (500 rpm) for 2 hrs upon which an aliquot was removed and NMR indicated full conversion of the starting ligand to the mono-ligated complex. The resultant solution was concentrated, suspended in anhydrous deoxygenated pentane (3 mL), concentrated, this suspension/concentration process was repeated 3× more to remove residual C$_6$D$_6$ triturate insoluble impurities, the canary yellow foam was suspended in pentane (3 mL), stirred vigorously (500 rpm) for 1 min, filtered through a 0.45 μm PTFE submicron filter, rinsed with pentane (3×3 mL), and the filtrate was concentrated to afford the zirconium complex as a pale yellow amorphous foam (19.3 mg, 0.0257 mmol, 93%). NMR indicated product.

$^1$H NMR (500 MHz, Benzene-d$_6$) δ 6.79-6.77 (m, 2H), 6.75-6.72 (m, 2H), 6.06 (d, J=1.3 Hz, 1H), 5.61 (d, J=1.2 Hz, 1H), 3.22 (s, 2H), 2.15 (s, 6H), 2.14 (s, 3H), 2.13 (s, 3H), 2.09 (s, 6H), 0.94 (s, 6H), 0.93 (s, 9H), 0.21 (s, 27H). $^{13}$C NMR (126 MHz, Benzene-d$_6$) δ 170.76, 156.31, 155.77, 137.78, 137.36, 136.94, 135.82, 135.14, 134.27, 128.49, 128.18, 112.80, 103.42, 70.99, 60.01, 34.52, 28.40, 20.69, 20.27, 19.96, 2.81.

Example 4: Synthesis of Procatalyst 4

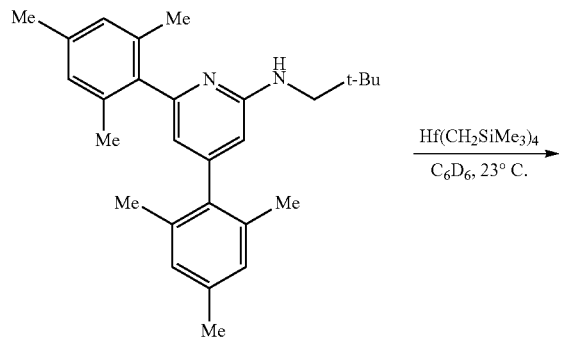

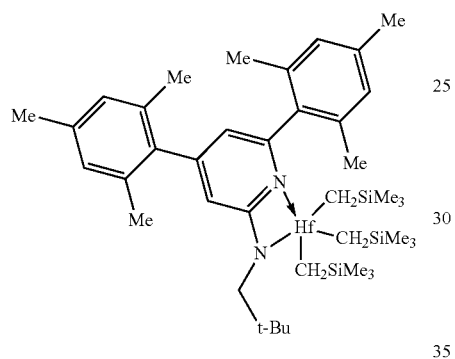

To a clear colorless solution of Hf(CH₂SiMe₃)₄ (24.3 mg, 0.0459 mmol, 1.15 eq) in C₆D₆ (1.0 mL) in a nitrogen filled glovebox at 23° C. was added a solution of the aminopyridine (16.0 mg, 0.0399 mmol, 1.00 eq) in C₆D₆ (0.64 mL) in a slow dropwise manner. The now pale golden yellow solution was stirred vigorously (500 rpm) for 2 hrs upon which an aliquot was removed and NMR indicated full conversion of the starting ligand to the mono-ligated complex. The resultant solution was concentrated, suspended in anhydrous deoxygenated pentane (3 mL), concentrated, this suspension/concentration process was repeated 3× more to remove residual C₆D₆ triturate insoluble impurities, the canary yellow foam was suspended in pentane (3 mL), stirred vigorously (500 rpm) for 1 min, filtered through a 0.45 μm PTFE submicron filter, rinsed with pentane (3×3 mL), and the filtrate was concentrated to afford the hafnium complex as a pale yellow amorphous foam (31.3 mg, 0.0372 mmol, 93%). NMR indicated product.

$^1$H NMR (500 MHz, Benzene-$d_6$) δ 6.79-6.76 (m, 2H), 6.76-6.73 (m, 2H), 6.04 (d, J=1.2 Hz, 1H), 5.62 (dd, J=1.1, 0.6 Hz, 1H), 3.33 (s, 2H), 2.16 (s, 6H), 2.14 (s, 3H), 2.13 (s, 3H), 2.08 (s, 6H), 0.92 (s, 9H), 0.37 (s, 6H), 0.22 (s, 27H). $^{13}$C NMR (126 MHz, Benzene-$d_6$) δ 169.56, 156.26, 155.98, 137.87, 137.31, 137.00, 135.60, 135.11, 134.27, 128.46, 128.19, 113.05, 103.92, 77.13, 59.44, 34.53, 28.41, 20.69, 20.32, 19.99, 3.20.

Example 5: Synthesis of Procatalyst 5

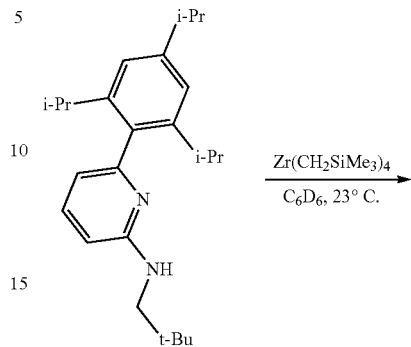

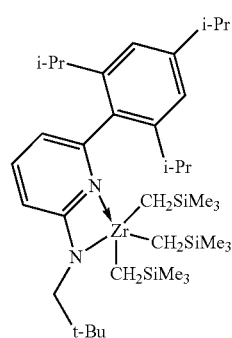

To a clear colorless solution of Zr(CH₂SiMe₃)₄ (15.2 mg, 0.0345 mmol, 1.15 eq) in C₆D₆ (1.0 mL) in a nitrogen filled glovebox at 23° C. was added a solution of the aminopyridine (11.0 mg, 0.0300 mmol, 1.00 eq) in C₆D₆ (0.44 mL) in a slow dropwise manner. The now pale golden yellow solution was stirred vigorously (500 rpm) for 2 hrs upon which an aliquot was removed and NMR indicated full conversion of the starting ligand to the mono-ligated complex. The resultant solution was concentrated, suspended in anhydrous deoxygenated pentane (3 mL), concentrated, this suspension/concentration process was repeated 3× more to remove residual C₆D₆ triturate insoluble impurities, the canary yellow foam was suspended in pentane (3 mL), stirred vigorously (500 rpm) for 1 min, filtered through a 0.45 μm PTFE submicron filter, rinsed with pentane (3×3 mL), and the filtrate was concentrated to afford the zirconium complex as a pale yellow amorphous foam (18.9 mg, 0.0263 mmol, 88%). NMR indicated product.

$^1$H NMR (500 MHz, Benzene-$d_6$) δ 7.10 (s, 2H), 6.90 (ddd, J=8.8, 7.2, 0.7 Hz, 1H), 6.09 (dt, J=7.2, 0.8 Hz, 1H), 5.99 (dd, J=8.7, 0.8 Hz, 1H), 3.24 (s, 2H), 2.98 (q, J=6.8 Hz, 1H), 2.83 (dt, J=14.6, 7.2 Hz, 2H), 1.33 (d, J=6.8 Hz, 6H), 1.24 (dt, J=7.1, 1.0 Hz, 6H), 1.05 (d, J=6.7 Hz, 6H), 0.95 (br s, 15H), 0.21 (s, 27H). $^{13}$C NMR (126 MHz, Benzene-$d_6$) δ 171.63, 155.93, 149.51, 146.07, 140.49, 134.18, 120.96, 112.87, 102.90, 72.18, 60.46, 34.47, 34.38, 30.43, 28.70, 27.03, 26.03, 23.93, 22.76, 2.80.

Example 6: Synthesis of Procatalyst 6

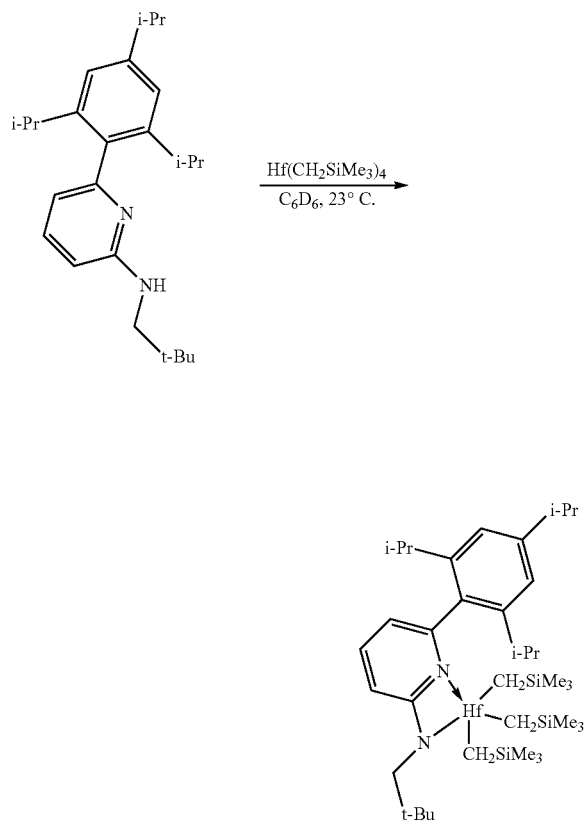

To a clear colorless solution of Hf(CH$_2$SiMe$_3$)$_4$ (26.0 mg, 0.0491 mmol, 1.20 eq) in C$_6$D$_6$ (1.0 mL) in a nitrogen filled glovebox at 23° C. was added a solution of the aminopyridine (15.0 mg, 0.0409 mmol, 1.00 eq) in C$_6$D$_6$ (0.60 mL) in a slow dropwise manner. The now pale golden yellow solution was stirred vigorously (500 rpm) for 2 hrs upon which an aliquot was removed and NMR indicated full conversion of the starting ligand to the mono-ligated complex. The resultant solution was concentrated, suspended in anhydrous deoxygenated pentane (3 mL), concentrated, this suspension/concentration process was repeated 3× more to remove residual C$_6$D$_6$ triturate insoluble impurities, the canary yellow foam was suspended in pentane (3 mL), stirred vigorously (500 rpm) for 1 min, filtered through a 0.45 μm PTFE submicron filter, rinsed with pentane (3×3 mL), and the filtrate was concentrated to afford the hafnium complex as a pale yellow amorphous foam (31.3 mg, 0.0388 mmol, 95%). NMR indicated product.

$^1$H NMR (500 MHz, Benzene-d$_6$) δ 7.11 (br s, 2H), 6.90 (dd, J=8.8, 7.2 Hz, 1H), 6.14 (dd, J=7.2, 0.8 Hz, 1H), 5.97 (dd, J=8.8, 0.9 Hz, 1H), 3.34 (s, 2H), 2.87-2.73 (m, 3H), 1.34 (d, J=6.8 Hz, 6H), 1.24 (d, J=6.9 Hz, 6H), 1.04 (d, J=6.7 Hz, 6H), 0.93 (d, J=2.4 Hz, 9H), 0.36 (s, 6H), 0.21 (s, 27H). $^{13}$C NMR (126 MHz, Benzene-d$_6$) δ 170.30, 155.78, 149.61, 146.10, 140.59, 134.00, 120.98, 113.10, 103.38, 78.31, 59.91, 34.48, 34.41, 30.45, 28.71, 26.14, 23.92, 22.66, 3.15.

Example 7: Synthesis of Procatalyst 7

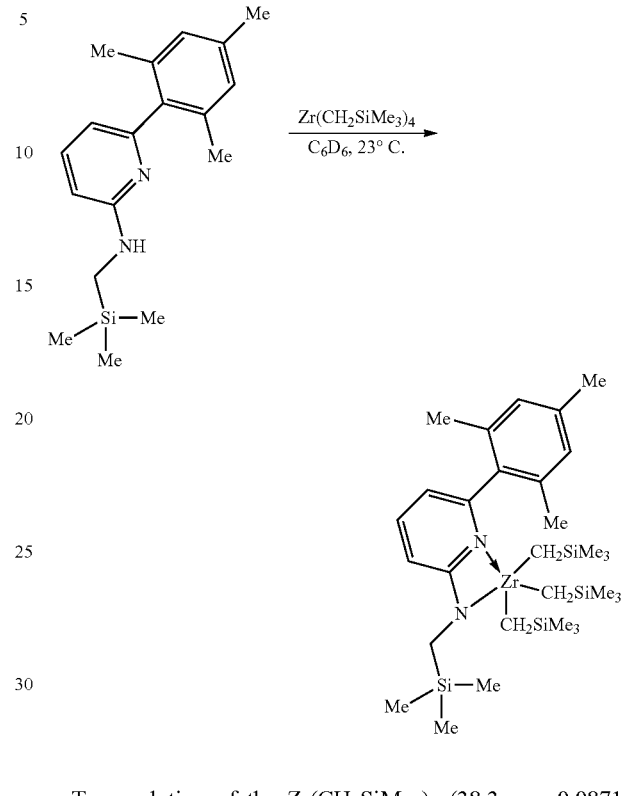

To a solution of the Zr(CH$_2$SiMe$_3$)$_4$ (38.3 mg, 0.0871 mmol, 1.30 eq) in a nitrogen filled glovebox in anhydrous deoxygenated C$_6$D$_6$ (1.0 mL) at 23° C. was added a solution of the aminopyridine (20.0 mg, 0.0670 mmol, 1.00 eq) in C$_6$D$_6$ (0.80 mL) in a dropwise manner. The pale golden yellow solution was stirred vigorously (1000 rpm) for 1 hr, concentrated, suspended in anhydrous deoxygenated pentane (3 mL), concentrated, the suspension/concentration process was repeated 2× more to remove residual C$_6$D$_6$ and Me$_4$Si, the resultant mixture was suspended in pentane (3 mL), filtered through a 0.20 μm PTFE filter, rinsed with pentane (3×3 mL), and the filtrate was concentrated to afford the zirconium complex (42.5 mg, 0.0654 mmol, 98%). NMR indicated product.

$^1$H NMR (500 MHz, Benzene-d$_6$) δ 6.94 (ddd, J=8.6, 7.2, 0.6 Hz, 1H), 6.72 (s, 2H), 5.86-5.82 (m, 1H), 5.80 (dd, J=8.6, 0.9 Hz, 1H), 3.09 (s, 2H), 2.11 (s, 3H), 2.09 (s, 6H), 0.89 (s, 6H), 0.20 (s, 27H). $^{13}$C NMR (126 MHz, Benzene-d$_6$) δ 169.89, 156.39, 141.68, 137.80, 135.79, 135.07, 128.46, 110.59, 102.08, 70.85, 40.53, 20.66, 20.15, 2.79.

Example 8: Synthesis of Procatalyst 8

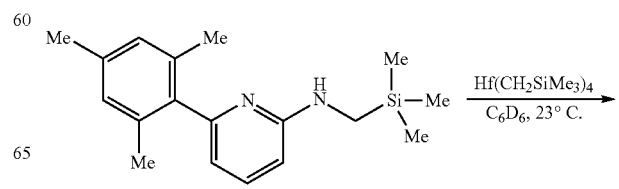

-continued

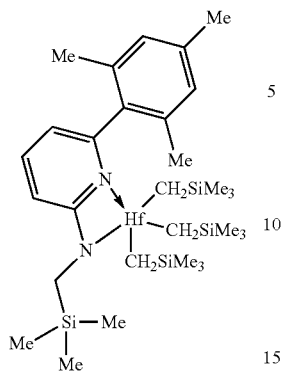

To a clear colorless solution of Hf(CH$_2$SiMe$_3$)$_4$ (32.0 mg, 0.0603 mmol, 1.20 eq) in C$_6$D$_6$ (1.0 mL) in a nitrogen filled glovebox at 23° C. was added a solution of the aminopyridine (15.0 mg, 0.0503 mmol, 1.00 eq) in C$_6$D$_6$ (0.60 mL) in a slow dropwise manner. The now pale golden yellow solution was stirred vigorously (500 rpm) for 2 hrs upon which an aliquot was removed and NMR indicated full conversion of the starting ligand to the mono-ligated complex. The resultant solution was concentrated, suspended in anhydrous deoxygenated pentane (3 mL), concentrated, this suspension/concentration process was repeated 3× more to remove residual C$_6$D$_6$ triturate insoluble impurities, the canary yellow foam was suspended in pentane (3 mL), stirred vigorously (500 rpm) for 1 min, filtered through a 0.45 μm PTFE submicron filter, rinsed with pentane (3×3 mL), and the filtrate was concentrated to afford the hafnium complex as a pale golden yellow amorphous foam (35.4 mg, 0.0479 mmol, 95%). NMR indicated product.

$^1$H NMR (500 MHz, Benzene-d$_6$) δ 6.94 (dd, J=8.6, 7.2 Hz, 1H), 6.74-6.70 (m, 2H), 5.88 (dd, J=7.2, 0.9 Hz, 1H), 5.77 (dd, J=8.6, 0.9 Hz, 1H), 3.15 (s, 2H), 2.10 (s, 3H), 2.09 (s, 3H), 2.09 (s, 3H), 0.31 (s, 6H), 0.20 (s, 27H), 0.08 (s, 9H). $^{13}$C NMR (126 MHz, Benzene-d$_6$) δ 168.72, 156.30, 141.88, 137.89, 135.58, 135.05, 128.45, 128.19, 110.75, 102.41, 77.07, 39.91, 20.65, 20.20, 20.14, 3.16, −1.32.

Example 9: Synthesis of Procatalyst 9

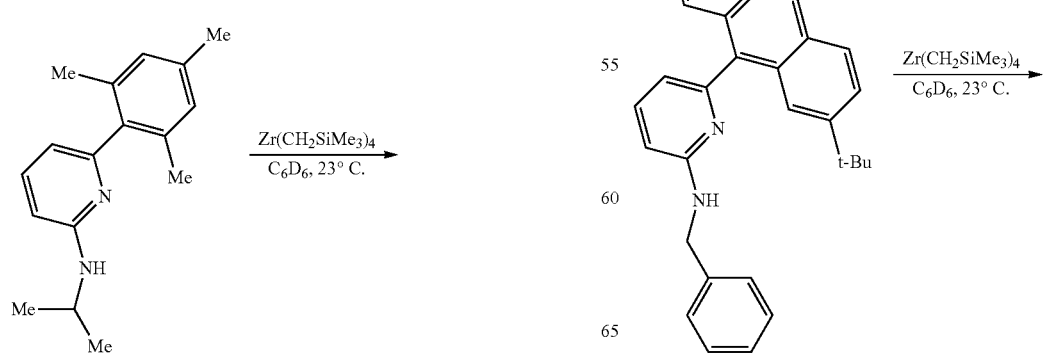

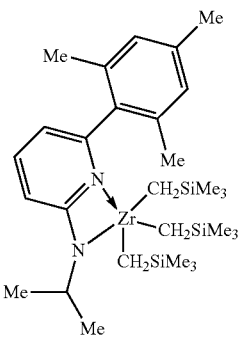

To a clear colorless solution of the Zr(CH$_2$SiMe$_3$)$_4$ (33.8 mg, 0.0707 mmol, 1.20 eq) in a nitrogen filled glovebox in anhydrous deoxygenated C$_6$D$_6$ (1.0 mL) at 23° C. was added a solution of the aminopyridine (15.0 mg, 0.0590 mmol, 1.00 eq) in C$_6$D$_6$ (0.60 mL) in a dropwise manner. The now canary golden yellow solution was stirred vigorously (1000 rpm) for 2 hrs, an aliquot was removed and NMR indicated complete conversion of the starting ligand, the solution was concentrated, suspended in anhydrous deoxygenated pentane (3 mL), concentrated, the suspension/concentration process was repeated 2× more to remove residual C$_6$D$_6$ and Me$_4$Si, the resultant mixture was suspended in pentane (3 mL), filtered through a 0.20 μm PTFE filter, rinsed with pentane (3×3 mL), and the filtrate was concentrated to afford the zirconium complex as a canary yellow foam (35.7 mg, 0.0589 mmol, 99%). NMR indicated pure product.

$^1$H NMR (500 MHz, Benzene-d$_6$) δ 6.96-6.92 (m, 1H), 6.71 (d, J=1.4 Hz, 2H), 5.92 (dt, J=7.2, 0.8 Hz, 1H), 5.82-5.78 (m, 1H), 3.36 (hept, J=6.5 Hz, 1H), 2.14 (s, 3H), 2.08 (s, 6H), 1.24 (d, J=6.4 Hz, 6H), 0.89 (s, 6H), 0.17 (s, 27H). $^{13}$C NMR (126 MHz, Benzene-d$_6$) δ 170.16, 157.14, 141.61, 137.71, 136.21, 135.18, 128.27, 111.86, 102.44, 69.17, 47.59, 23.23, 20.70, 20.19, 2.76.

Example 10: Synthesis of Procatalyst 11

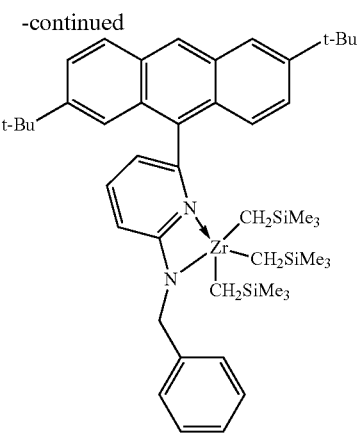

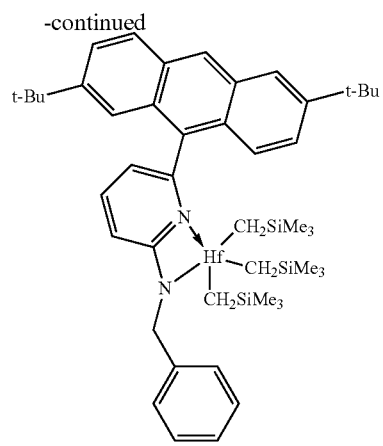

To a clear colorless solution of the Zr(CH$_2$SiMe$_3$)$_4$ (18.2 mg, 0.0413 mmol, 1.30 eq) in a nitrogen filled glovebox in anhydrous deoxygenated C$_6$D$_6$ (1.0 mL) at 23° C. was added a solution of the aminopyridine (15.0 mg, 0.0317 mmol, 1.00 eq) in C$_6$D$_6$ (0.60 mL) in a dropwise manner. The now canary golden yellow solution was stirred vigorously (1000 rpm) for 1 hr, an aliquot was removed and NMR indicated complete conversion of the starting ligand, the solution was concentrated, suspended in anhydrous deoxygenated pentane (3 mL), concentrated, the suspension/concentration process was repeated 2× more to remove residual C$_6$D$_6$ and Me$_4$Si, the resultant mixture was suspended in pentane (3 mL), filtered through a 0.20 μm PTFE filter, rinsed with pentane (3×3 mL), and the filtrate was concentrated to afford the zirconium complex as a canary yellow foam (25.7 mg, 0.0311 mmol, 98%). NMR indicated product.

$^1$H NMR (500 MHz, Benzene-d$_6$) δ 8.23 (s, 1H), 7.87-7.76 (m, 4H), 7.42 (ddd, J=9.4, 7.3, 1.9 Hz, 4H), 7.26 (t, J=7.7 Hz, 2H), 7.13-7.08 (m, 1H), 6.93 (dd, J=8.7, 7.3 Hz, 1H), 6.27 (dd, J=7.2, 0.9 Hz, 1H), 5.89 (dd, J=8.7, 0.9 Hz, 1H), 4.85-4.62 (m, 2H), 1.33 (s, 9H), 1.32 (s, 9H), 0.70-0.58 (m, 6H), −0.02 (s, 27H). $^{13}$C NMR (126 MHz, Benzene-d$_6$) δ 170.82, 154.99, 147.95, 147.17, 141.78, 140.03, 131.96, 131.31, 130.34, 129.96, 128.70, 128.54, 128.36, 126.76, 126.66, 125.82, 125.78, 124.76, 122.84, 119.93, 113.93, 103.72, 72.19, 52.32, 34.87, 34.50, 30.59, 30.51, 2.49.

Example 11: Synthesis of Procatalyst 12

To a clear colorless solution of the Hf(CH$_2$SiMe$_3$)$_4$ (18.1 mg, 0.0344 mmol, 1.30 eq) in a nitrogen filled glovebox in anhydrous deoxygenated C$_6$D$_6$ (1.0 mL) at 23° C. was added a solution of the aminopyridine (12.5 mg, 0.0265 mmol, 1.00 eq) in C$_6$D$_6$ (0.50 mL) in a dropwise manner. The now canary golden yellow solution was stirred vigorously (1000 rpm) for 1 hr, an aliquot was removed and NMR indicated complete conversion of the starting ligand, the solution was concentrated, suspended in anhydrous deoxygenated pentane (3 mL), concentrated, the suspension/concentration process was repeated 2× more to remove residual C$_6$D$_6$ and Me$_4$Si, the resultant mixture was suspended in pentane (3 mL), filtered through a 0.20 μm PTFE filter, rinsed with pentane (3×3 mL), and the filtrate was concentrated to afford the hafnium complex as a canary yellow foam (22.5 mg, 0.0247 mmol, 93%). NMR indicated product.

$^1$H NMR (500 MHz, Benzene-d$_6$) δ 8.24 (s, 1H), 7.87-7.78 (m, 3H), 7.74 (dt, J=1.8, 0.8 Hz, 1H), 7.45-7.39 (m, 3H), 7.28-7.23 (m, 2H), 7.14-7.10 (m, 1H), 7.09 (d, J=7.4 Hz, 1H), 6.92 (ddd, J=8.6, 7.2, 0.5 Hz, 1H), 6.31 (dd, J=7.2, 0.9 Hz, 1H), 5.86 (dd, J=8.6, 0.8 Hz, 1H), 4.91 (d, J=16.2 Hz, 1H), 4.75 (d, J=16.2 Hz, 1H), 1.33 (s, 9H), 1.32 (s, 9H), 0.13 (d, J=12.0 Hz, 3H), 0.03 (d, J=12.2 Hz, 3H), −0.02 (s, 27H). $^{13}$C NMR (126 MHz, Benzene-d$_6$) δ 169.43, 154.88, 147.96, 147.18, 141.92, 139.91, 131.71, 131.32, 130.35, 129.97, 128.60, 128.54, 128.37, 126.76, 126.52, 125.83, 124.78, 122.85, 119.99, 114.23, 104.17, 78.24, 51.99, 34.87, 34.51, 30.59, 30.50, 2.84.

Example 12: Synthesis of Procatalyst 13

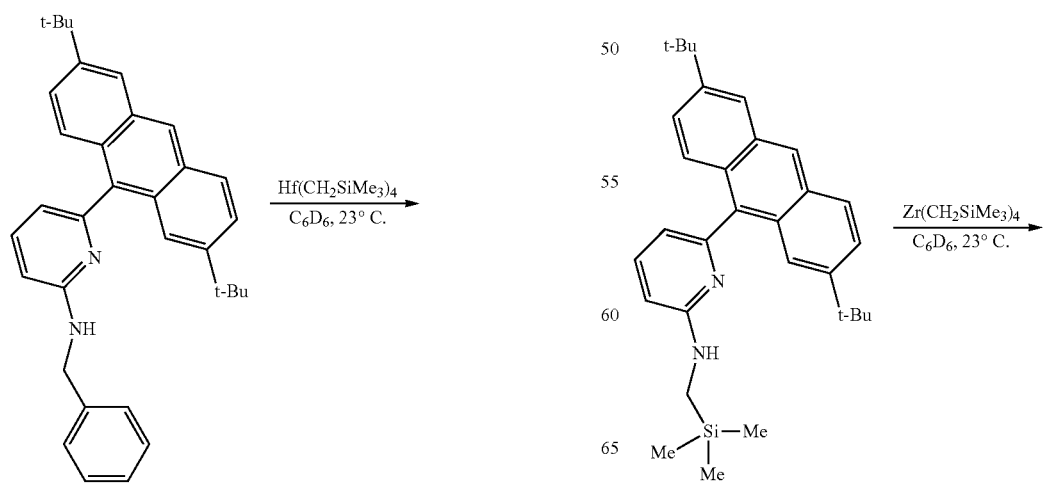

-continued

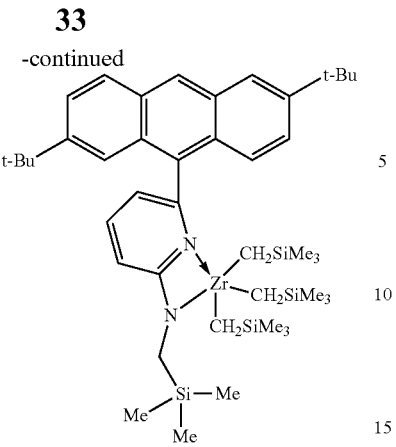
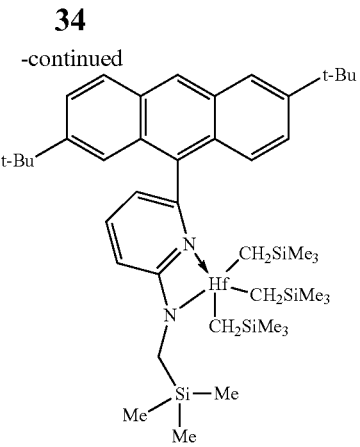

To a clear colorless solution of the Zr(CH$_2$SiMe$_3$)$_4$ (14.6 mg, 0.0333 mmol, 1.30 eq) in a nitrogen filled glovebox in anhydrous deoxygenated C$_6$D$_6$ (1.0 mL) at 23° C. was added a solution of the aminopyridine (12.0 mg, 0.0256 mmol, 1.00 eq) in C$_6$D$_6$ (0.48 mL) in a dropwise manner. The now canary golden yellow solution was stirred vigorously (1000 rpm) for 20 mins, an aliquot was removed and NMR indicated complete conversion of the starting ligand, the solution was concentrated, suspended in anhydrous deoxygenated pentane (3 mL), concentrated, the suspension/concentration process was repeated 2× more to remove residual C$_6$D$_6$ and Me$_4$Si, the resultant mixture was suspended in pentane (3 mL), filtered through a 0.20 μm PTFE filter, rinsed with pentane (3×3 mL), and the filtrate was concentrated to afford the zirconium complex as a canary yellow foam (20.2 mg, 0.0246 mmol, 96%). NMR indicated pure product.

$^1$H NMR (500 MHz, Benzene-d$_6$) δ 8.22 (s, 1H), 7.89-7.78 (m, 4H), 7.46-7.39 (m, 2H), 7.10-7.03 (m, 1H), 6.23 (dd, J=7.2, 0.9 Hz, 1H), 5.98 (dd, J=8.7, 0.9 Hz, 1H), 3.25 (d, J=15.1 Hz, 1H), 3.08 (d, J=15.1 Hz, 1H), 1.32 (s, 9H), 1.31 (s, 9H), 0.66-0.57 (m, 6H), 0.17 (s, 6H), 0.04 (s, 27H). $^{13}$C NMR (126 MHz, Benzene-d$_6$) δ 169.94, 154.84, 147.80, 147.11, 141.51, 132.15, 131.30, 130.37, 129.93, 128.57, 128.35, 125.96, 125.74, 124.75, 122.88, 120.10, 112.61, 102.78, 71.85, 40.60, 34.85, 34.50, 30.60, 30.55, 2.65, −1.32.

To a clear colorless solution of the Hf(CH$_2$SiMe$_3$)$_4$ (27.8 mg, 0.0527 mmol, 1.30 eq) in a nitrogen filled glovebox in anhydrous deoxygenated C$_6$D$_6$ (1.0 mL) at 23° C. was added a solution of the aminopyridine (19.0 mg, 0.0405 mmol, 1.00 eq) in C$_6$D$_6$ (0.76 mL) in a dropwise manner. The now canary golden yellow solution was stirred vigorously (1000 rpm) for 30 mins, an aliquot was removed and NMR indicated complete conversion of the starting ligand, the solution was concentrated, suspended in anhydrous deoxygenated pentane (3 mL), concentrated, the suspension/concentration process was repeated 2× more to remove residual C$_6$D$_6$ and Me$_4$Si, the resultant mixture was suspended in pentane (3 mL), filtered through a 0.20 μm PTFE filter, rinsed with pentane (3×3 mL), and the filtrate was concentrated to afford the hafnium complex as a canary yellow foam (36.2 mg, 0.0399 mmol, 98%). NMR indicated product.

$^1$H NMR (400 MHz, Benzene-d$_6$) δ 8.21 (s, 1H), 7.88-7.79 (m, 3H), 7.76 (dt, J=1.9, 0.8 Hz, 1H), 7.43 (ddd, J=16.8, 9.1, 1.8 Hz, 2H), 7.06 (dd, J=8.7, 7.2 Hz, 1H), 6.25 (dd, J=7.2, 0.8 Hz, 1H), 5.93 (dd, J=8.7, 0.9 Hz, 1H), 3.30 (d, J=15.2 Hz, 1H), 3.12 (d, J=15.2 Hz, 1H), 1.30 (s, 9H), 1.30 (s, 9H), 0.16 (s, 2H), 0.14 (s, 9H), 0.04 (s, 2H), 0.01 (s, 2H), −0.00 (s, 27H). $^{13}$C NMR (101 MHz, Benzene-d$_6$) δ 168.75, 154.76, 147.77, 147.10, 141.64, 131.93, 131.28, 130.36, 129.93, 128.47, 128.35, 126.05, 125.71, 124.77, 122.87, 120.14, 112.84, 103.06, 77.83, 39.91, 34.84, 34.50, 30.58, 30.53, 3.00, −1.36.

Example 13: Synthesis of Procatalyst 14

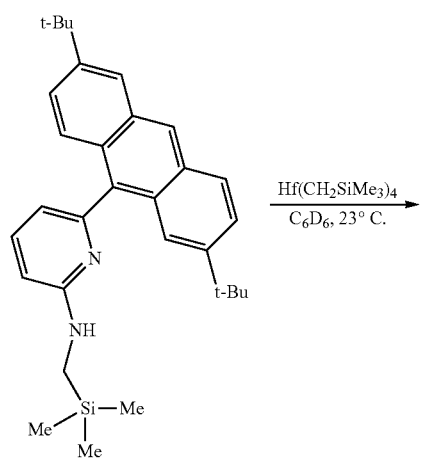

Example 14: Synthesis of Procatalyst 15

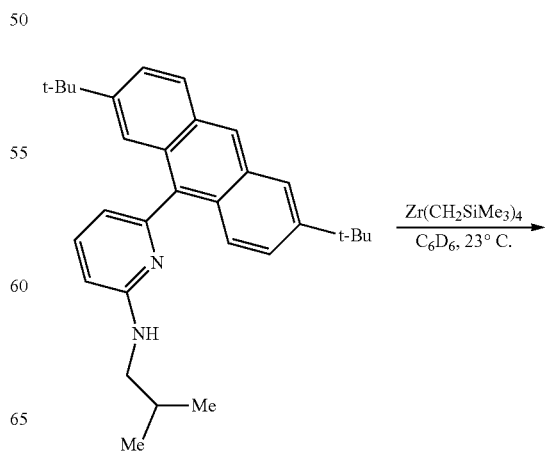

-continued

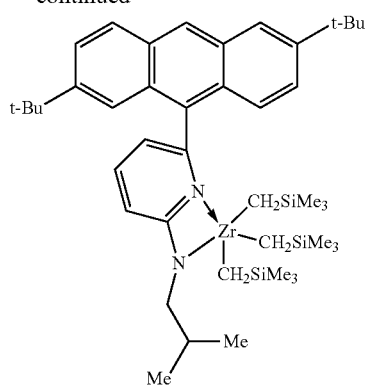

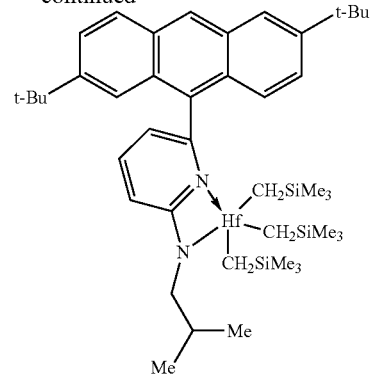

To a solution of the Zr(CH$_2$SiMe$_3$)$_4$ (20.9 mg, 0.0474 mmol, 1.30 eq) in a nitrogen filled glovebox in anhydrous deoxygenated C$_6$D$_6$ (1.0 mL) at 23° C. was added a solution of the aminopyridine (16.0 mg, 0.0365 mmol, 1.00 eq) in C$_6$D$_6$ (0.64 mL) in a dropwise manner. The pale golden yellow solution was stirred vigorously (1000 rpm) for 20 mins, an aliquot was removed, NMR indicated complete consumption of the starting ligand, the canary yellow solution concentrated, suspended in anhydrous deoxygenated pentane (3 mL), concentrated, the suspension/concentration process was repeated 2× more to remove residual C$_6$D$_6$ and Me$_4$Si, the resultant mixture was suspended in pentane (3 mL), filtered through a 0.20 μm PTFE filter, rinsed with pentane (3×3 mL), and the filtrate was concentrated to afford the zirconium complex (28.6 mg, 0.0362 mmol, 99%). NMR indicated product.

$^1$H NMR (500 MHz, Benzene-d$_6$) δ 8.22 (s, 1H), 7.87-7.77 (m, 4H), 7.41 (td, J=9.5, 2.0 Hz, 2H), 7.08 (ddd, J=8.8, 7.2, 0.6 Hz, 1H), 6.28 (dt, J=7.1, 0.8 Hz, 1H), 6.01 (d, J=8.7 Hz, 1H), 3.29 (d, J=7.2 Hz, 2H), 1.99 (hept, J=6.8 Hz, 1H), 1.32 (s, 9H), 1.30 (s, 9H), 1.01 (dd, J=6.6, 5.4 Hz, 6H), 0.66-0.55 (m, 6H), 0.00 (s, 27H). $^{13}$C NMR (126 MHz, Benzene-d$_6$) δ 170.65, 155.02, 147.88, 147.12, 141.58, 132.10, 131.30, 130.35, 129.88, 128.71, 128.35, 125.90, 125.74, 124.74, 122.85, 120.03, 113.24, 102.77, 71.75, 56.64, 34.83, 34.50, 30.61, 30.52, 29.24, 20.74, 20.67, 2.58.

Example 15: Synthesis of Procatalyst 16

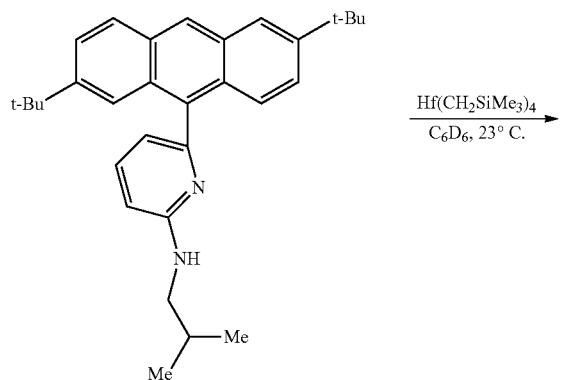

To a solution of the Hf(CH$_2$SiMe$_3$)$_4$ (20.3 mg, 0.0385 mmol, 1.30 eq) in a nitrogen filled glovebox in anhydrous deoxygenated C$_6$D$_6$ (1.0 mL) at 23° C. was added a solution of the aminopyridine (13.0 mg, 0.0296 mmol, 1.00 eq) in C$_6$D$_6$ (0.52 mL) in a dropwise manner. The pale golden yellow solution was stirred vigorously (1000 rpm) for 30 mins, concentrated, suspended in anhydrous deoxygenated pentane (3 mL), concentrated, the suspension/concentration process was repeated 2× more to remove residual C$_6$D$_6$ and Me$_4$Si, the resultant mixture was suspended in pentane (3 mL), filtered through a 0.20 μm PTFE filter, rinsed with pentane (3×3 mL), and the filtrate was concentrated to afford the hafnium complex (25.4 mg, 0.0289 mmol, 98%). NMR indicated product.

$^1$H NMR (400 MHz, Benzene-d$_6$) δ 8.21 (s, 1H), 7.85-7.74 (m, 4H), 7.44-7.38 (m, 2H), 7.10-7.03 (m, 1H), 6.31 (dt, J=7.2, 0.9 Hz, 1H), 5.97 (dt, J=8.7, 0.9 Hz, 1H), 3.36 (d, J=7.2 Hz, 2H), 1.94 (hept, J=6.7 Hz, 2H), 1.31 (s, 9H), 1.29 (s, 9H), 0.97 (ddd, J=6.7, 5.8, 0.9 Hz, 6H), 0.44 (s, 2H), 0.16 (s, 2H), 0.15 (s, 2H), 0.01 (s, 27H). $^{13}$C NMR (101 MHz, Benzene-d$_6$) δ 169.37, 154.90, 147.86, 147.12, 141.69, 131.85, 131.28, 130.35, 129.87, 128.61, 128.36, 125.98, 125.71, 124.76, 122.85, 120.06, 113.48, 103.12, 77.83, 56.16, 34.82, 34.49, 30.60, 30.51, 29.11, 20.66, 20.58, 2.93.

Example 16: Synthesis of Intermediate to Ligands 1 & 6-8

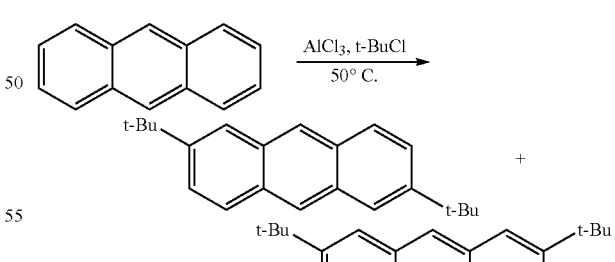

To a suspension of anthracene (50.0 g, 280.53 mmol, 1.00 eq) and t-BuCl (90.1 mL, 813.54 mmol, 2.90 eq) in anhydrous CHCl$_3$ (200 mL) in a nitrogen filled glovebox at 23° C. was added solid AlCl$_3$ (1.81 g, 13.61 mmol, 0.05 eq). The mixture was equipped with a glass coil condenser, and placed in a mantle heated to 50° C. After stirring (500 rpm) for 18 hr, the resultant turbid solution was removed from the mantle, allowed to cool to ambient temperature, the solid 2,6-di-t-butylanthracene crystallized out of solution, was suction filtered, washed with CHCl₃ (3×10 mL) collected, and dried in vacuo to afford the product as a pale yellow crystalline solid (37.54 g, 129.25 mmol, 46%). The resultant filtrate solution was concentrated, suspended in acetone (50 mL), stirred (500 rpm) for 5 mins, suction filtered, rinsed with acetone (3×20 mL), this process was repeated 2× more, and the resultant filtrate was concentrated to afford the 2,7-di-t-butylanthracene as a pink solid (12.54 g, 43.174 mmol, 15%). NMR indicated both products.

Characterization of 2,7-di-t-butylanthracene $^1$H NMR (400 MHz, CDCl₃) δ 8.40 (d, J=1.0 Hz, 1H), 8.34 (d, J=1.1 Hz, 1H), 7.98 (d, J=0.8 Hz, 1H), 7.96-7.92 (m, 3H), 7.60 (d, J=2.0 Hz, 1H), 7.58 (d, J=2.0 Hz, 1H), 1.52 (s, 18H).

Characterization of 2,6-di-t-butylanthracene $^1$H NMR (400 MHz, CDCl₃) δ 8.33 (d, J=1.3 Hz, 2H), 7.94 (d, J=8.9 Hz, 2H), 7.89 (d, J=2.0 Hz, 2H), 7.56 (dd, J=9.0, 2.0 Hz, 2H), 1.48 (s, 18H). $^{13}$C NMR (101 MHz, CDCl₃) δ 147.28, 131.62, 130.51, 127.70, 125.33, 124.65, 122.28, 34.87, 30.98.

Example 17: Synthesis of Intermediate to Ligand 6-8

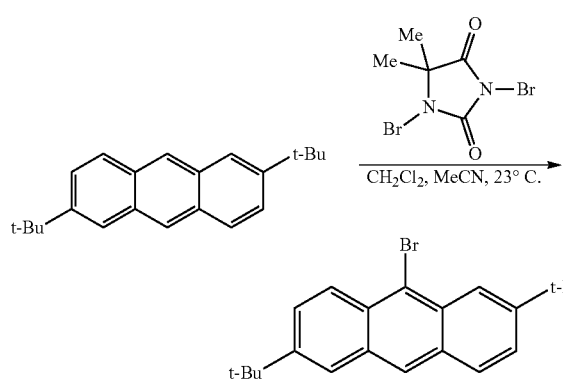

To a solution of the di-t-butylanthracene (3.000 g, 10.329 mmol, 1.00 eq) in anhydrous CH₂Cl₂ (80 mL) at 23° C. under nitrogen was added solution of the 1,3-dibromo-5,5-dimethylhydantoin (1.477 g, 5.168 mmol, 0.50 eq) in MeCN (30 mL) in a dropwise manner over 30 mins. After stirring (500 rpm) at 23° C. for 2 hrs, the light brown mixture was concentrated, suspended in methanol (50 mL), stirred for 10 mins, the resulting insoluble yellow mixture was suction filtered, the yellow solid was washed with methanol (3×10 mL), collected, and recrystallized from ethanol to afford the bromoanthracene as a pale yellow solid (2.080 g, 5.632 mmol, 54%). NMR indicated product.

$^1$H NMR (400 MHz, CDCl₃) δ 8.43 (dt, J=9.3, 0.8 Hz, 1H), 8.39 (dt, J=1.8, 0.8 Hz, 1H), 8.34 (s, 1H), 7.96-7.88 (m, 1H), 7.87-7.82 (m, 1H), 7.68 (dd, J=9.3, 2.0 Hz, 1H), 7.58 (dd, J=8.9, 1.9 Hz, 1H), 1.48 (s, 9H), 1.45 (s, 9H).

Example 18: Synthesis of Intermediate to Ligand 1

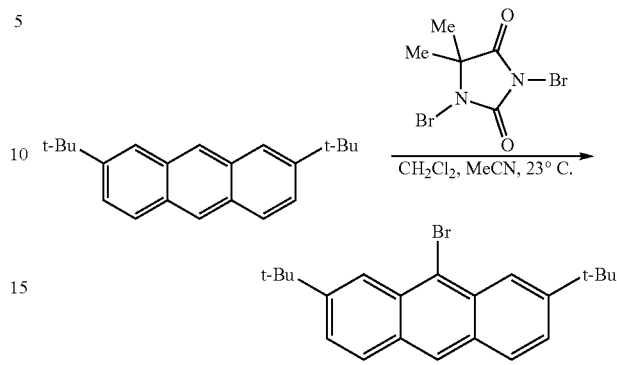

To a pale yellow slight suspension of the di-t-butylanthracene (1.035 g, 3.563 mmol, 1.00 eq) in CH₂Cl₂/MeCN (50 mL, 1:1) at 23° C. was added solid dibromo-dimethylhydantoin (0.510 g, 1.782 mmol, 0.50 eq) all at once. The now dark golden yellow suspension was stirred (500 rpm) for 90 mins upon which the mixture was concentrated, suspended in MeOH (30 mL), placed in a mantle heated to 70° C., stirred vigorously (1000 rpm) for 30 mins, the golden yellow mixture was then allowed to slowly, gradually cool to 23° C., suction filtered, the resultant solid was washed with MeOH (4×10 mL), and dried in vacuo to afford the bromo-di-t-butylanthracene as an off-white powder (0.623 g, 1.687 mmol, 47%). NMR indicated pure product.

$^1$H NMR (400 MHz, Chloroform-d) δ 8.40 (dt, J=1.6, 0.7 Hz, 2H), 8.31 (s, 1H), 7.90 (dt, J=8.9, 0.6 Hz, 2H), 7.56 (dd, J=8.8, 1.8 Hz, 2H), 1.47 (s, 18H). $^{13}$C NMR (101 MHz, Chloroform-d) δ 149.61, 130.53, 130.51, 128.26, 125.81, 124.83, 122.25, 121.90, 35.41, 30.93.

Example 19: Synthesis of Intermediate to Ligands 6-8

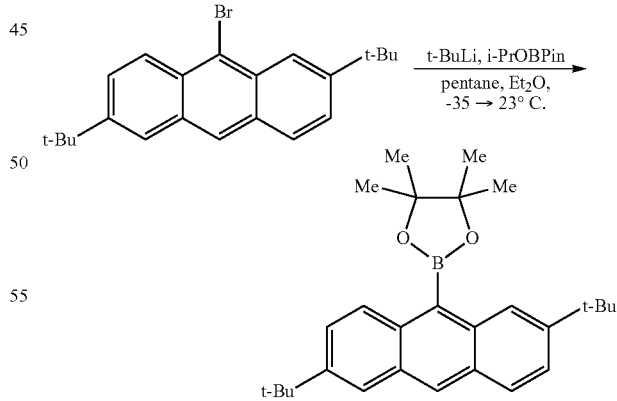

To a precooled solution of t-BuLi (5.0 mL, 8.124 mmol, 3.00 eq, 1.7 M in pentane) in anhydrous deoxygenated pentane (25 mL) in a nitrogen filled glovebox at −35° C. (precooled for 16 hrs) was added the solid anthracenylbromide (1.000 g, 2.708 mmol, 1.00 eq). Then, a precooled solution of pentane/Et₂O (10 mL, 1:1) was added in a quick dropwise manner while stirring vigorously (1000 rpm). The now golden yellow mixture was allowed to sit in the freezer (−35° C.) for 4 hrs upon which neat i-PrOBPin (1.10 mL, 5.416 mmol, 2.00 eq) was added via syringe to the now golden brown mixture. The now pale yellow heterogeneous mixture was allowed to stir at 23° C. for 3 hrs, i-PrOH (3 mL) was added, the mixture was removed from the glovebox, water (20 mL) and Et$_2$O (30 mL) were added, the biphasic mixture was stirred for 2 mins, poured into a separatory funnel, partitioned, organics were washed with water (2×25 mL), residual organics were extracted with Et$_2$O (2×25 mL), combined, dried over solid Na$_2$SO$_4$, decanted, concentrated, the resultant pale yellow mixture was suspended in hexanes (20 mL), suction filtered through silica gel, rinsed with hexanes (4×25 mL), and then rinsed with CH$_2$Cl$_2$ (4×25 mL), and the resulting filtrate solution was concentrated to afford the anthracenyl boropinacolate ester as a pale yellow foam (1.104 g, 2.653 mmol, 98%). NMR indicated product. The material was used in the subsequent reaction without further purification.

$^1$H NMR (400 MHz, Chloroform-d) δ 8.42-8.38 (m, 3H), 7.93 (dd, J=8.9, 2.2 Hz, 1H), 7.87 (d, J=2.2 Hz, 1H), 7.64-7.57 (m, 1H), 7.53 (dt, J=9.0, 1.7 Hz, 1H), 1.59 (s, 12H), 1.47 (s, 9H), 1.46 (s, 9H). $^{13}$C NMR (101 MHz, Chloroform-d) δ 147.36, 146.64, 135.83, 134.76, 131.02, 129.91, 128.67, 128.29, 127.88, 125.31, 124.32, 122.88, 122.75, 84.15, 35.29, 34.77, 31.02, 30.95, 25.28.

Example 20: Synthesis of Intermediate for Ligand 1

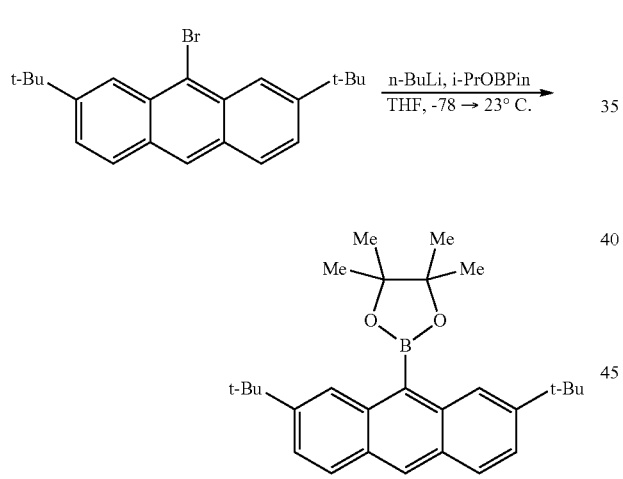

A solution of the bromoanthracene (1.000 g, 2.707 mmol, 1.00 eq) in anhydrous deoxygenated THF (5 mL) under nitrogen was placed in a bath cooled to −78° C. for 1 hr, then a solution n-BuLi (1.80 mL, 2.98 mmol, 1.10 eq, titrated 1.6 M in hexanes) was added in a dropwise manner, the solution was then placed in an ice water bath, stirred (500 rpm) for 5 hrs, i-PrOBPin (0.7 mL, 3.52 mmol, 1.30 eq) was added neat, the mixture was allowed to warm gradually to 23° C. over 16 hrs, water (2 mL) was added, diluted with CH$_2$Cl$_2$ (10 mL), the mixture was poured into a separatory funnel, partitioned, organics were washed with water (3×50 mL), residual organics were extracted from the aqueous layer using CH$_2$C$_2$ (3×25 mL), combined, concentrated onto celite, and purified via silica gel chromatography; hexanes—10% EtOAC in hexanes to afford the boropinacolate ester as a white solid (0.94 g, 2.257 mmol, 83%). NMR indicated product.

$^1$H NMR (400 MHz, Chloroform-d) δ 8.33 (ddt, J=12.8, 1.8, 0.7 Hz, 3H), 7.91 (dt, J=8.9, 0.6 Hz, 2H), 7.52 (dd, J=8.9, 1.9 Hz, 2H), 1.60 (s, 12H), 1.46 (s, 18H). $^{13}$C NMR (101 MHz, Chloroform-d) δ 147.46, 136.17, 129.47, 128.31, 128.06, 124.09, 122.64, 84.08, 31.04, 25.38.

Example 21: Synthesis of Intermediate to Ligands 6-8

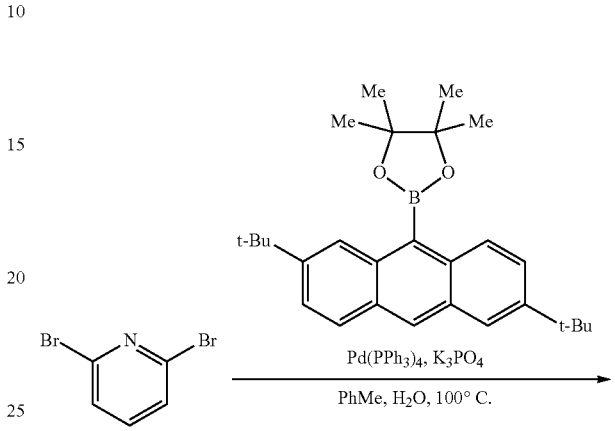

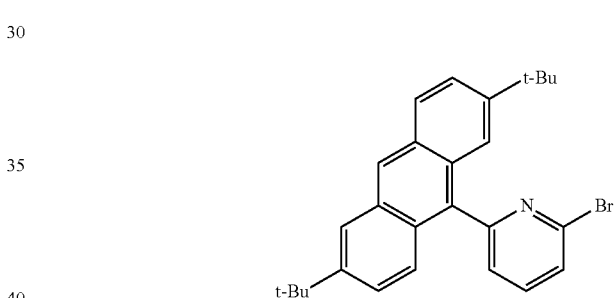

To a mixture of the boropinacolate ester (2.800 g, 6.724 mmol, 1.00 eq), K$_3$PO$_4$ (4.34 g, 20.446 mmol, 3.04 eq), Pd(PPh$_3$)$_4$ (0.390 g, 0.3375 mmol, 0.05 eq), and the dibromopyridine (2.420 g, 10.216 mmol, 1.52 eq) under nitrogen was added deoxygenated toluene (100 mL) and water (15 mL), the mixture was placed in a mantle heated to 100° C., after stirring (500 rpm) for 72 hrs the mixture was removed from the mantle, allowed to cool to 23° C., water (25 mL) and EtOAc (25 mL) were added, the biphasic mixture was poured into a separatory funnel, partitioned, organics were washed with water (1×25 mL), residual organics were extracted from the aqueous layer (1×25 mL), combined, dried over solid Na$_2$SO$_4$, decanted, concentrated onto celite, and purified via silica gel chromatography; hexanes—2% EtOAc in hexanes to afford the anthracenylbromopyridine (2.500 g, 5.600 mmol, 83%). NMR indicated product.

$^1$H NMR (400 MHz, Chloroform-d) δ 8.44 (s, 1H), 7.95 (dq, J=8.9, 0.6 Hz, 1H), 7.92-7.87 (m, 1H), 7.75 (ddd, J=8.0, 7.4, 0.7 Hz, 1H), 7.63 (dt, J=8.0, 0.8 Hz, 1H), 7.58-7.51 (m, 2H), 7.51-7.46 (m, 3H), 1.43 (s, 9 h), 1.31 (s, 9H). $^{13}$C NMR (101 MHz, Chloroform-d) δ 159.75, 148.00, 147.07, 142.09, 138.35, 132.37, 131.13, 130.09, 129.57, 128.66, 128.06, 127.34, 126.59, 125.86, 125.67, 125.22, 124.60, 122.62, 119.62, 35.08, 34.80, 30.90, 30.76.

Example 22: Synthesis of Intermediate to Ligand 1

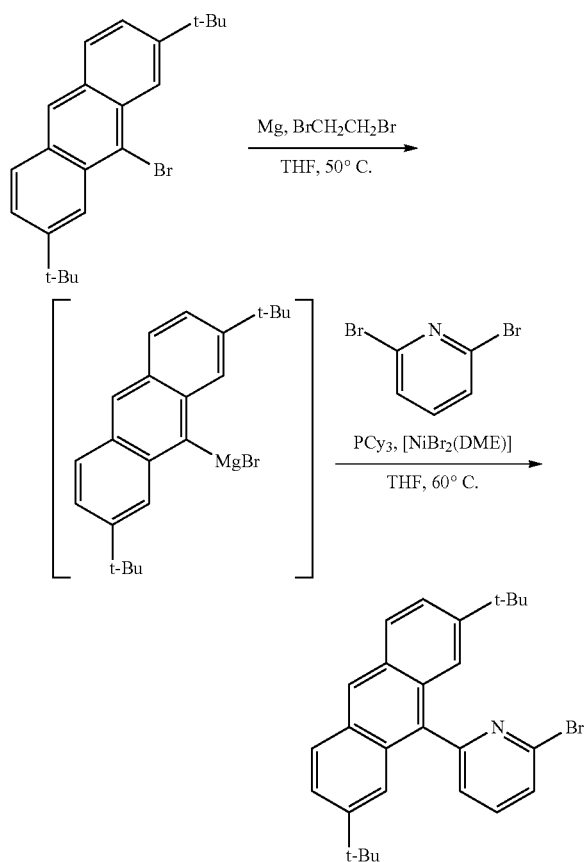

To a solution of the anthracene (3.000 g, 8.122 mmol, 1.00 eq) in anhydrous deoxygenated THF (30 mL) in a nitrogen filled glovebox at 23° C. was added magnesium turnings (0.79 g, 32.504 mmol, 4.00 eq), followed by 1,2-dibromoethane (20 µL), the mixture was then placed in a mantle heated to 50° C., stirred for 16 hrs, following which the solution was added to a solution of 2,6-dibromopyridine (2.890 g, 12.200 mmol, 1.50 eq), PCy$_3$ (5.0 mg, 0.01783 mmol, 0.002 eq), and nickel (II) bromide ethylene glycol dimethyl ether complex (3.0 mg, 0.00972 mmol, 0.001 eq) in anhydrous deoxygenated THF (50 mL). The solution was placed in a mantle heated to 60° C., stirred (500 rpm) for 24 hrs, removed from the mantle, allowed to cool gradually to ambient temperature, removed from the glovebox, water (50 mL) and EtOAc (50 mL) were added, the mixture was poured into a separatory funnel, partitioned, organics were washed with water (2×25 mL), the organics were dried over solid Na$_2$SO$_4$, decanted, concentrated onto celite, and purified via silica gel chromatography; hexanes—2% EtOAc in hexanes to afford the bromopyridine (3.510 g, 7.862 mmol, 97%). NMR indicated product.

$^1$H NMR (400 MHz, Chloroform-d) δ 8.41 (s, 1H), 8.00-7.88 (m, 2H), 7.81-7.70 (m, 1H), 7.64 (dt, J=7.9, 0.8 Hz, 1H), 7.60-7.42 (m, 5H), 1.48-1.12 (s, 18H). $^{13}$C NMR (101 MHz, Chloroform-d) δ 159.86, 148.18, 142.02, 138.31, 132.52, 130.03, 129.65, 128.14, 126.98, 126.50, 125.94, 124.37, 119.63, 35.11, 30.78.

Example 23: Synthesis of Ligand 1

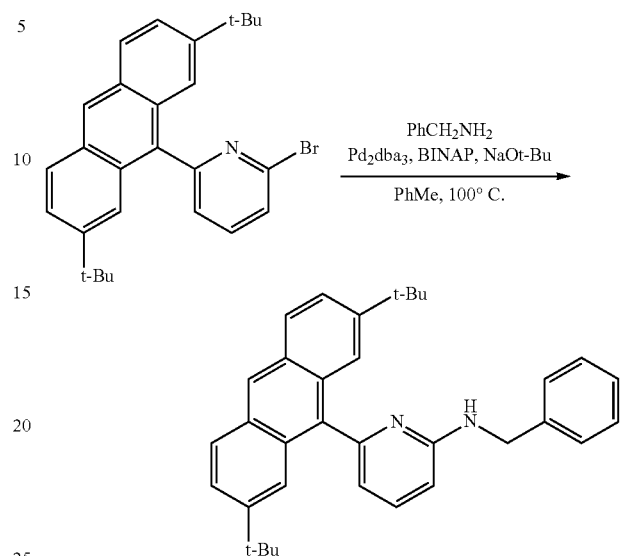

To a mixture of the bromopyridine (0.100 g, 0.22 mmol, 1.00 eq), NaOt-Bu (64.9 mg, 0.67 mmol, 3.00 eq), Pd$_2$dba$_3$ (10.3 mg, 0.01 mmol, 0.05 eq), and rac-BINAP (13.9 mg, 0.02 mmol, 0.10 eq) in anhydrous deoxygenated toluene (25 mL) in a nitrogen filled glovebox at 23° C. was added benzylamine (0.73 mL, 6.72 mmol, 1.50 eq), the mixture was placed in a mantled heated to 100° C., stirred (500 rpm) for 3 hrs, the brown mixture was removed from mantle, allowed to cool to ambient temperature, removed from the glovebox, water (20 mL) and EtOAc (20 mL) was added, the biphasic mixture was poured into a separatory funnel, partitioned, organics were washed with water (2×10 mL), residual organics were extracted using EtOAc (2×10 mL), combined, dried over solid Na$_2$SO$_4$, decanted, concentrated onto celite, and purified via silica gel chromatography; hexanes—15% EtOAc in hexanes to afford the aminopyridine as a pale yellow amorphous foam (11.6 mg, 0.023 mmol, 11%). NMR indicated product.

$^1$H NMR (400 MHz, Chloroform-d) δ 8.37 (d, J=1.0 Hz, 1H), 7.94 (dt, J=8.9, 0.7 Hz, 2H), 7.70 (dq, J=1.7, 0.8 Hz, 2H), 7.66-7.59 (m, 1H), 7.52 (dd, J=8.9, 1.9 Hz, 2H), 7.39-7.25 (m, 5H), 6.84 (dt, J=7.1, 0.7 Hz, 1H), 6.46 (dt, J=8.4, 0.8 Hz, 1H), 5.36-5.21 (m, 1H), 4.51 (d, J=6.1 Hz, 2H), 1.35 (s, 18H). $^{13}$C NMR (101 MHz, Chloroform-d) δ 158.74, 157.03, 147.34, 139.26, 137.61, 135.16, 129.99, 129.83, 128.58, 127.94, 127.12, 127.09, 125.87, 124.18, 120.52, 116.46, 104.28, 46.36, 35.06, 30.88.

Example 24: Synthesis of Ligand 6

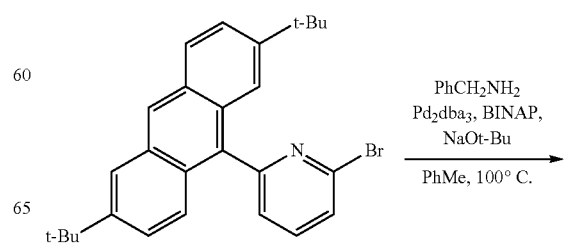

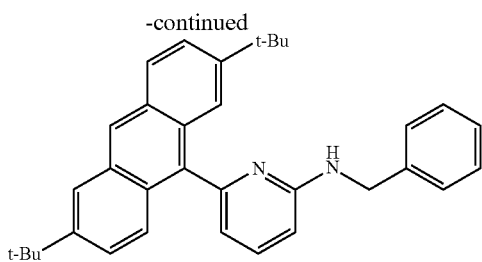

To a mixture of the bromopyridine (2.000 g, 4.48 mmol, 1.00 eq), NaOt-Bu (1.298 g, 13.44 mmol, 3.00 eq), Pd$_2$dba$_3$ (0.205 g, 0.22 mmol, 0.05 eq), and rac-BINAP (0.279 g, 0.45 mmol, 0.10 eq) in anhydrous deoxygenated toluene (25 mL) in a nitrogen filled glovebox at 23° C. was added benzylamine (0.73 mL, 6.72 mmol, 1.50 eq), the mixture was placed in a mantle heated to 100° C., stirred (500 rpm) for 3 hrs, the brown mixture was removed from mantle, allowed to cool to ambient temperature, removed from the glovebox, water (20 mL) and EtOAc (20 mL) was added, the biphasic mixture was poured into a separatory funnel, partitioned, organics were washed with water (2×10 mL), residual organics were extracted using EtOAc (2×10 mL), combined, dried over solid Na$_2$SO$_4$, decanted, concentrated onto celite, and purified via silica gel chromatography; hexanes—15% EtOAc in hexanes to afford the aminopyridine as a pale yellow amorphous foam (1.70 g, 3.597 mmol, 80%).

$^1$H NMR (500 MHz, Chloroform-d) δ 8.22 (s, 1H), 8.06 (dd, J=2.0, 1.0 Hz, 1H), 7.98 (dd, J=9.2, 0.9 Hz, 1H), 7.88 (d, J=8.9 Hz, 1H), 7.85 (d, J=2.0 Hz, 1H), 7.44 (dd, J=8.9, 1.9 Hz, 1H), 7.30 (dd, J=9.2, 2.0 Hz, 1H), 7.18 (dd, J=8.4, 7.2 Hz, 1H), 7.12 (d, J=3.1 Hz, 2H), 7.06-7.04 m, 3H), 6.74 (dd, J=7.2, 0.8 Hz, 1H), 6.01 (dd, J=8.4, 0.8 Hz, 1H), 4.66 (s, 1H), 4.26-3.85 (m, 2H), 1.31 (s, 9H), 1.25 (s, 9H). $^{13}$C NMR (101 MHz, Chloroform-d) δ 158.65, 157.18, 146.86, 146.53, 139.85, 136.91, 136.11, 131.57, 130.51, 129.92, 129.10, 128.22, 128.14, 127.35, 126.89, 126.63, 124.71, 124.33, 122.49, 121.01, 115.91, 105.09, 45.57, 34.75, 34.43, 30.63, 30.61.

Example 25: Synthesis of Ligand 7

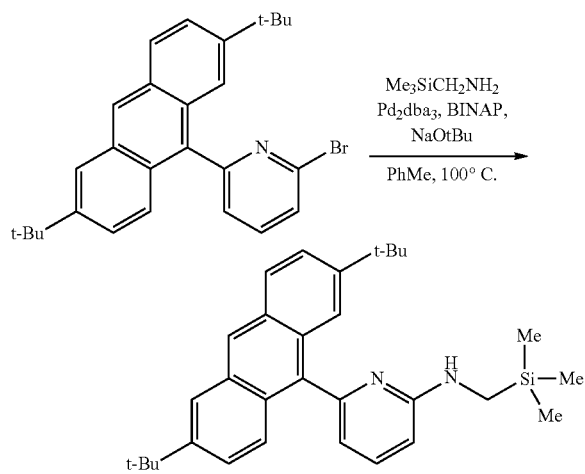

To a mixture of the bromopyridine (2.840 g, 6.36 mmol, 1.00 eq), NaOt-Bu (1.834 g, 19.08 mmol, 3.00 eq), Pd$_2$dba$_3$ (0.291 g, 0.32 mmol, 0.05 eq), and rac-BINAP (0.396 g, 0.64 mmol, 0.10 eq) in anhydrous deoxygenated toluene (75 mL) in a nitrogen filled glovebox at 23° C. was added the amine (1.27 mL, 9.54 mmol, 1.50 eq), the mixture was placed in a mantled heated to 100° C., stirred (500 rpm) for 3 hrs, the brown mixture was removed from mantle, allowed to cool to ambient temperature, removed from the glovebox, water (20 mL) and EtOAc (20 mL) was added, the biphasic mixture was poured into a separatory funnel, partitioned, organics were washed with water (2×10 mL), residual organics were extracted using EtOAc (2×10 mL), combined, dried over solid Na$_2$SO$_4$, decanted, concentrated onto celite, and purified via silica gel chromatography; hexanes—15% EtOAc in hexanes to afford the aminopyridine as a pale yellow amorphous foam (2.50 g, 5.333 mmol, 86%).

$^1$H NMR (400 MHz, CDCl$_3$) δ 8.38 (s, 1H), 7.97-7.90 (m, 1H), 7.87 (t, J=1.6 Hz, 1H), 7.74-7.62 (m, 3H), 7.51 (dt, J=8.9, 1.6 Hz, 1H), 7.45 (dt, J=9.3, 1.7 Hz, 1H), 6.80 (dd, J=7.2, 0.8 Hz, 1H), 6.61 (d, J=8.3 Hz, 1H), 4.65 (s, 1H), 2.87-2.49 (m, 2H), 1.42 (s, 9H), 1.32 (s, 9H), 0.14 (d, J=1.4 Hz, 9H). $^{13}$C NMR (101 MHz, CDCl$_3$) δ 160.81, 156.78, 147.14, 146.77, 137.69, 135.02, 131.31, 130.30, 129.49, 128.64, 127.84, 126.16, 126.05, 124.93, 124.38, 122.38, 120.50, 115.83, 102.98, 35.01, 34.76, 32.57, 30.93, 30.83, −2.61.

Example 26: Synthesis of Ligand 8

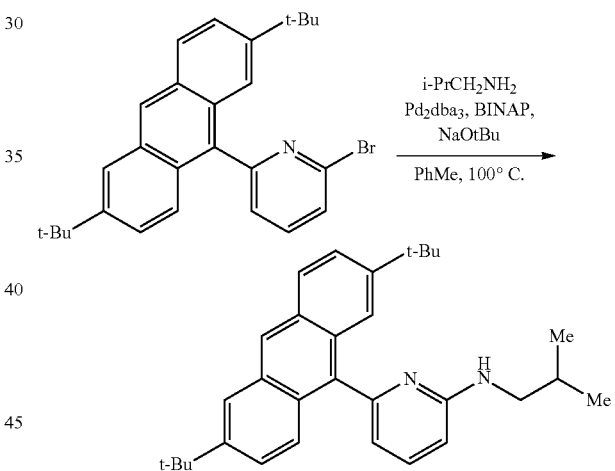

To a mixture of the bromopyridine (2.840 g, 6.36 mmol, 1.00 eq), NaOt-Bu (1.834 g, 19.08 mmol, 3.00 eq), Pd$_2$dba$_3$ (0.291 g, 0.32 mmol, 0.05 eq), and rac-BINAP (0.396 g, 0.64 mmol, 0.10 eq) in anhydrous deoxygenated toluene (40 mL) in a nitrogen filled glovebox at 23° C. was added the amine (0.95 mL, 9.54 mmol, 1.50 eq), the mixture was placed in a mantled heated to 100° C., stirred (500 rpm) for 3 hrs, the brown mixture was removed from mantle, allowed to cool to ambient temperature, removed from the glovebox, water (20 mL) and EtOAc (20 mL) was added, the biphasic mixture was poured into a separatory funnel, partitioned, organics were washed with water (2×10 mL), residual organics were extracted using EtOAc (2×10 mL), combined, dried over solid Na$_2$SO$_4$, decanted, concentrated onto celite, and purified via silica gel chromatography; hexanes—15% EtOAc in hexanes to afford the aminopyridine as a pale yellow amorphous foam (2.50 g, 5.699 mmol, 90%).

$^1$H NMR (400 MHz, CDCl$_3$) δ 8.39 (t, J=1.0 Hz, 1H), 7.94 (dt, J=8.9, 0.6 Hz, 1H), 7.88 (dd, J=2.0, 0.6 Hz, 1H), 7.72 (dq, J=9.2, 0.6 Hz, 1H), 7.68-7.60 (m, 2H), 7.52 (dd, J=8.9, 1.9 Hz, 1H), 7.46 (dd, J=9.2, 2.0 Hz, 1H), 6.79 (dt, J=7.1, 0.6 Hz, 1H), 6.50 (dd, J=8.4, 0.8 Hz, 1H), 4.83 (t, J=5.9 Hz, 1H), 3.13 (dd, J=6.7, 5.9 Hz, 2H), 1.94 (dh, J=13.3, 6.7 Hz, 1H), 1.43 (d, J=4.2 Hz, 9H), 1.32 (d, J=0.5 Hz, 9H), 1.01 (dd, J=6.7, 0.8 Hz, 6H). $^{13}$C NMR (101 MHz, CDCl$_3$) δ 159.18, 156.90, 147.13, 146.78, 137.58, 135.06, 131.31, 130.29, 129.50, 128.62, 127.85, 126.16, 126.05, 124.92, 124.38, 122.39, 120.51, 115.81, 103.54, 50.37, 35.01, 34.77, 30.94, 30.83, 28.41, 20.41, 0.01.

Example 27: Synthesis of Intermediate to Ligand 2

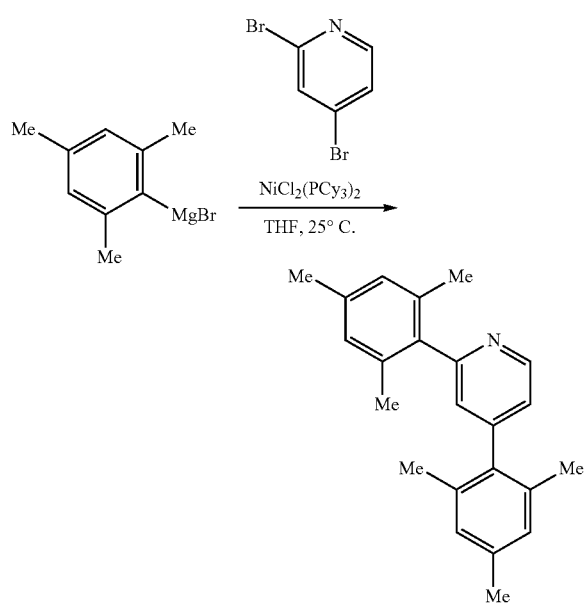

To a solution of 2,4-dibromopyridine (25.0 g, 105.5 mmol, 1.00 eq), NiCl$_2$(PCy$_3$)$_2$ (1.45 g, 2.11 mmol, 0.02 eq) in anhydrous deoxygenated THF (500 mL) in a nitrogen filled glovebox at 25° C. was added mesityl magnesiumbromide (237.5 mL, 237.5 mmol, 2.25 eq, 1 M in THF) in a dropwise manner via addition funnel. After stirring for 1 hr after the completion of addition, the solution was removed from the glovebox, water (100 mL) was added, THF was removed via rotary evaporation, the mixture was diluted with 1 N HCl (200 mL) and CH$_2$Cl$_2$ (200 mL), poured into a separatory funnel, partitioned, organics were washed with water (1×50 mL), the organics were extracted from the aqueous layer using CH$_2$Cl$_2$ (2×25 mL), combined, dried over solid Na$_2$SO$_4$, decanted, concentrated, suspended in CH$_2$Cl$_2$ (25 mL), the dark red solution was suction filtered through a plug silica gel, rinsed with CH$_2$Cl$_2$ (4×50 mL), and the resultant filtrate solution was concentrated to afford the dimesitylpyridine (26.5 g, 84.00 mmol, 80%). NMR indicated product.

$^1$H NMR (400 MHz, CDCl$_3$) δ 8.79 (dd, J=5.0, 0.9 Hz, 1H), 7.08 (dd, J=5.0, 1.7 Hz, 1H), 7.06 (dd, J=1.6, 0.9 Hz, 1H), 7.02-6.98 (m, 2H), 6.98-6.94 (m, 2H), 2.37 (s, 3H), 2.36 (s, 3H), 2.12 (s, 6H), 2.09 (s, 6H). $^{13}$C NMR (101 MHz, CDCl$_3$) δ 160.31, 149.83, 149.72, 137.80, 137.42, 137.31, 136.44, 135.55, 134.99, 128.38, 128.31, 125.68, 122.61, 21.13, 21.07, 20.59, 20.18.

Example 28: Synthesis of Intermediate to Ligand 2

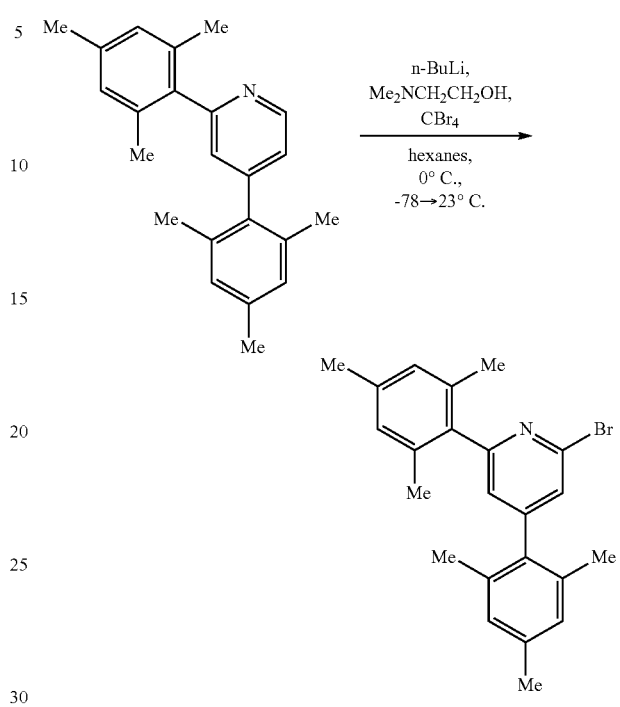

A solution of dimethylaminoethanol (17.636 g, 19.9 mL, 142.65 mmol, 3.00 eq) in anhydrous de-oxygenated hexanes (250 mL) under nitrogen was placed in an ice water bath. After stirring (500 rpm) for 30 mins n-BuLi (115.0 mL, 285.30 mmol, 6.00 eq, titrated 2.49 M in hexanes) was added in a quick dropwise manner over 20 mins. The clear colorless solution changed to a pale yellow solution and after stirring for 1 hr the pyridine (15.000 g, 47.550 mmol, 1.00 eq) was added as a solution in Et$_2$O (150 mL) in a quick dropwise manner over 30 mins. After stirring for 2 hrs the golden brown solution was placed in a bath cooled to −78° C., after 1 hr a solution of CBr$_4$ (55.192 g, 166.43 mmol, 3.50 eq) in Et$_2$O (100 mL) was added in a quick dropwise manner over 20 mins. After stirring for 1 hr the now brown solution was removed from the cold bath and allowed to warm gradually to 23° C. After stirring at 23° C. for 2 hrs the now heterogeneous mixture was neutralized with water (100 mL), stirred vigorously (1000 rpm) for 2 mins, poured into a separatory funnel, partitioned, organics were washed with water (3×50 mL), residual organics were extracted from the aqueous layer using Et$_2$O (2×50 mL), combined, dried over solid Na$_2$SO$_4$, decanted, concentrated onto celite, suction filtered through a pad of silica gel by first washing with hexanes (4×100 mL) to elute/remove residual CBr$_4$ and then with CH$_2$Cl$_2$ (4×100 mL) to elute the product which was concentrated onto celite, this suction filtration over a pad of silica gel was done 1× more, the CH$_2$Cl$_2$ filtrate was concentrated onto celite, and purified via silica gel chromatography using the ISCO; hexanes—30% CH$_2$Cl$_2$ in hexanes to afford the bromide as a golden brown amorphous oil (17.364 g, 44.031 mmol, 93%). NMR indicated product.

$^1$H NMR (400 MHz, Chloroform-d) δ 7.32 (d, J=1.3 Hz, 1H), 7.02 (d, J=1.3 Hz, 1H), 7.00-6.97 (m, 2H), 6.97-6.95 (m, 2H), 2.37 (s, 3H), 2.35 (s, 3H), 2.14 (s, 6H), 2.10 (s, 6H). $^{13}$C NMR (101 MHz, Chloroform-d) δ 161.15, 152.60, 142.09, 137.94, 137.88, 136.37, 135.57, 134.99, 134.88, 128.50, 128.42, 126.61, 125.09, 21.14, 21.09, 20.60, 20.26.

Example 29: Synthesis of Ligand 2

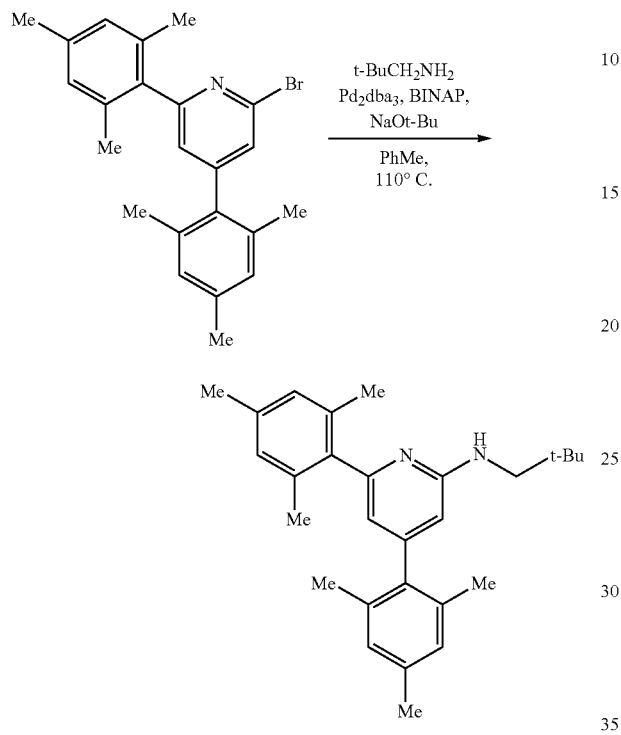

To a heterogeneous mixture of the bromide (17.364 g, 44.031 mmol, 1.00 eq), neopentyl amine (6.525 g, 74.853 mmol, 1.70 eq), and NaOt-Bu (9.394 g, 97.749 mmol, 2.22 eq) in PhMe (85 mL) in a nitrogen filled glovebox at 23° C. was added Pd$_2$dba$_3$ (0.403 g, 0.4403 mmol, 0.01 eq) and then BINAP (0.274 g, 0.4403 mmol, 0.01 eq). The now golden yellow heterogeneous mixture was placed in a mantle heated to 110° C. After stirring (500 rpm) for 12 hrs the dark golden brown mixture was removed from the mantle, allowed to cool gradually to 23° C., removed from the glovebox, diluted with EtOAc (50 mL) and water (50 mL), suction filtered through a pad of celite, rinsed with EtOAc (3×30 mL), poured into a separatory funnel, partitioned, organics were washed with water (2×50 mL), residual organics were extracted from the aqueous layer using EtOAc (2×25 mL), combined, dried over solid Na$_2$SO$_4$, decanted, concentrated onto celite, and purified via silica gel chromatography; hexanes—80% CH$_2$Cl$_2$ in hexanes to afford the 2-aminopyridine as viscous canary yellow oil (14.805 g, 36.986 mmol, 84%). Prior to use the 2-aminopyridine ligand was azeotropically dried using PhMe (3×10 mL). NMR indicated product.

$^1$H NMR (500 MHz, Chloroform-d) δ 6.98-6.96 (m, 2H), 6.96-6.90 (m, 2H), 6.34 (d, J=1.2 Hz, 1H), 6.19 (d, J=1.2 Hz, 1H), 4.82 (t, J=6.2 Hz, 1H), 3.06 (d, J=6.2 Hz, 2H), 2.36 (s, 3H), 2.33 (s, 3H), 2.17 (s, 6H), 2.15 (s, 6H), 1.02 (s, 9H). $^{13}$C NMR (126 MHz, Chloroform-d) δ 158.61, 137.74, 135.50, 135.15, 129.05, 128.21, 128.11, 114.60, 103.50, 54.36, 32.25, 27.58, 27.55, 21.10, 21.05, 20.44, 20.12.

Example 30: Synthesis of Intermediate to Ligand 3

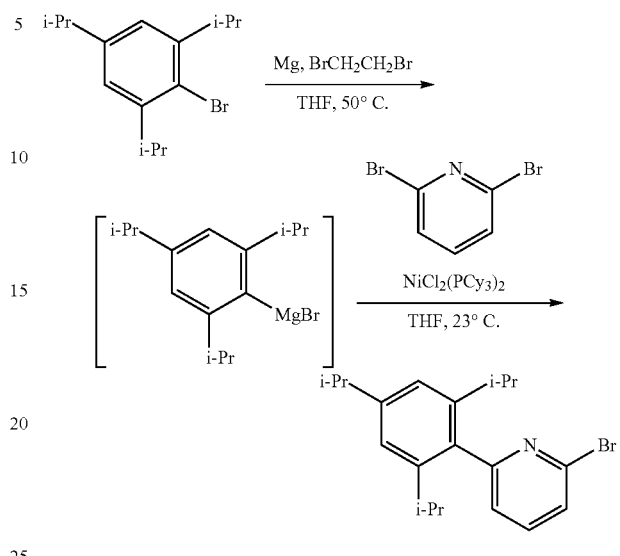

To a solution of the 2,4,6-triisopropylbenzene (3.52 g, 12.41 mmol, 1.00 eq) in anhydrous deoxygenated THF (10 mL) in a nitrogen filled glovebox at 23° C. was added magnesium turnings (1.19 g, 49.64 mmol, 4.00 eq), followed by 1,2-dibromoethane (20 µL), the mixture was then placed in a mantle heated to 50° C., stirred for 16 hrs, following which the mixture was gravity filtered directly into to a solution of 2,6-dibromopyridine (2.94 g, 12.41 mmol, 1.50 eq), NiCl$_2$(PCy$_3$)$_2$ (0.086 g, 0.12 mmol, 0.10 eq) in anhydrous deoxygenated THF (30 mL). The solution was stirred (500 rpm) at 23° C. for 15 hrs, concentrated, diluted with CH$_2$Cl$_2$ (50 mL), removed from the glovebox, water (50 mL) added, the mixture was poured into a separatory funnel, partitioned, organics were washed with water (2×25 mL), the organics were extracted from the aqueous layer using CH$_2$Cl$_2$ (2×25 mL), combined, dried over solid Na$_2$SO$_4$, decanted, concentrated onto celite, and purified via silica gel chromatography; hexanes to afford the bromopyridine (3.57 g, 9.907 mmol, 80%). NMR indicated product.

$^1$H NMR (400 MHz, CDCl$_3$) δ 7.48-7.36 (m, 3H), 6.90 (s, 2H), 2.86 (hept, J=6.9 Hz, 3H), 1.24 (d, J=6.9 Hz, 18H).

Example 31: Synthesis of Ligand 3

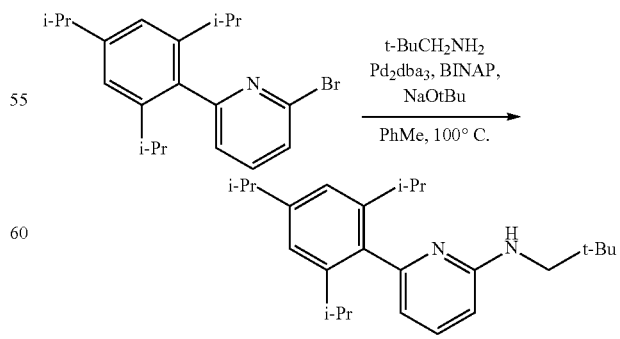

To a mixture of the bromopyridine (0.500 g, 1.39 mmol, 1.00 eq), NaOt-Bu (0.296 g, 3.08 mmol, 3.00 eq), Pd$_2$dba$_3$ (13.0 mg, 0.0142 mmol, 0.01 eq), and rac-BINAP (17.0 mg, 0.0284 mmol, 0.02 eq) in anhydrous deoxygenated toluene (10 mL) in a nitrogen filled glovebox at 23° C. was added the amine (0.24 mL, 2.08 mmol, 1.50 eq), the mixture was placed in a mantled heated to 100° C., stirred (500 rpm) for 3 hrs, the brown mixture was removed from mantle, allowed to cool to ambient temperature, removed from the glovebox, water (20 mL) and EtOAc (20 mL) was added, the biphasic mixture was poured into a separatory funnel, partitioned, organics were washed with water (2×10 mL), residual organics were extracted using EtOAc (2×10 mL), combined, dried over solid $Na_2SO_4$, decanted, concentrated onto celite, and purified via silica gel chromatography; hexanes—15% EtOAc in hexanes to afford the aminopyridine as a pale yellow amorphous foam (0.332 g, 0.9056 mmol, 65%).

$^1$H NMR (400 MHz, $CDCl_3$) δ 7.48 (t, J=7.8 Hz, 1H), 7.13 (s, 2H), 6.60 (d, J=7.2 Hz, 1H), 6.39 (d, J=8.4 Hz, 1H), 4.75 (t, J=5.8 Hz, 1H), 3.12 (d, J=6.0 Hz, 2H), 2.99 (hept, J=6.8 Hz, 1H), 2.77 (hept, J=6.5 Hz, 2H), 1.35 (dd, J=6.9, 1.3 Hz, 6H), 1.25 (d, J=6.8 Hz, 6H), 1.19 (d, J=6.8 Hz, 6H), 1.04 (s, 9H). $^{13}$C NMR (101 MHz, $CDCl_3$) δ 158.97, 158.50, 148.19, 146.10, 137.13, 137.00, 120.66, 113.94, 102.99, 54.13, 34.50, 32.10, 30.24, 27.60, 24.66, 24.23, 24.09.

Example 32: Synthesis of Intermediate to Ligands 4 & 5

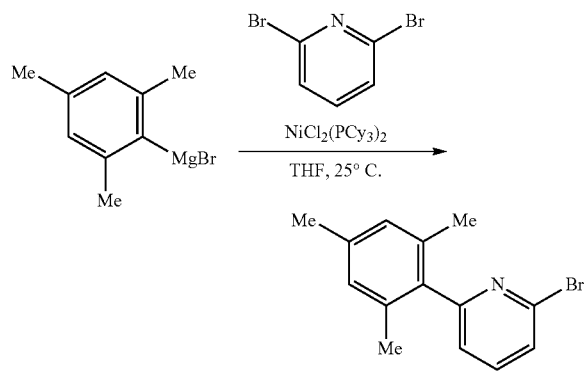

To a solution of 2,6-dibromopyridine (25.0 g, 211.07 mmol, 1.00 eq), $NiCl_2(PCy_3)_2$ (1.457 g, 2.11 mmol, 0.01 eq) in anhydrous deoxygenated THF (500 mL) in a nitrogen filled glovebox at 25° C. was added mesityl magnesiumbromide (211 mL, 211.07 mmol, 1.00 eq, 1 M in THF) in a dropwise manner via addition funnel. After stirring for 3 hrs after the completion of addition, the solution was removed from the glovebox, water (100 mL) was added, THF was removed via rotary evaporation, the mixture was diluted with 1 N HCl (150 mL) and EtOAc (300 mL), poured into a separatory funnel, partitioned, organics were washed with water (1×50 mL), the organics were extracted from the aqueous layer using EtOAc (2×25 mL), combined, dried over solid $Na_2SO_4$, decanted, concentrated onto celite, and purified via silica gel chromatography; hexanes—10% EtOAc in hexanes to afford the mesitylpyridine (25.3 g, 91.608 mmol, 87%). NMR indicated product.

$^1$H NMR (400 MHz, $CDCl_3$) δ 7.58 (td, J=7.8, 1.5 Hz, 1H), 7.47-7.38 (m, 1H), 7.16 (dq, J=7.5, 1.0 Hz, 1H), 6.95-6.82 (m, 2H), 2.29 (s, 3H), 2.02 (s, 6H). $^{13}$C NMR (101 MHz, $CDCl_3$) δ 161.13, 141.71, 138.46, 137.89, 135.60, 128.33, 127.02, 125.92, 123.69, 21.07, 20.15.

Example 33: Synthesis of Ligand 5

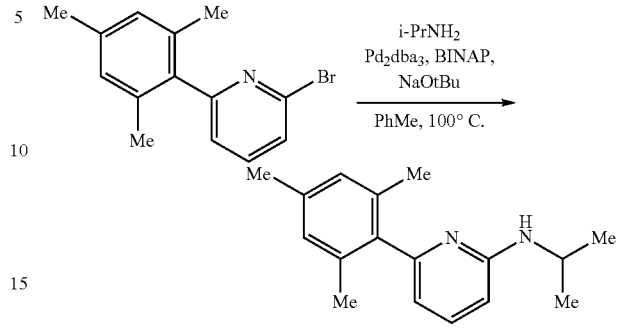

To a mixture of the bromopyridine (0.370 g, 1.34 mmol, 1.00 eq), NaOt-Bu (0.286 g, 2.97 mmol, 2.22 eq), $Pd_2dba_3$ (61.0 mg, 0.0666 mmol, 0.05 eq), and rac-BINAP (42.0 mg, 0.0675 mmol, 0.01 eq) in anhydrous deoxygenated toluene (8 mL) in a nitrogen filled glovebox at 23° C. was added the amine (0.19 mL, 2.28 mmol, 1.70 eq), the mixture was placed in a mantled heated to 100° C., stirred (500 rpm) for 15 hrs, the brown mixture was removed from mantle, allowed to cool to ambient temperature, removed from the glovebox, water (20 mL) and EtOAc (20 mL) was added, the biphasic mixture was poured into a separatory funnel, partitioned, organics were washed with water (2×10 mL), residual organics were extracted using EtOAc (2×10 mL), combined, dried over solid $Na_2SO_4$, decanted, concentrated onto celite, and purified via silica gel chromatography; hexanes—20% EtOAc in hexanes to afford the aminopyridine as a pale yellow amorphous foam (0.220 g, 0.8649 mmol, 65%).

$^1$H NMR (400 MHz, $CDCl_3$) δ 7.46 (dd, J=8.4, 7.3 Hz, 1H), 6.88 (s, 2H), 6.45 (dd, J=7.3, 0.6 Hz, 1H), 6.30 (d, J=8.3 Hz, 1H), 4.52 (s, 1H), 3.81 (p, J=6.2 Hz, 1H), 2.28 (s, 3H), 2.06 (s, 6H), 1.22 (d, J=6.4 Hz, 6H). $^{13}$C NMR (101 MHz, $CDCl_3$) δ 158.54, 158.15, 138.40, 137.58, 136.83, 135.60, 128.17, 113.32, 103.91, 43.25, 23.04, 21.09, 20.13.

Example 34: Synthesis of the $Zr(CH_2SiMe_3)_4$ Precursor

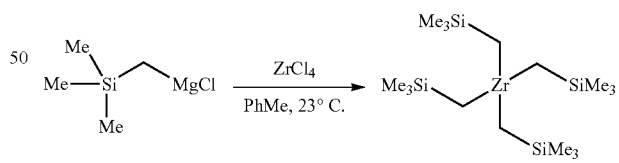

A canary yellow heterogeneous mixture of $ZrCl_4$ (1.523 g, 6.536 mmol, 1.00 eq) in anhydrous de-oxygenated PhMe (50 mL) in a nitrogen filled glovebox at 23° C. was stirred vigourously (1000 rpm) for 15 mins to break up the powder upon which a solution of trimethylsilylmethyl magnesium chloride (26.1 mL, 26.143 mmol, 4.00 eq, non-titrated 1.0 M in $Et_2O$) was added in a dropwise manner over the course of 10 mins. After stirring (1000 rpm) for 2 hrs the now thick white heterogeneous mixture was filtered through a 0.45 μm submicron PTFE filter, concentrated, hexanes (5 mL) was added, the mixture was concentrated, this was repeated 3× more to remove PhMe, $Et_2O$, and triturate residual magnesium salts, the resultant off-white solid mixture was suspended in hexanes (10 mL), stirred vigorously (1000 rpm) for 2 mins, filtered through a 0.45 µm submicron PTFE filter, concentrated, the resultant clear pale brown viscous heterogeneous oil was suspended in hexanes (5 mL), stirred vigorously (1000 rpm) for 1 min, filtered through a 0.45 µm submicron PTFE filter, rinsed with hexanes (3×5 mL), concentrated, the resultant opaque golden brown oil was suspended in pentane (5 mL), stirred vigorously (1000 rpm) for 1 min, filtered through a 0.45 µm submicron PTFE filter, rinsed with pentane (3×5 mL), concentrated, this pentane filtration process was repeated once more to afford the tetrakis-trimethylsilylmethyl zirconium complex as a clear golden brown free flowing oil (2.816 g, 6.399 mmol, 98%, ~98% pure). NMR indicated product.

$^1$H NMR (500 MHz, Benzene-$d_6$) δ 1.08 (s, 8H), 0.17 (s, 36H). $^{13}$C NMR (126 MHz, Benzene-$d_6$) δ 75.48, 2.37.

Example 35: Synthesis of the Hf(CH$_2$SiMe$_3$)$_4$ Precursor

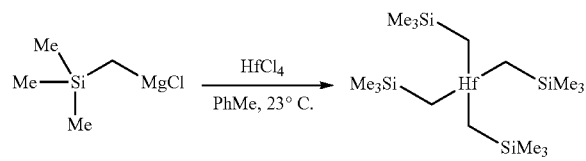

A canary yellow heterogeneous mixture of HfCl$_4$ (2.322 g, 7.250 mmol, 1.00 eq) in anhydrous de-oxygenated PhMe (50 mL) in a nitrogen filled glovebox at 23° C. was stirred vigourously (700 rpm) for 15 mins to break up the powder upon which a solution of trimethylsilylmethyl magnesium chloride (29.0 mL, 28.999 mmol, 4.00 eq, non-titrated 1.0 M in Et$_2$O) was added in a slow dropwise manner over the course of 10 mins during which the canary yellow mixture had transformed into a thick, viscous white heterogeneous mixture. After stirring (700 rpm) for 2 hrs the now slightly pale yellow heterogeneous mixture was filtered through a 0.45 µm submicron PTFE filter, concentrated, hexanes (5 mL) was added, the mixture was concentrated, this was repeated 3× more to remove PhMe, Et$_2$O, and triturate residual magnesium salts, the resultant off-white solid mixture was suspended in hexanes (10 mL), stirred vigorously (1000 rpm) for 2 mins, filtered through a 0.45 µm submicron PTFE filter, concentrated, the resultant clear pale brown viscous heterogeneous oil was suspended in pentane (5 mL), stirred vigorously (1000 rpm) for 1 min, filtered through a double 0.45 µm submicron PTFE filter, rinsed with pentane (3×5 mL), and concentrated to afford the tetrakis-trimethylsilylmethyl hafnium complex as a clear golden brown free flowing oil (3.640 g, 6.902 mmol, 95%). NMR indicated product.

$^1$H NMR (400 MHz, Benzene-$d_6$) δ 0.43 (s, 8H), 0.15 (s, 36H). $^{13}$C NMR (101 MHz, Benzene-$d_6$) δ 86.07, 2.61.

Example 36—Polymerization Processes

Catalyst activity (in terms of quench time and polymer yield) and resulting polymer characteristics were assessed for Procatalysts 1-16. The Polymerization reactions were carried out in a parallel pressure reactor (PPR) and/or a semi-batch reactor.

The PPR polymerization experiments were conducted at both 120° C., and 150° C. using [HNMe(C$_{18}$H$_{37}$)$_2$][B(C$_6$F$_5$)$_4$] as the activator in amounts of 1.5 molar equivalents in relation to the procatalyst, and MMAO-3 (500 nmoles at 120° C. or 750 nmoles at 150° C.) was employed as the scavenger.

TABLE 1

Polymerization Data from PPR Experiments

| Procatalyst No. | Temp. (° C.) | Loading (nmoles) | Quench Time (seconds) | Yield (mg) | Mw (g/mol) | PDI (Mw/Mn) | Mol % Octene |
|---|---|---|---|---|---|---|---|
| 4 | 150 | 50 | 211 | 140 | 220,047 | 2.9 | 0.7 |
| 4 | 150 | 100 | 181 | 161 | 199,117 | 2.6 | 1.5 |
| 5 | 120 | 100 | 72 | 164 | 218,211 | 16.4 | 5.7 |
| 5 | 150 | 150 | 91 | 181 | 87,785 | 8.0 | 4.5 |
| 6 | 120 | 100 | 774 | 86 | 269,519 | 4.4 | 4.0 |
| 6 | 150 | 150 | 1278 | 114 | 108,606 | 7.9 | 2.8 |
| 7 | 120 | 100 | 67 | 159 | 476,438 | 14.0 | 1.4 |
| 7 | 150 | 150 | 43 | 224 | 602,911 | 9.2 | 0.5 |
| 8 | 120 | 100 | 102 | 150 | 617,027 | 5.8 | 0.5 |
| 8 | 150 | 150 | 88 | 211 | 332,786 | 5.4 | 0.8 |
| 9 | 120 | 100 | 53 | 156 | 294,255 | 9.8 | 3.8 |
| 9 | 150 | 150 | 145 | 228 | 362,081 | 15.4 | 2.5 |
| 11 | 120 | 100 | 49 | 181 | 154,689 | 14.7 | 6.1 |
| 11 | 150 | 150 | 54 | 205 | 79,676 | 14.4 | 4.5 |
| 12 | 120 | 100 | 84 | 162 | 512,257 | 7.9 | 2.3 |
| 12 | 150 | 150 | 239 | 180 | 174,897 | 16.4 | 3.4 |
| 13 | 120 | 100 | 50 | 166 | 420,762 | 20.5 | 1.8 |
| 13 | 150 | 150 | 73 | 171 | 484,345 | 38.3 | 1.9 |
| 14 | 150 | 50 | 209 | 165 | 635,378 | 16.1 | 1.2 |
| 14 | 150 | 100 | 172 | 174 | 570,349 | 29.3 | 2.8 |
| 15 | 150 | 50 | 127 | 148 | 89,992 | 12.1 | 2.7 |
| 15 | 150 | 100 | 82 | 181 | 91,728 | 12.5 | 3.7 |
| 16 | 150 | 50 | 363 | 132 | 256,129 | 8.1 | 2.3 |
| 16 | 150 | 100 | 207 | 158 | 252,675 | 8.6 | 2.4 |

*Mol % Octene or C8/olefin is defined as: (moles 1-octene/(total moles 1-octene and ethylene)) × 100.

Standard PPR reactor conditions varied based on temperature. At 120° C., the ethylene pressure was 150 psi; 500 nmoles of MMAO-3A; and a 1.5 equivalent of the activator. When the reaction was run at 150° C., the ethylene pressure was 213 psi, the amount of MMAO-3A was 750 nmoles; and a 1.5 equivalent of the activator. At either temperature, the octene to ethylene ratio ([C8]:[C2]) was 2.24. The run time was 30 mins or until 50 psi conversion at 120° C. or until 75 psi conversion at 150° C., and upon which the reaction was quenched with 10% CO.

The results tabulated in Table 1 indicated that the procatalysts are capable of producing polymer at temperatures up to 150° C. with a range of catalyst activity as indicated by the low to high quench times (43-1.278 s), where the faster quench times (i.e. 43 s) indicates higher catalyst activity. Procatalysts 5, 7, 9, 11, 12, 13 and 15 exhibiting the highest catalyst activity in PPR experiments at 120° C. based on their low quench times (less than or equal to 100 s), and Procatalysts 5, 7, 8, 11, and 13 exhibit the highest catalytic activity at 150° C. Overall, higher catalyst activity was observed for the catalyst architectures that possess a 2,4,6-trimethylphneyl or mesityl, 2,4,6-triisopropylphenyl, or 2,7-di-t-butylanthracene substituent at the 2-position of the pyridine with the 2-aminotrimethylsilylmethyl and 2-aminoneopentyl substituents at the 6-position.

The semi-batch reactor polymerization reactions were carried out in a 4-L semi-batch reactor initially without diethyl zinc (DEZ) at 120° C., and 150° C., and then with three different loadings of DEZ added (in amounts of 0, 95, and 380 µmol) at 150° C. The activator used was [HNMe(C$_{18}$H$_{37}$)$_2$][B(C$_6$F$_5$)$_4$] in amounts of 1.2 molar equivalents, and the scavenger used was MMAO-3 (19.0 µmol).

At 120° C. under these reactor conditions in semi-batch studies, most of the procatalysts produce polymers with high Mw (greater than or equal to 300,000 g/mol), with procatalysts 3, 4, 7, 8, 9, 13, 14, and 16 exhibiting ultra-high molecular weight capabilities (greater than or equal to 600,000 g/mol). Procatalysts 4, 8, 13, and 14 are capable of producing the highest molecular weight polymers (greater than or equal to 1,000,000 g/mol) at 120° C. with Procatalysts 8, 13, and 14 capable of producing this molecular weight at 150° C. as well.

The procatalysts produced polymers with a wide range in PDI in the PPR and semi-batch reactor. Procatalysts 4, 6, 8, 9, 11, 13, 14, and 16 produce polymer with modestly narrow PDI (less than or equal to 5) under these reactor conditions.

Under the previously described conditions, ultra-low (less than or equal to 1 mol %) to low (less than or equal to 5 mol %) comonomer incorporation was observed for the catalysts systems containing procatalysts 7, 8, 13, 14, and 16. These catalyst systems produced polymers with the least comonomer incorporation under these reactor conditions.

TABLE 3

Chain Transfter Constants from Semi-Batch Reactor Experiments w/Et$_2$Zn

| Procatalyst No. | Temp. (° C.) | Chain Transfer Constant (Ca) | PDI with no DEZ | PDI with 95 µmoles DEZ | PDI with 380 µmoles DEZ |
|---|---|---|---|---|---|
| 7 | 150 | 0.20 | 9.0 | 14.2 | 10.9 |
| 8 | 150 | 0.80 | 4.0 | 10.9 | 22.7 |

TABLE 2

Polymerization Data from Semi-Batch Reactor Experiments

| Procatalyst No. | Temp. (° C.) | Procatalyst Loading (µmol) | Ethylene Uptake (g) | Mw (g/mol) | PDI (Mw/Mn) | Mol % Octene | T$_M$ (° C.) |
|---|---|---|---|---|---|---|---|
| 1 | 120 | 5 | 3.0 | N.D. | N.D. | N.D. | N.D. |
| 2 | 120 | 6 | 1.5 | N.D. | N.D. | N.D. | N.D. |
| 3 | 120 | 5 | 14.9 | 818,482 | 48.8 | 1.4 | 125.6 |
| 3 | 150 | 7.5 | 4.1 | 280,776 | 48.9 | 3.0 | N.D. |
| 4 | 120 | 5.5 | 9.9 | 1,020,933 | 43.5 | 3.5 | 128.7 |
| 5 | 120 | 2.5 | 14.1 | 217,528 | 21.8 | 5.2 | 93.0 |
| 5 | 150 | 4.3 | 11.1 | 131,235 | 18.3 | 5.0 | 122.3 |
| 7 | 120 | 2.5 | 9.5 | 958,779 | 46.1 | 2.3 | 124.8 |
| 7 | 150 | 4.0 | 9.6 | 898,206 | 16.5 | 0.9 | 125.9 |
| 8 | 120 | 2.5 | 12.5 | 2,054,292 | 6.3 | 1.1 | 123.4 |
| 8 | 150 | 1.9 | 10.2 | 1,898,937 | 6.4 | 1.5 | 126.3 |
| 9 | 120 | 1.8 | 17.5 | 769,836 | 8.2 | 2.8 | 118.3 |
| 9 | 150 | 2.0 | 9.2 | 328,437 | 4.2 | 3.8 | 119.5 |
| 11 | 120 | 1.0 | 12.6 | 271,634 | 4.8 | 4.8 | 121.1 |
| 11 | 150 | 2.0 | 18.0 | 114,782 | 11.7 | 3.0 | 123.8 |
| 13 | 120 | 1.3 | 10.6 | 1,381,065 | 39.7 | 0.4 | 127.1 |
| 13 | 150 | 1.5 | 10.6 | 1,432,368 | 3.0 | 0.1 | 128.4 |
| 14 | 120 | 1.0 | 9.3 | 1,791,301 | 5.5 | 0.8 | 124.4 |
| 14 | 150 | 1.5 | 14.0 | 1,422,066 | 3.4 | 0.4 | 126.8 |
| 15 | 120 | 1.0 | 11.1 | 184,081 | 22.8 | 3.9 | 122.1 |
| 15 | 150 | 1.5 | 12.7 | 122,574 | 7.2 | 2.4 | 121.0 |
| 16 | 120 | 2.0 | 16.4 | 772,537 | 5.3 | 2.2 | 121.2 |
| 16 | 150 | 3.0 | 21.0 | 403,113 | 17.2 | 1.3 | 121.1 |

Standard Semi-batch reactor conditions:
120° C.-88 g ethylene and 568 g 1-octene in 1155 g of IsoparE under a pressure of 281 psi;
150° C.-81 g ethylene and 570 g 1-octene in 1043 g of IsoparE under a pressure of 317 psi.
Mol % Octene or C8/olefin is defined as: (moles 1-octene/(total moles 1-octene and ethylene)) × 100.
Scavenger = MMAO-3 (19.0 µmol).
Activator = [HNMe(C$_{18}$H$_{37}$)$_2$][B(C$_6$F$_5$)$_4$] (1.2 eq).
Reactor run time = 10 mins.
N.D. = not determined.

TABLE 3-continued

Chain Transfter Constants from Semi-Batch Reactor Experiments w/Et₂Zn

| Procatalyst No. | Temp. (° C.) | Chain Transfer Constant (Ca) | PDI with no DEZ | PDI with 95 μmoles DEZ | PDI with 380 μmoles DEZ |
|---|---|---|---|---|---|
| 9 | 150 | 0.64 | 7.2 | 4.3 | 7.2 |
| 11 | 150 | 1.1 | 18.0 | 13.8 | — |
| 13 | 150 | 0.0 | 29.4 | 6.0 | 8.9 |
| 14 | 150 | 0.49 | 12.3 | 13.7 | 12.9 |
| 15 | 150 | 2.3 | 12.7 | 11.9 | 9.2 |
| 16 | 150 | 0.11 | 7.7 | 6.3 | 2.8 |

The high chain transfer constants, Ca, of greater than or equal to 1 for Procatalysts 11 and 15 at 150° C. indicates that these catalysts have a high sensitivity to chain transfer agents and rapidly undergo chain transfer with these agents, whereas a modest sensitivity (Ca≥0.5) to CSAs is observed for procatalysts 8, 9, and 14. A decrease in or sustained narrow PDI is not observed for procatalysts 8, 9, or 14 as the amount of Et₂Zn (DEZ) is increased; evidence that these specific procatalysts may undergo irreversible chain transfer with a CSA as opposed to reversible chain transfer.

The invention claimed is:

1. A process for polymerizing olefins, the process comprising contacting ethylene and optionally one or more $(C_3-C_{12})\alpha$-olefin in the presence of a catalyst system, wherein the catalyst system comprises a metal-ligand complex having a structure according to formula (I):

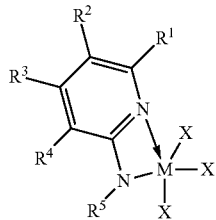

(I)

where:

M is titanium, zirconium, or hafnium;

each X is benzyl, $(C_1-C_{12})$alkyl, halogen atom, $-CH_2SiR^R_3$, or $-(CH_2)_n(SiR^C)_3$, wherein n is an integer from 1 to 10, wherein each $R^R$ is $(C_1-C_{12})$alkyl, and wherein each $R^C$ is independently $(C_1-C_{30})$hydrocarbyl, $(C_1-C_{30})$heterohydrocarbyl, or —H;

$R^1$ is independently chosen from $(C_1-C_{40})$hydrocarbyl, $(C_1-C_{40})$heterohydrocarbyl, $-Si(R^C)_3$, $-Ge(R^C)_3$, $-P(R^P)_2$, $-N(R^N)_2$, $-OR^C$, $-SR^C$, $-NO_2$, $-CN$, $-CF_3$, $R^CS(O)-$, $R^CS(O)_2-$, $(R^C)_2C=N-$, $R^CC(O)O-$, $R^COC(O)-$, $R^CC(O)N(R)-$, $(R^C)_2NC(O)-$, or halogen, wherein each $R^C$, each $R^N$, and each $R^P$ are independently $(C_1-C_{30})$hydrocarbyl, $(C_1-C_{30})$heterohydrocarbyl, or —H;

$R^2$, $R^3$, and $R^4$ are independently chosen from —H, $(C_1-C_{40})$hydrocarbyl, $(C_1-C_{40})$heterohydrocarbyl, $-Si(R^C)_3$, $-Ge(R^C)_3$, $-P(R^P)_2$, $-N(R^N)_2$, $-OR^C$, $-SR^C$, $-NO_2$, $-CN$, $-CF_3$, $R^CS(O)-$, $R^CS(O)_2-$, $(R^C)_2C=N-$, $R^CC(O)O-$, $R^COC(O)-$, $R^CC(O)N(R)-$, $(R^C)_2NC(O)-$, or halogen, wherein each $R^C$ and each $R^N$ is $(C_1-C_{30})$hydrocarbyl, $(C_1-C_{30})$heterohydrocarbyl, or —H; and $R^5$ is —H, $(C_1-C_{40})$hydrocarbyl or $(C_1-C_{40})$heterohydrocarbyl, provided $R^5$ is not phenyl or a substituted phenyl.

2. The process of claim 1, wherein $R^1$ is selected from the group consisting of radicals having formula (II), radicals having formula (III), and radicals having formula (IV):

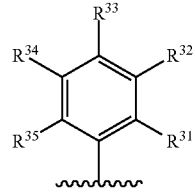

(II)

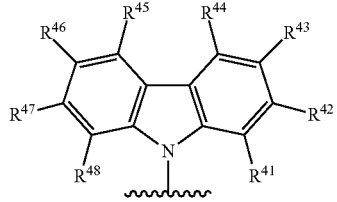

(III)

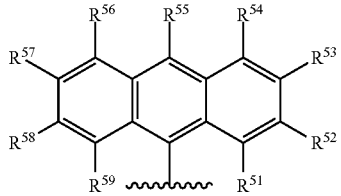

(IV)

where each of $R^{31-35}$, $R^{41-48}$, and $R^{51-59}$ is independently chosen from $(C_1-C_{40})$hydrocarbyl, $(C_1-C_{40})$heterohydrocarbyl, $-Si(R^T)_3$, $-Ge(R^T)_3$, $-P(R^T)_2$, $-N(R^T)_2$, $-N=CHR^T$, $-OR^T$, $-SR^T$, $-NO_2$, $-CN$, $-CF_3$, $R^TS(O)-$, $R^TS(O)_2-$, $(R^T)_2C=N-$, $R^TC(O)O-$, $R^TOC(O)-$, $R^TC(O)N(R^T)-$, $(R^T)_2NC(O)-$, halogen, or —H, wherein $R^T$ is $(C_1-C_{30})$hydrocarbyl or —H.

3. The process of claim 2, wherein $R^1$ is a radical having formula (II), and wherein $R^{31}$, $R^{33}$, and $R^{35}$ are independently $(C_1-C_{12})$alkyl or $(C_1-C_{20})$aryl.

4. The process of claim 2, wherein $R^1$ is a radical having formula (II), and wherein $R^{32}$ and $R^{34}$ are independently $(C_1-C_{12})$alkyl or $(C_1-C_{20})$aryl.

5. The process of claim 2, wherein $R^1$ is a radical having formula (IV), and wherein $R^{52}$ and $R^{58}$ are independently $(C_1-C_{12})$alkyl or $(C_1-C_{20})$aryl.

6. The process of claim 2, wherein $R^1$ is a radical having formula (IV), and wherein $R^{53}$ and $R^{58}$ are independently $(C_1-C_{12})$alkyl or $(C_1-C_{20})$aryl.

7. The process of claim 2, wherein $R^1$ is a radical having formula (IV), and wherein $R^{53}$ and $R^{57}$ are independently $(C_1-C_{12})$alkyl or $(C_1-C_{20})$aryl.

8. The process of claim 2, wherein $R^1$ is a radical having formula (IV), and wherein $R^{53}$, $R^{55}$, and $R^{57}$ are independently $(C_1-C_{12})$alkyl or $(C_1-C_{20})$aryl.

9. The process of claim 1, wherein $R^5$ is benzyl, $(C_1-C_{20})$alkyl, or $-CH_2SiR^R_3$, wherein $R^R$ is $(C_1-C_{12})$alkyl.

10. The process of claim 1, wherein each X is benzyl, $(C_1-C_{12})$alkyl, $-CH_2SiR^R_3$, or $-(CH_2)_n(SiR^C)_3$, wherein n is an integer from 1 to 10, wherein each $R^R$ is $(C_1-C_{12})$alkyl, and wherein each $R^C$ is independently $(C_1-C_{30})$hydrocarbyl, $(C_1-C_{30})$heterohydrocarbyl, or —H.

11. The polymerization process of claim 1, wherein the contacting occurs in a reactor at a reactor temperature of greater than or equal to 120° C.

12. The polymerization process of claim 1, wherein the contacting occurs in a solution polymerization reactor at a reactor pressure from 10 psi to 2000 psi.

13. The polymerization process of claim 1, wherein the contacting occurs within a reactor including therein the catalyst system and a chain transfer agent or chain shuttling agent.

14. The polymerization process of claim 13, wherein the chain transfer or chain shuttling agent is diethyl zinc.

* * * * *